US012001507B2

(12) United States Patent
Fesbinder et al.

(10) Patent No.: US 12,001,507 B2
(45) **Date of Patent: *Jun. 4, 2024**

(54) DEMARCATION OF TEXTS

(71) Applicant: READ TWOGETHER LTD., Jerusalem (IL)

(72) Inventors: David Allen Fesbinder, Jerusalem (IL); Nikita Sergeevich Lyubarshchuk, Dnipro (UA); Aryeh Rosenzweig, Bnei Brak (IL); Alexander Postnikov, South Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/062,503

(22) Filed: Dec. 6, 2022

(65) Prior Publication Data

US 2023/0222172 A1 Jul. 13, 2023

Related U.S. Application Data

(60) Provisional application No. 63/286,378, filed on Dec. 6, 2021, provisional application No. 63/350,636, filed on Jun. 9, 2022.

(51) Int. Cl.
*G06F 40/40* (2020.01)
*G06F 16/00* (2019.01)
*G06F 17/00* (2019.01)

(52) U.S. Cl.
CPC .............. *G06F 17/00* (2013.01); *G06F 16/00* (2019.01)

(58) Field of Classification Search
CPC ......................... G06F 40/42–58; G06F 40/169
See application file for complete search history.

(56) References Cited

U.S. PATENT DOCUMENTS

| | | | | |
|---|---|---|---|---|
| 5,494,444 A * | 2/1996 | Thayer | G09B 7/02 | 434/323 |
| 7,576,756 B1 * | 8/2009 | Good | G06F 3/0481 | 345/635 |
| 8,001,465 B2 * | 8/2011 | Kudrolli | G06F 40/18 | 715/261 |
| 2013/0229489 A1 * | 9/2013 | Ozawa | H04N 13/183 | 348/43 |
| 2019/0087772 A1 * | 3/2019 | Medina | B25J 9/1697 | |
| 2023/0222172 A1 * | 7/2023 | Fesbinder | G06F 40/58 | 345/418 |

FOREIGN PATENT DOCUMENTS

| | | | |
|---|---|---|---|
| WO | WO-9939255 A2 * | 8/1999 | G06F 17/211 |
| WO | WO-2010091674 A2 * | 8/2010 | G06F 17/248 |
| WO | WO-2014066398 A1 * | 5/2014 | G06F 3/0237 |
| WO | WO-2019060767 A1 * | 3/2019 | B25J 9/1697 |

* cited by examiner

*Primary Examiner* — Todd Buttram
(74) *Attorney, Agent, or Firm* — Alexander Postnikov

(57) ABSTRACT

Methods and systems of displaying substring pairs where visual demarcations delineate adjacent substring pairs from each other. The method may comprise receiving a plurality of the primary substrings, a plurality of the secondary substrings, and a plurality of visual demarcations, displaying, on an electronic display, the primary substrings and the secondary substrings arranged into substring pairs, and one of the visual demarcations in each of the correspondence areas. Additional desired visual effects may be achieved through the use of specific demarcations, demarcation placements, and substring modifications.

29 Claims, 140 Drawing Sheets

*I'm studying Spanish Literature and I'm very lucky to enjoy this experience in Spain.*

Jeg studerer spansk litteratur og føler mig heldig at kunne nyde denne oplevelse i Spanien.

FIG. 1

| | | | |
|---|---|---|---|
| Example 1 | A plurality<br>Una pluralidad | segments<br>de segmentos | of primary text<br>de texto primarios |
| Example 2 | A plurality<br>Una pluralidad | segments<br>de segmentos | of primary text<br>de texto primarios |
| Example 3 | A plurality<br>Una pluralidad | segments<br>de segmentos | of primary text<br>de texto primarios |
| Example 4 | A plurality<br>Una pluralidad | segments<br>de segmentos | of primary text<br>de texto primarios |

FIG. 22d

Example 1

A plurality segments of primary text
Una pluralidad de segmentos de texto primarios

FIG. 22h

FIG. 22v
Example 1
Segmentation bar
constantly;
and maintain us
that You nourish
Correspondence bar
Example 2
Segmentation bar
constantly;
and maintain us
that You nourish
Correspondence bar
Example 3
Segmentation bar
constantly;
and maintain us
that You nourish
Correspondence bar

I am learning Spanish Before I travel to Spain 2304
Estoy aprendiendo español antes de viajar a España 2303

FIG. 23c

*I am learning Spanish Before I travel to Spain* 2304
Estoy aprendiendo español antes de viajar a España 2303

FIG. 23d

*I am learning Spanish Before I travel to Spain* 2304
Estoy aprendiendo español antes de viajar a España 2303

FIG. 23e

*I am learning Spanish Before I travel to Spain* 2304
Estoy aprendiendo español antes de viajar a España 2303

FIG. 23f

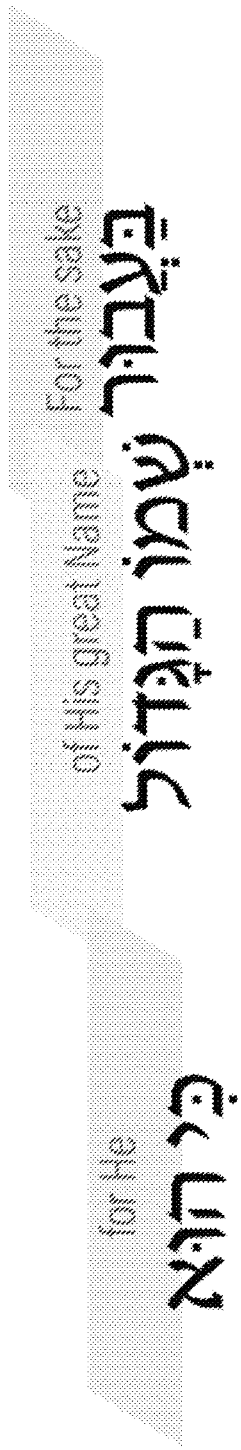
FIG. 32a
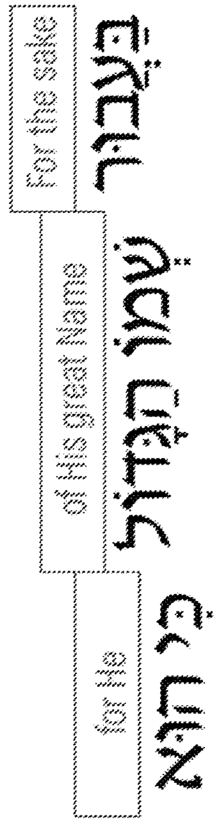
FIG. 32c
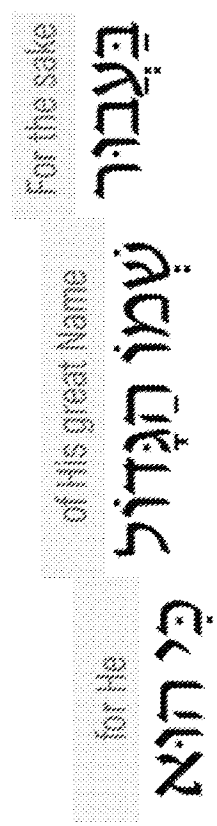

| | |
|---|---|
| For the sake | בַּעֲבוּר |
| of His great Name | שְׁמוֹ הַגָּדוֹל |
| for He | כִּי הוּא |
| is God | אֵל |
| Who nourishes | זָן |
| and maintains all | וּמְפַרְנֵס לַכֹּל |
| and benefits all | וּמֵטִיב לַכֹּל |
| and prepares nourishment | וּמֵכִין מָזוֹן |
| for all His creatures | לְכָל בְּרִיּוֹתָיו |
| that He created | אֲשֶׁר בָּרָא |
| Source of Blessings | בָּרוּךְ |
| is You | אַתָּה |
| Hashem | יְיָ |
| Who nourishes | הַזָּן |
| All | אֶת הַכֹּל |

FIG. 32f

| | |
|---|---|
| For the sake | בַּעֲבוּר |
| of His great Name | שְׁמוֹ הַגָּדוֹל |
| for He | כִּי הוּא |
| is God | אֵל |
| Who nourishes | זָן |
| and maintains all | וּמְפַרְנֵס לַכֹּל |
| and benefits all | וּמֵטִיב לַכֹּל |
| and prepares nourishment | וּמֵכִין מָזוֹן |
| for all His creatures | לְכָל בְּרִיּוֹתָיו |
| that He created | אֲשֶׁר בָּרָא |
| Source of Blessings | בָּרוּךְ |
| is You | אַתָּה |
| Hashem | יְיָ |
| Who nourishes | הַזָּן |
| All | אֶת הַכֹּל |

FIG. 32h

FIG. 33b
He provides
food
to all flesh;
as forever
is His kindness:

FIG. 33d
Source of Blessings
is You
Hashem,
our God
King
of the universe
Who nourishes the
whole world
with His Goodness;
with favor
with kindness
and with mercy:

FIG. 36c
Francisco stands outside
Francisco está parado afuera de
his new house.
su nueva casa.
He reaches into his pocket
Él alcanza su bolsillo

FIG. 48a
FIG. 48b
FIG. 48c
For the sake
is His kindness
to all flesh

DEMARCATION OF TEXTS

CROSS-REFERENCE TO RELATED APPLICATIONS

This application claims the benefit of U.S. provisional patent application No. 63/286,378, filed on Dec. 6, 2021, and U.S. provisional patent application No. 63/350,636, filed on Jun. 9, 2022, the contents of which are incorporated by reference in their entirety.

BACKGROUND

The present disclosure relates to the field of displaying texts, and, in particular, to the field of demarcating texts to delineate adjacent substring pairs.

SCOPE OF PRIOR ART

The terms used to describe the prior art are listed at the start of the detailed description. One of the best ways to learn a foreign language is by reading foreign texts in that language. However, a reader may not understand every word in a given foreign text. Thus, to aid readers, language learning programs often display a native language translation of the foreign text immediately above the foreign text. For example, FIG. 1 shows an English translation immediately above a Danish foreign text. The proximity of these texts improves a reader's learning experience as he or she may quickly reference the English text to improve his or her understanding of the Danish text. While such arrangements good start, it is not immediately obvious which words or phrases in the Danish text correspond to which words or phrases in the English text. Here, does the Danish word "nyde" correspond to the English word "enjoy" or to "this" ? Such ambiguities are especially prevalent for texts of different scripts or interlinear texts.

There is therefore a need in the art for a method and system of displaying a foreign text string and a translation text string such that the foreign substrings are delineated, and there is a correspondence between the foreign substrings and their corresponding translation substrings.

SUMMARY

The present disclosure satisfies the foregoing needs by providing, inter alia, methods and systems for displaying demarcated substring pairs.

The present disclosure is directed at a computer-implemented method for displaying a primary text string and a secondary text string, the method comprising: receiving a primary text string comprising a plurality of primary substrings; receiving a secondary text string comprising a plurality of secondary substrings; receiving a plurality of distinct visual demarcations; displaying, on an electronic display, the primary substrings and the secondary substrings arranged into substring pairs, wherein each of the substring pairs comprising one of the secondary substrings placed next to its corresponding primary substring; and displaying, on the electronic display, the visual demarcations, wherein the visual demarcations delineate adjacent substring pairs from each other. The secondary substrings may be related to their corresponding primary substrings.

In one aspect, each of the substring pairs may have a rectangular correspondence area. Each of the rectangular correspondence areas may contain at least one of the visual demarcations.

In another aspect, there may be three or more of the visual demarcations and the visual demarcations are equidistant from each other, wherein a space in between the visual demarcations is greater than zero.

In another aspect, each of the visual demarcations may be any or a combination of a shape, a line, a curve, a contour, a boundary, color, or a graphical representation.

In another aspect, the width of a given visual demarcation may be equal to a wider of the secondary substring and its corresponding primary substring. A leftmost point of a given visual demarcation may be in between, or flush with, a leftmost point of the secondary substring and a leftmost point of its corresponding primary substring and a rightmost point of the given visual demarcation is in between, or flush with, a rightmost point of the secondary substring and a rightmost point of its corresponding primary substring. A given visual demarcation may be one of entirely above and entirely below the substring pair. The placement of the visual demarcations relative to one of the primary substrings and the secondary substrings may be consistent.

In another aspect, the secondary substrings may be offset from their corresponding primary substrings.

In another aspect, the primary text string and the secondary text string comprise any or a combination of symbol, pictures, or graphics.

In another aspect, at least one of the visual demarcations may border or overlap two or more of the substring pairs.

In another aspect, a given visual demarcation may comprise a shape that causes the secondary substring to appear on a separate perspective plane relative to the corresponding primary substring, conveying a visual appearance of depth for the secondary substring. The secondary substrings may be related to their corresponding primary substrings. The given visual demarcation may border or overlap only one of the secondary substring and its corresponding primary substring. The given visual demarcation may border or overlap the secondary substring and its corresponding primary substring.

In another aspect, displaying the secondary substrings further may comprise visually deemphasizing the secondary substrings by one of displaying the secondary substrings offset from their corresponding primary substrings, displaying the secondary substrings in a smaller font than their corresponding primary substrings, and displaying a portion of the secondary substrings in a lighter shade than their corresponding primary substrings.

In another aspect, the shape of the given visual demarcation may narrow in the direction of the secondary substring. The shape of the given visual demarcation may comprise at least one sloped edge. The shape of the given visual demarcation may be quadrilateral. The given visual demarcation may comprise at least two shadow-outlined edges of an implied transparent oblique parallelogram. A topmost point of the given visual demarcation may overlap a lower of the secondary substring and its corresponding primary substring.

The present disclosure is further directed at a system to display a primary text string and a secondary text string, the system comprising: memory storing executable instructions, a processing device executing the instructions, wherein the instructions cause the processing device to receive a primary text string comprising a plurality of primary substrings, receive a secondary text string comprising a plurality of secondary substrings, receive a plurality of distinct visual demarcations, display, on an electronic display, the primary substrings and the secondary substrings arranged into substring pairs, wherein each of the substring pairs comprising one of the secondary substrings placed next to its corresponding primary substring, and display, on the electronic display, the visual demarcations, wherein the visual demarcations delineate adjacent substring pairs from each other.

The present disclosure is further directed at non-transitory computer storage media storing executable instructions which when executed by a computing device cause the computing device to receive a primary text string comprising a plurality of primary substrings, receive a secondary text string comprising a plurality of secondary substrings, receive a plurality of distinct visual demarcations, display, on an electronic display, the primary substrings and the secondary substrings arranged into substring pairs, wherein each of the substring pairs comprising one of the secondary substrings placed next to its corresponding primary substring, and display, on the electronic display, the visual demarcations, wherein the visual demarcations delineate adjacent substring pairs from each other.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIG. 1 shows an English translation immediately above a Danish foreign text, as seen in the prior art.

FIGS. 21-55 show substring pairs visually demarcated in multiple formats/modes, according to various non-limiting embodiments.

DETAILED DESCRIPTION

Figure 2A:
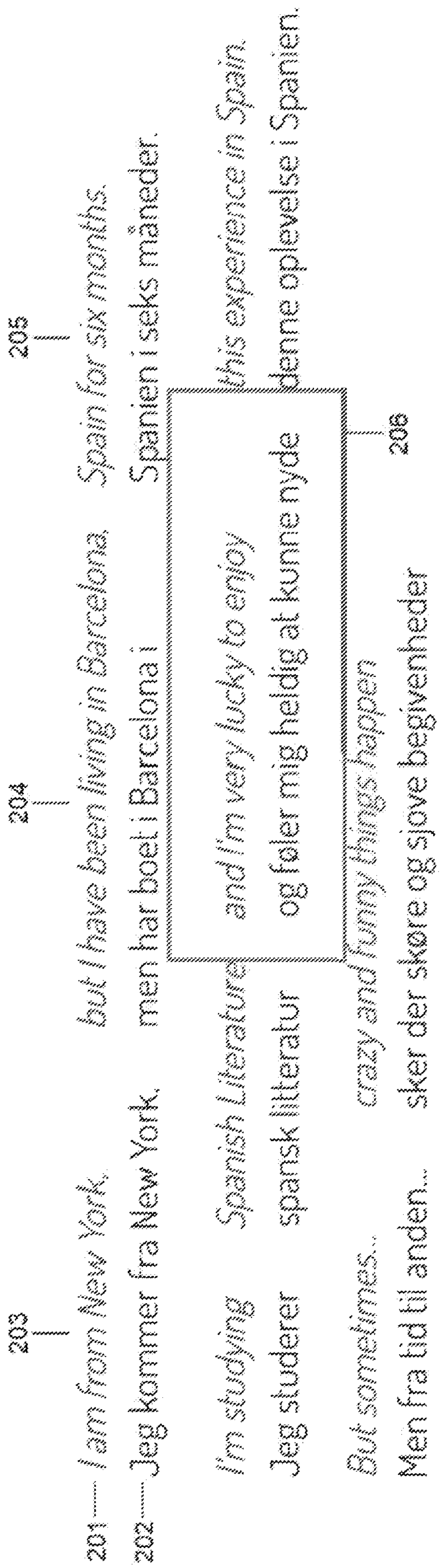
FIGS. 2*a*-2*b* shows definitions used throughout the disclosure.

The disclosed approaches may be provided in a variety of manners, for example, procedural, computer implement, integrated into a system or apparatus, provided as a computer programming product, and the like.

For the sake of convenience, the terms used to describe the prior art and various embodiments of the present invention are defined below. Some terms are illustrated in FIG. 2 for further clarification. It should be noted that these definitions are provided to merely aid in understanding the descriptions, and they do not, in any way, limit the scope of the present invention.

Display (verb): The verb "display," unless specified otherwise, refers to the act of presenting texts and/or content strings in any format that may be perceived by a reader of the texts and/or content strings, for example, but not limited to, presenting the texts and/or content strings on digital screens, printed medium, as holographs, and the like.

Display (noun): The noun "display," unless specified otherwise, refers to any sort of presentation of texts and/or content strings that may be perceived by a reader of the texts and/or content strings, for example, but not limited to, a presentation of the texts and/or content strings on digital screens, printed medium, as holographs, and the like.

Bordering: A text or object borders another text or object when an edge of the text or object is flush with the edge of another text or object.

Overlapping: A text or object overlaps another text or object when the body of the text or object occupies the same space as the body of another text or object.

Superimposing: A first text or object superimposes another text or object when only one of the texts or objects is visible in any overlapping portions.

Text string: A string of at least one character.

Primary text string (202): A text string that is the primary focus of a reader's attention. In FIG. 2, the Danish text string is the primary focus for a reader learning Danish, for instance. It would be appreciated that while the 'string' has been exemplified in the instant disclosure in the form of a text, it could be any other form/representation of a string, for instance, of one or more numbers, alphanumeric representations, codes, written expressions, graphical symbols, or a combination thereof. This non-limiting definition of 'text' and scope thereof is therefore applicable to all the below texts.

Secondary text string (201): A text string that is the secondary focus of a reader's attention. In FIG. 2, the English text string is the secondary focus for a reader learning Danish.

Substrings (203, 204, 205): Unique portions of a text string. In FIG. 2, the primary and secondary text strings have been split into three primary substrings and three secondary substrings.

Substring pair: A secondary substring placed adjacent to its corresponding primary substring, indicating a correspondence and/or association and/or mapping of any desired/defined nature between the two substrings. In FIG. 2, the English substring "I'm studying" and its corresponding Danish substring "Jeg studerer" form a substring pair, for instance.

Correspondence area (206): A rectangular area containing a single substring pair where the top edge of the correspondence area extends to, but does not border, an immediately above text or object, the bottom edge of the correspondence area extends to, but does not border, an immediately below text or object, the right edge of the correspondence area extends to, but does not border, an immediately right text or object, and the left edge of the correspondence area extends to, but does not border, an immediately left text or object. In FIG. 2*a*, a grey reference box 206 outlines the correspondence area of the substring pair comprised of the English substring "and I'm very lucky to enjoy" and its corresponding Danish substring "og foler mig heldig at kunne nyde." It would be appreciated that the visual demarcation can be of any desired shape, size, dimension or any other graphic representation that can encompass or create a boundary including dotted lines or dots or any other representation to help demarcate and separately display/identify the substring pair. It would further be appreciated that correspondence area may not be displayed per se to the reader, and can be computed for placement of demarcations using the instant method(s).

Figure 2B:
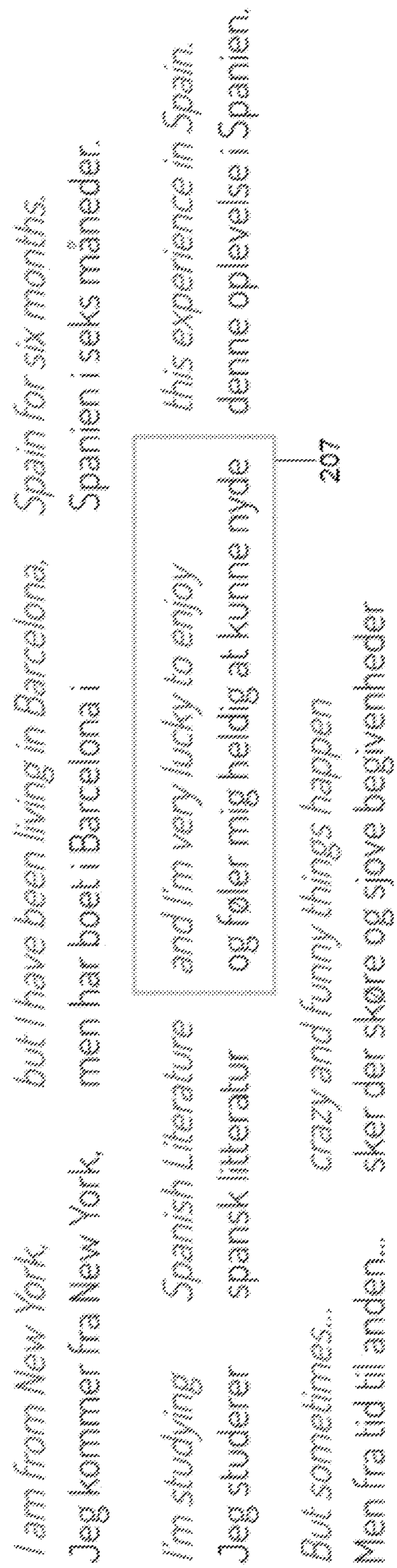

Reduced correspondence area (207): A rectangular area containing a single substring pair where the top edge of the reduced correspondence area extends halfway to an immediately above text or object, the bottom edge of the correspondence area extends halfway to an immediately below text or object, the right edge of the correspondence area extends halfway to an immediately right text or object, and the left edge of the correspondence area extends halfway to an immediately left text or object. In FIG. 2*b*, a grey reference box 207 outlines the reduced correspondence area of the substring pair comprised of the English substring "and I'm very lucky to enjoy" and its corresponding Danish substring "og foler mig heldig at kunne nyde." Alternatively, the reduced correspondence area is a rectangular area containing a single substring pair where the top edge of the reduced correspondence area extends less than halfway to an immediately above text or object, the bottom edge of the correspondence area extends less than halfway to an immediately below text or object, the right edge of the correspondence area extends less than halfway to an immediately right text or object, and the left edge of the correspondence area extends less than halfway to an immediately left text or object. Such reduced correspondence areas have an empty space in between adjacent substring pairs.

Deemphasis: Any modification to text that makes the deemphasized text less prominent relative to a corresponding text.

Offset: A first text string is offset from a second text string if 1) a rightmost point of the first text string is to the right of the rightmost point of the second text string and a leftmost point of the first text is to the right of the leftmost point of the second text string or 2) a rightmost point of the first text string is to the left of the rightmost point of the second text string and a leftmost point of the first text is to the left of the leftmost point of the second text string.

Visual demarcation: A continuous non-background, non-text object. In an aspect, while the instant specification has been described considering a rectangular demarcation, said visual demarcation can be of any shape, color, contour, boundary, or a combination thereof. Also, it may be appreciated that the visual demarcation can be kept consistent in terms of its position and representation for each pair of substrings with other visual demarcations to enable smoother reading for the user.

It shall be noted that, unless specified otherwise, the following exemplary methods can be applied to characters and texts of any typeface, font, and size. For example, the methods can be applied to characters displayed in 12-point Times New Roman typeface as well as to characters displayed in 10-point Calibri typeface. These examples, as well as all other illustrated and described typefaces, font sizes, and fonts, are not inclusive and shall not be interpreted in any way to limit the scope of the present invention.

Figure 3:
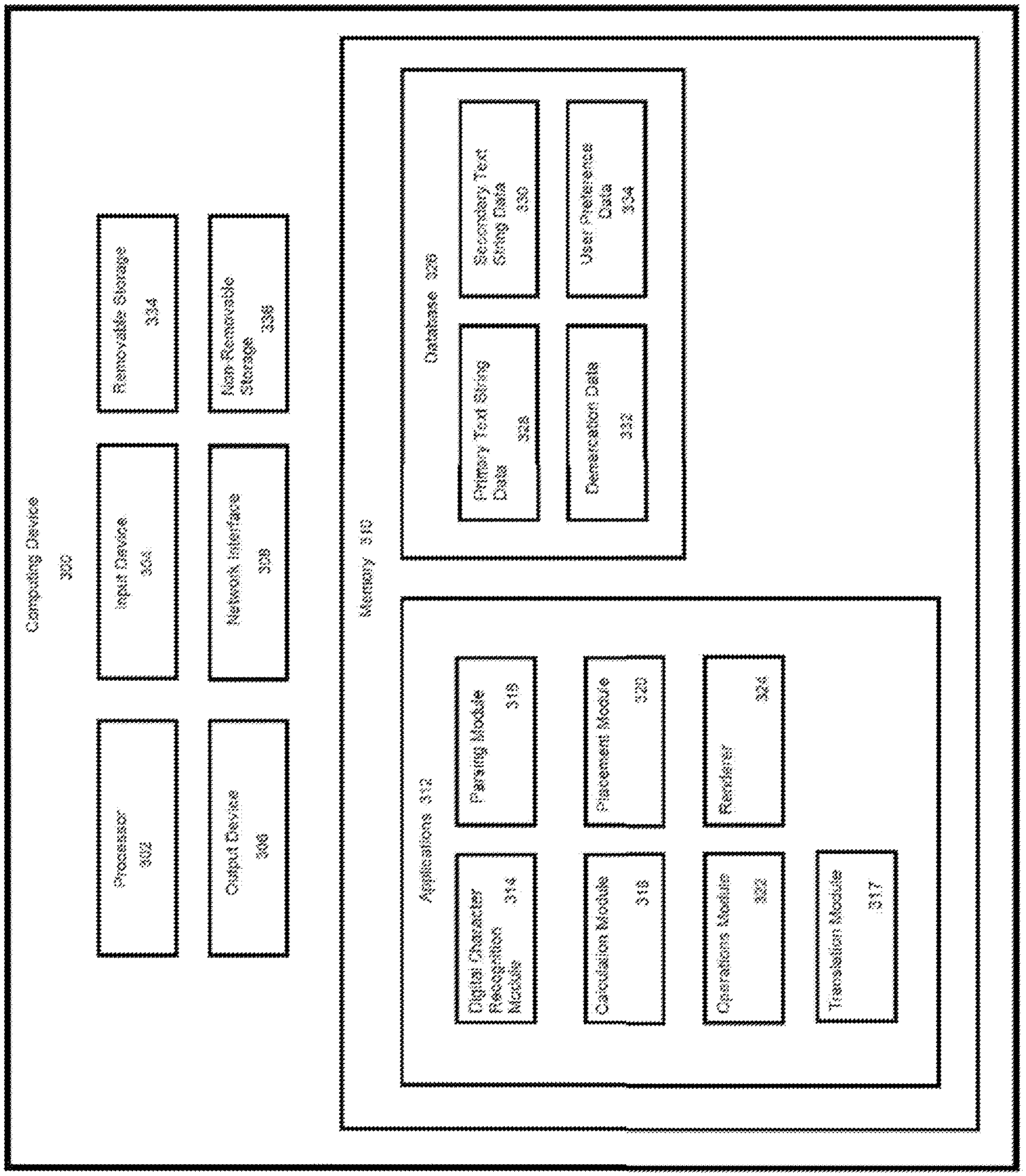
FIG. 3 shows a block diagram illustrating example physical components of a computing device with which aspects of the disclosure may be practiced.

Reference is now made to FIG. 3, which shows a block diagram illustrating example physical components of a computing device 300 with which aspects of the disclosure may be practiced. The computing device may be referred to as the system.

In a preferred embodiment, the computing device 300 includes at least one processor 302, an input device 304 such as a keyboard, mouse, and or touchscreen, and an output device 306 such as a printer or an electronic display in any of the various forms associated with computing devices. The computing device may also include a network interface 308 for network enablement. It should be appreciated that processing may be implemented either locally or remotely via various forms of wireless or wired networking technologies or a combination of both.

The memory 310 may include various types of short and long-term memory as is known in the art. Memory 310 may be loaded with various applications 312 including a digital character recognition module 314 for identifying text strings on electronic displays as will be further discussed, a parsing module 316 for identifying text strings and associated text string metadata by parsing the tags of HTML content and associated Cascading Style Sheet (CSS) files as will be further discussed, a translation module 317 for translating various foreign languages into either English or other chosen languages, a calculation module 318 for defining correspondence areas of substring pairs as will be further discussed, a placement module 320 for placing text strings, substrings, and/or demarcations as will be further discussed, an operations module 322 for performing various modifications to text strings, substrings, and/or demarcations as will be further discussed, and a renderer 324 for rendering text strings, substrings, and/or demarcations for display as will be further discussed. Accordingly, memory 310 includes all necessary modules per each embodiment.

Memory 310 may further include a database 326 loaded with primary text string data 328, secondary text string data 330, demarcation data 332, and user preference data 334. In certain embodiments, the database 326 may be implemented locally, whereas in other embodiments, the database 326 may be implemented remotely.

Primary text string data may include all metadata associated with primary text strings including, but not limited to, primary text string typefaces, fonts, point sizes, dimensions, etc. Secondary text string data may include metadata of secondary text strings including, but not limited to, secondary text string typefaces, fonts, point sizes, dimensions, etc. Demarcation data 332 may include demarcation appearance, design, dimensions, etc. User preference data 334 may include preferred user settings, languages, demarcations, and the like. Accordingly, the database 326 includes all necessary content per each embodiment.

The term computer readable media as used herein may include computer storage media. Computer storage media may include volatile and nonvolatile, removable and non-removable media implemented in any method or technology for storage of information, such as computer readable instructions, data structures, or program modules. The memory 310, the removable storage device 334, and the non-removable storage device 336 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The computing device 300 is operative to employ various font technologies like variable fonts, raster, vector, TrueType, and Microsoft OpenType and the database 326 also includes associated font-resource files.

Figure 4:
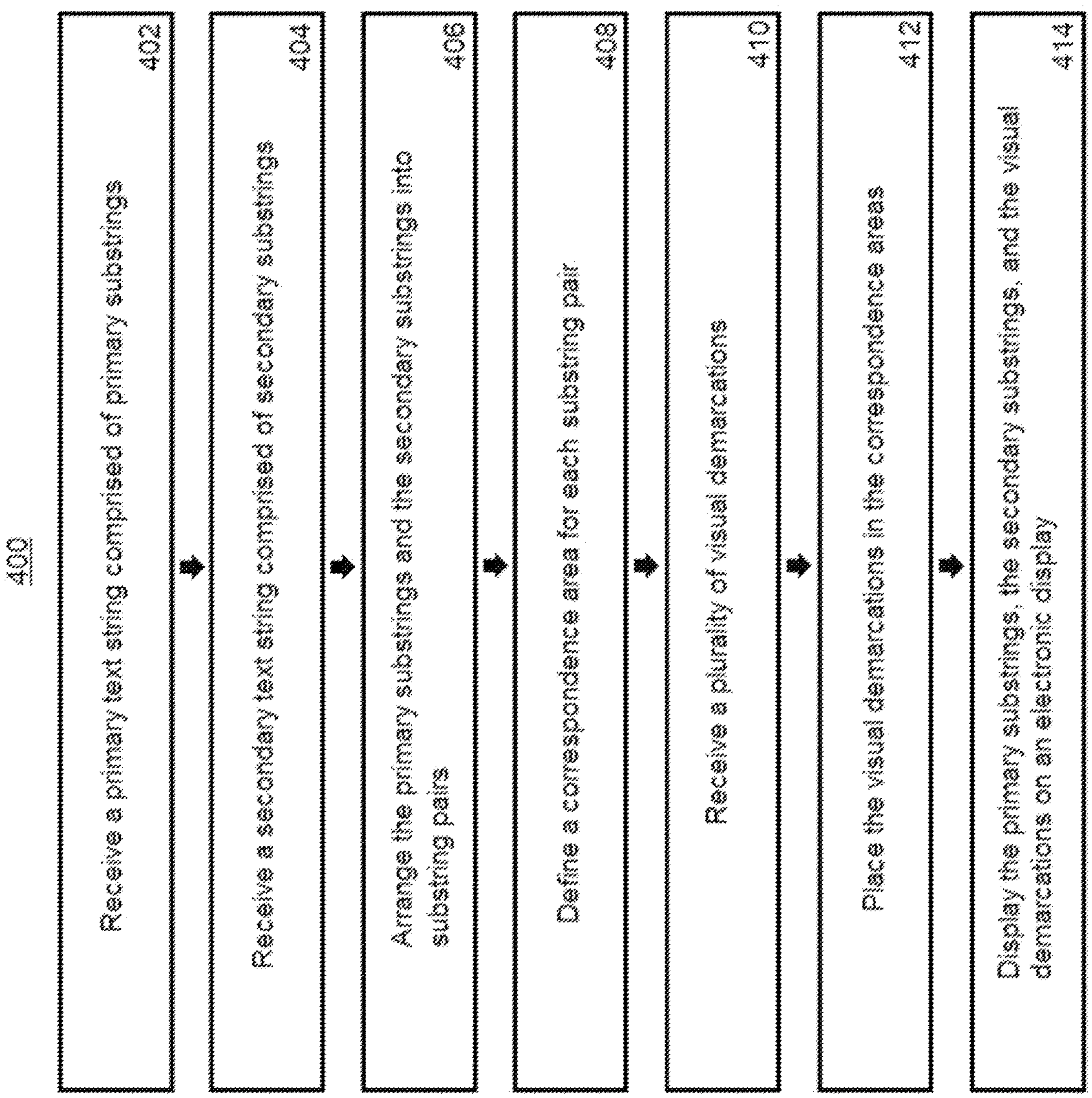
FIG. 4 is a flowchart showing steps of an exemplary method for the simultaneous display of a primary text string comprised of primary substrings and a secondary text string comprised of secondary substrings.
Figure 5A:
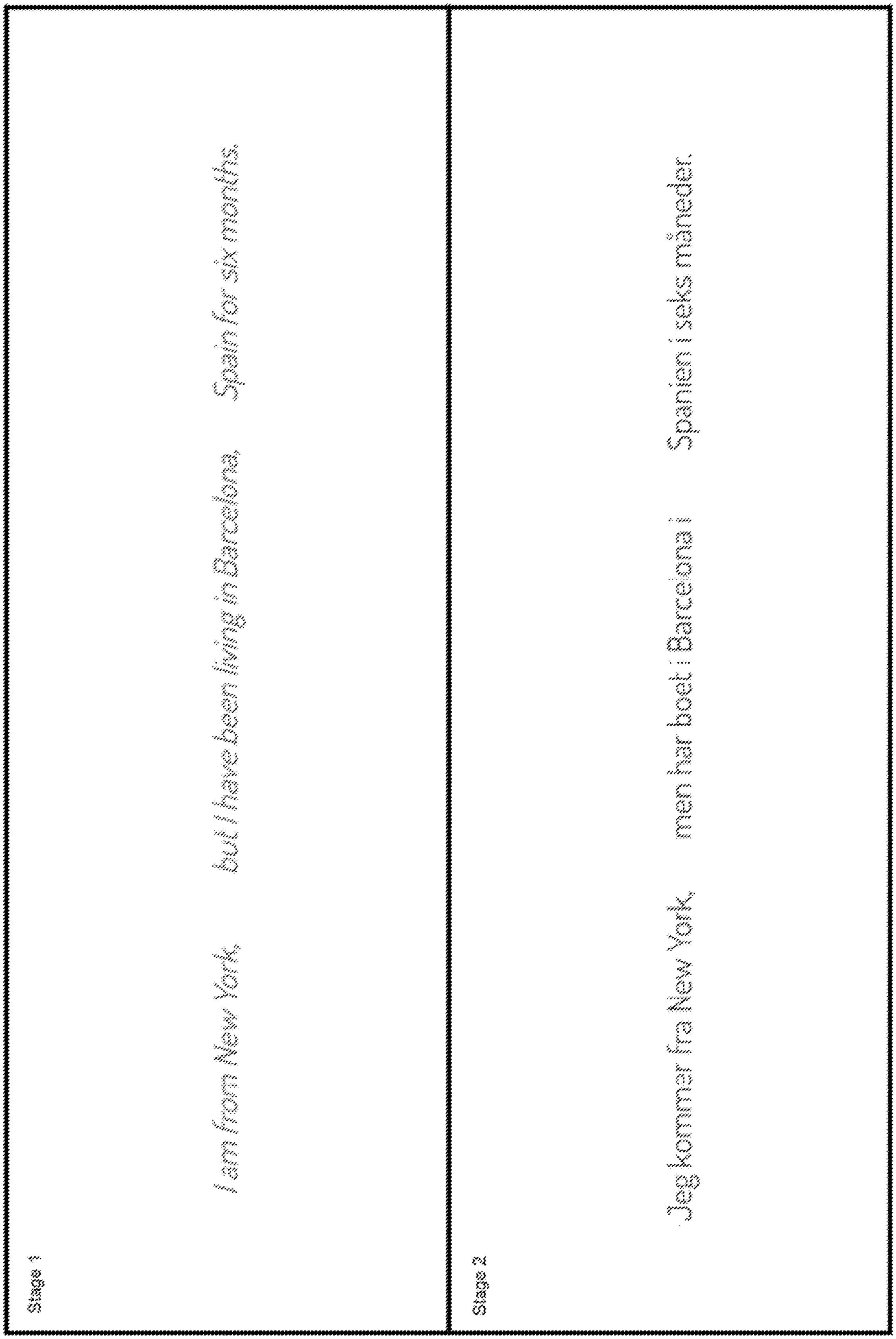
FIGS. 5*a*-5*e* show the steps of the method of FIG. 4 as applied to a computing device, according to an embodiment.
Figure 5B:
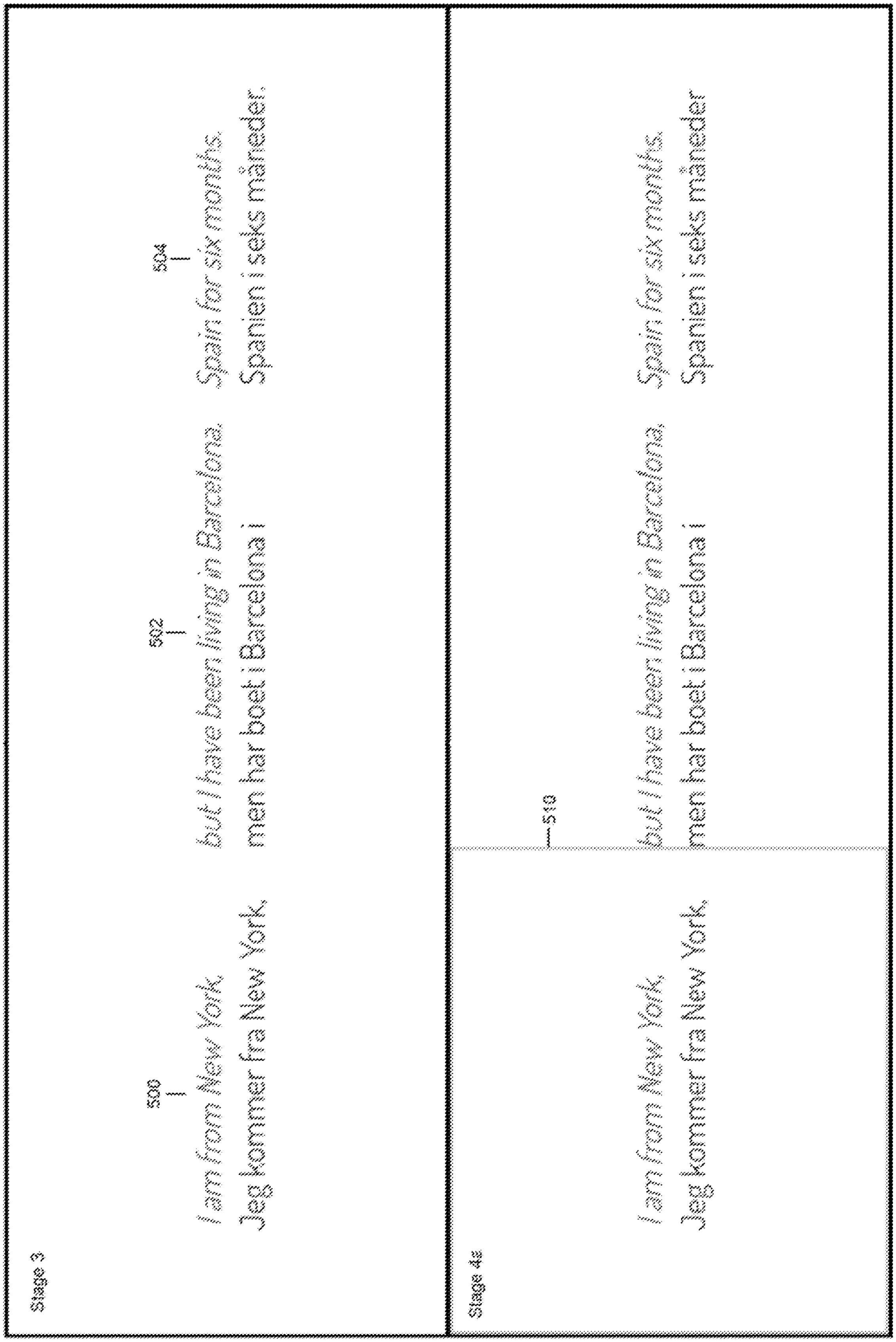
Figure 5C:
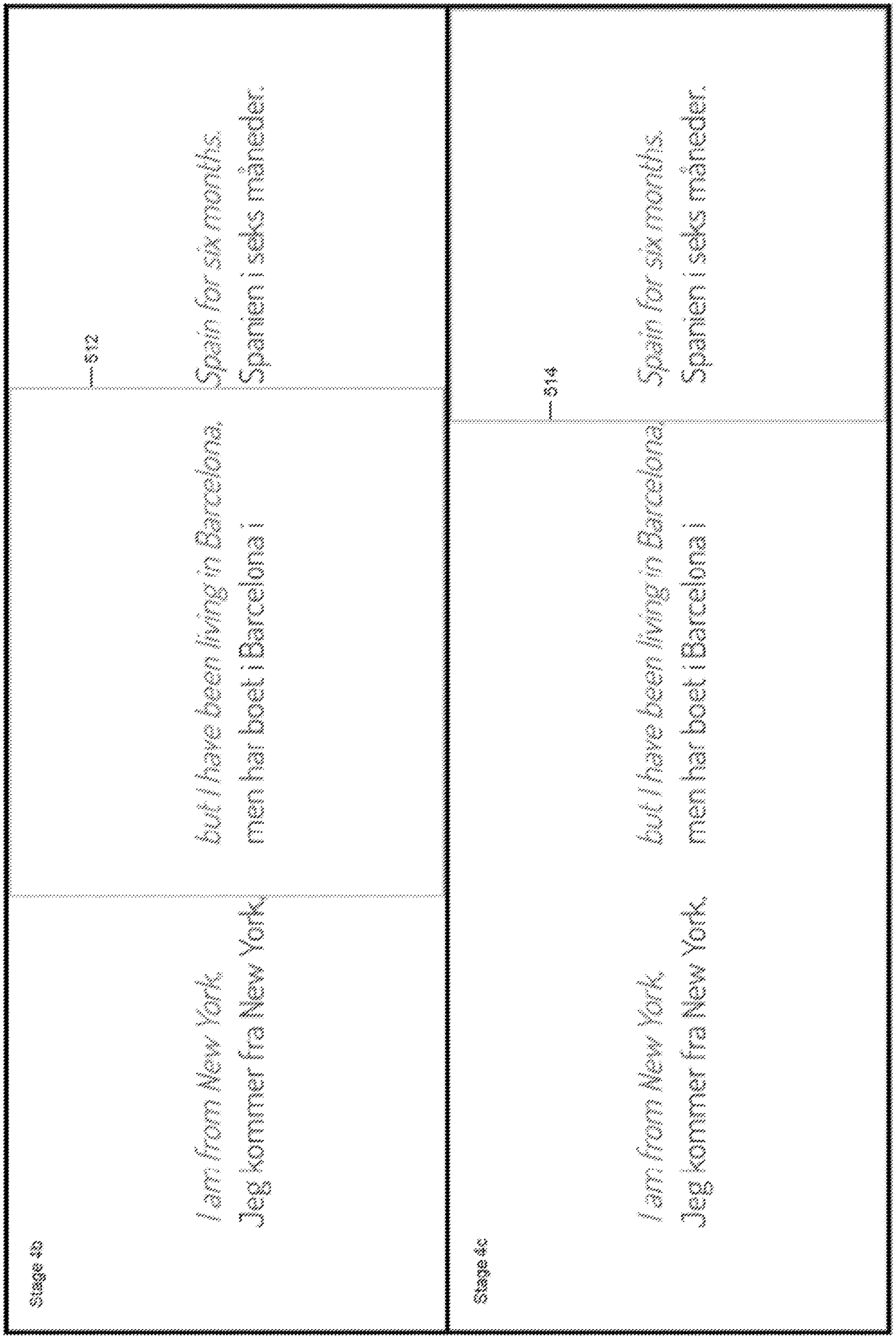
Figure 5D:
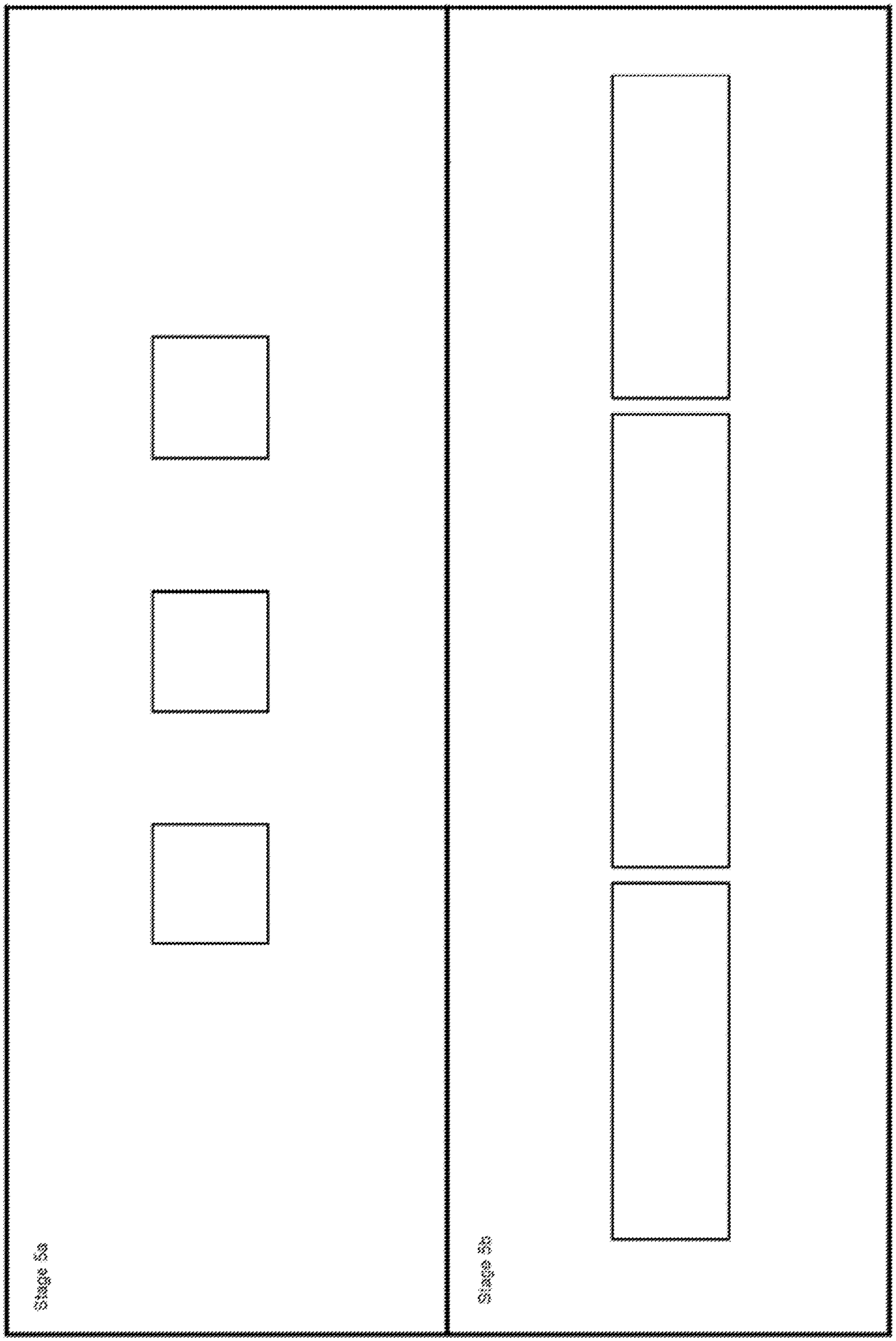
Figure 5E:
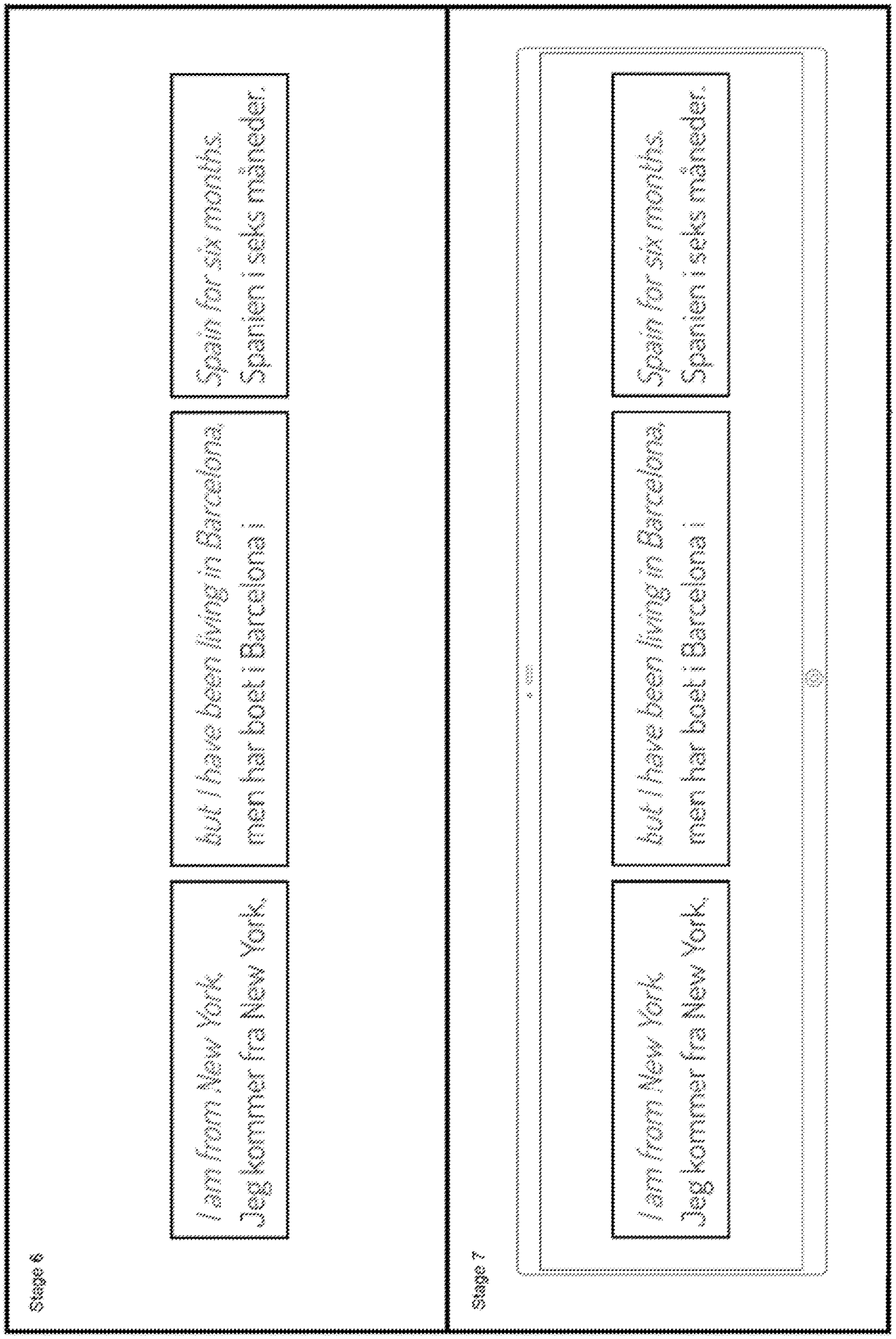

FIG. 4 is a flowchart showing steps of an exemplary method 400 for the simultaneous display of a primary text string comprised of primary substrings and a secondary text string comprised of secondary substrings. Demarcations are used to delineate adjacent substring pairs from each other and to further associate the secondary substrings to their corresponding primary substrings. The method may begin at step 402.

At step 402, a primary text string composed of primary substrings is received.

According to an embodiment, the primary text string is received when a user inputs the primary text string using an input device. The user may manually indicate the substrings that make up the text string. Alternatively, a native language processing engine can identify substrings within a string. For instance, exemplary rules can be based on punctuation, where periods indicate the start of a new text string and commas indicate the start of a new substring within that text string.

According to another embodiment, the primary text string is received when the digital character recognition module (314) scans the content of an electronic display to identify a primary text string. The entirety of the content may be scanned. Alternatively, a user may select a portion of the content to be scanned. Metadata (identity, position, typeface, font, etc.) of each character in the primary text string may be saved to primary text string data. A native language processing engine can identify substrings within a string.

According to yet another embodiment, the primary text string is received when the parsing module (316) parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters in a primary text string as well as associated Cascading Style Sheet (CSS) files to identify associated character metadata. Metadata (identity, position, typeface, font, size, etc) of each character in the primary text string may be saved to primary text string data. A native language processing engine can identify substrings within a string.

At step 404, a secondary text string composed of secondary substrings is received. Each of the secondary substrings may uniquely correspond to one of the primary substrings. For example, each of the secondary substrings may be a translation of its corresponding primary substring. In an aspect, the secondary text string may either be machine-generated directly based on the primary text string or can be generated manually or through manual intervention. As mentioned above, the primary and secondary text strings need not necessarily be translations of each other, but can be associated in any other way, for instance the primary text string can be "One Two Three" and the secondary text string can be "1 2 3". Alternatively, the primary and secondary text strings can both the graphical symbols/representations or can be any combination of the above.

According to an embodiment, the secondary text string is received when a user inputs the secondary string using an input device. The user may manually indicate the substrings that make up the text string. Alternatively, a native language processing engine can identify substrings within a string. For instance, exemplary rules can be based on punctuation, where periods indicate the start of a new text string and commas indicate the start of a new substring within that text string.

According to another embodiment, the secondary text string is received when the digital character recognition module (314) scans the content of an electronic display to identify a secondary text string. The entirety of the content may be scanned. Alternatively, a user may select a portion of the content to be scanned. Metadata (identity, position, typeface, font, etc.) of each character in the secondary text string may be saved to secondary text string data. A native language processing engine can identify substrings within a string.

According to yet another embodiment, the secondary text string is received when the parsing module (316) parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters in a secondary text string as well as associated Cascading Style Sheet (CSS) files to identify associated character metadata. Metadata (identity, position, typeface, font, size, etc) of each character in the secondary text string may be saved to secondary text string data. A native language processing engine can identify substrings within a string.

At step 406, the primary substrings and the secondary substrings are arranged into substring pairs.

According to an embodiment, the placement module places each of the secondary substrings adjacent to its corresponding primary substring, creating substring pairs.

At step 408, a correspondence area is defined for each substring pair.

According to an embodiment, for each substring pair, the calculation module 318 scans the display screen, pixel by pixel, to determine the location of non-substring pair objects. The largest rectangular area containing the substring pair and not containing non-substring pair objects is defined as the correspondence area for that substring pair. Alternatively, the calculation module 319 defines the correspondence area of a substring pair by processing the metadata of substrings within that substring pair and adjacent objects to determine the topmost pixels of a below object, the bottommost pixels of an above object, leftmost pixels of a right object and the rightmost pixels of a left object and selecting a rectangular area containing pixels of the substring pair and not containing pixels of those objects.

At step 410, a plurality of visual demarcations are received. Each of the visual demarcations may be distinct such that a reader can distinguish adjacent demarcations. The number of demarcations may equal to the number of correspondence areas. Alternatively, there may be more demarcations than correspondence areas. Yet alternatively, there may be fewer demarcations than correspondence areas, with every other correspondence area not containing a demarcation.

According to an embodiment, demarcations are received when they are generated. The first step of generating a demarcation is retrieving a base demarcation from demarcation data. The operations module, in conjunction with the placement module (320), then modifies the base demarcation into a desired demarcation that, when placed in a correspondence area, results in the desired visual effect.

At step 412, the demarcations are placed into the correspondence areas.

According to an embodiment, the placement module places each of the desired demarcations into one of the correspondence areas such that the desired demarcation results in the desired visual effect.

At step 414, the primary substrings, secondary substrings, and visual demarcations are displayed on an electronic display.

It would be appreciated that the usage of the term "In proximity to" can be interpreted to mean close but not touching, touching, or overlapping, and the term "Interacting with" can touching or overlapping. There are no limitations in the claims below that require "interacting with" but such limitations will be in the specification in case we need to amend the claims to include such limitations later.

Alternatively, a native language processing engine can identify substrings within a string. For instance, exemplary rules can be based on, for example, Sentence must start with a Uppercase character (e.g. Noun/I/We/He etc.), then lowercase character follows, there must be spaces between words, the sentence must end with a full stop(.) after a word, two continuous spaces are not allowed, and two continuous upper case characters are not allowed. However, the sentence can end after an upper case character.

In another exemplary aspect, string can be divided into an array of substrings, and a computed implemented function can return a temporary array of the substrings. The function can be used in calculation statements wherever an array can be used, wherein a first operand can be the string to be split which can be alphanumeric, graphic, or UCS-2. The second operand can be the list of characters that indicate the end of each substring, can have same type and CCSID as the first operand. If it is not specified, the function can default to splitting at blanks. If the length of the second operand is greater than 1, any of the characters in the second operand indicate the end of each substring.

Another exemplary implementation to automatically find/form substrings from a string can be based on rules associated with parts of speech including noun, pronoun, verb, adjective, adverb, preposition, conjunction and interjection. Breaking a sentence down into its parts of speech requires knowledge of the word's meaning and how it relates to other words in the sentence. In an implementation, the substring formation can be based on identification of verbs, followed by identification of adverbs, followed by nouns, pronouns, and adjectives, followed by propositions and conjunctions and interjections, and then logically groping them together in parts based on defined set of rules.

FIGS. 5*a*-5*e* show the steps of the method of FIG. 4 as applied to a computing device, according to an embodiment.

In Stage 1, Danish primary substrings of "Jeg kommer fra New York," "men har boet i Barcelona i" and "Spanien i seks mineder" are received from user keyboard inputs.

In Stage 2, English secondary substrings of "I am from New York," "but I have been living in Barcelona," and "Spain for six months" are generated by the translation module as direct translations of the Danish primary substrings.

In Stage 3, the English secondary substrings are placed above their corresponding Danish primary substrings to form substring pairs 500 502 504.

In Stages 4a-4c, the correspondence areas are defined for each substring pair. The edges of each correspondence area are highlighted with reference boxes 510 512 514.

In Stages 5a-5b, the demarcations are generated. Boxes are chosen as a base demarcation. The hollow boxes are then scaled into a desired shape.

In Stage 6, the Box demarcations are placed in their respective correspondence areas. Here, the box demarcations surround the substring pairs.

In stage 7, the Danish primary substrings, the English secondary substrings, and the box demarcations are displayed on an electronic display. Here, the boxes function to delineate adjacent substring pairs from each other.

The system embodies a significant advance over existing systems that cannot display two text strings in a manner that delineates adjacent substring pairs. Additional desired visual effects may be achieved through the use of specific demarcations, demarcation placements, and substring modifications, as described below.

As an alternative to generating the demarcations, individual characters in the received primary and secondary substrings may each contain a portion of a demarcation such that, when substring pairs are formed out of the primary and secondary substrings, complete demarcations are formed from individual demarcation portions. For example, if a user indicates the use of box demarcations before the primary and secondary substrings are received, individual characters in the received primary and secondary substrings may appear underlined, with leftmost and rightmost individual characters having vertical portions. This will result in a box demarcations being formed as the substring pairs are formed out of the primary and secondary substrings.

Figure 6:
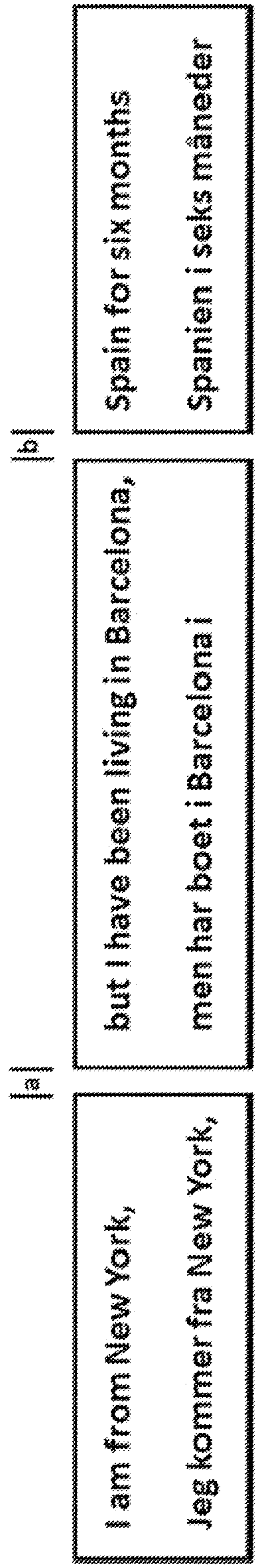
FIG. 6 shows demarcated substring pairs where the visual demarcations are equidistant from each other, according to an embodiment.

FIG. 6 shows demarcated substring pairs, according to an embodiment. Danish primary substrings and English secondary substrings are surrounded by box demarcations. The box demarcations are equidistant from each other such that 'a' is equal to 'b' where 'a' and 'b' are non-zero distances. At a glance, such visual demarcation spacing provides a rigid frame to otherwise randomly spaced substrings.

Figure 7:
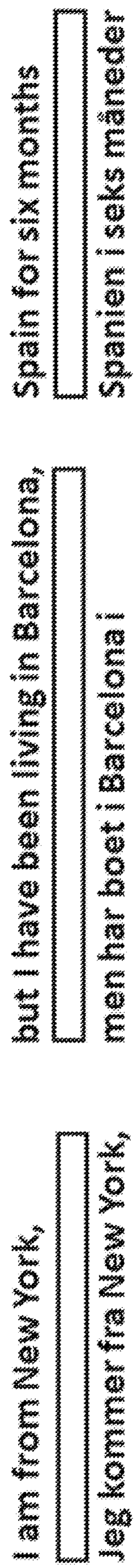
FIG. 7 shows demarcated substring pairs where the visual demarcations have a width of the substring pair, according to an embodiment.

FIG. 7 shows demarcated substring pairs, according to an embodiment. Danish primary substrings and English secondary substrings are separated by rectangular demarcations. The leftmost point of a given visual demarcation is flush with the leftmost point of a substring pair and the rightmost point of a given visual demarcation is flush with the rightmost point of a substring pair. At a glance, such visual demarcation widths associate all substrings in horizontal alignment with a visual demarcation.

Figure 8:
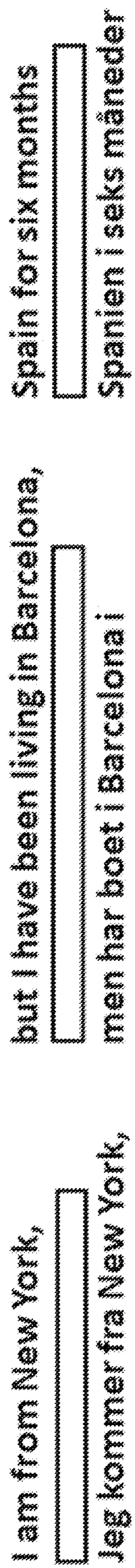
FIG. 8 shows demarcated substring pairs where the visual demarcations have a reduced width, according to an embodiment.

FIG. 8 shows demarcated substring pairs, according to an embodiment. Danish primary substrings and English secondary substrings are separated by rectangular demarcations. The leftmost point of a given visual demarcation is flush with or in between the leftmost point of a primary substring and the leftmost point of a corresponding secondary substring. The rightmost point of a given visual demarcation is flush with or in between the rightmost point of a primary substring and the rightmost point of a corresponding secondary substring. At a glance, such visual demarcation widths associate all substrings that are fully or partially horizontally aligned with a visual demarcation.

Figure 9:
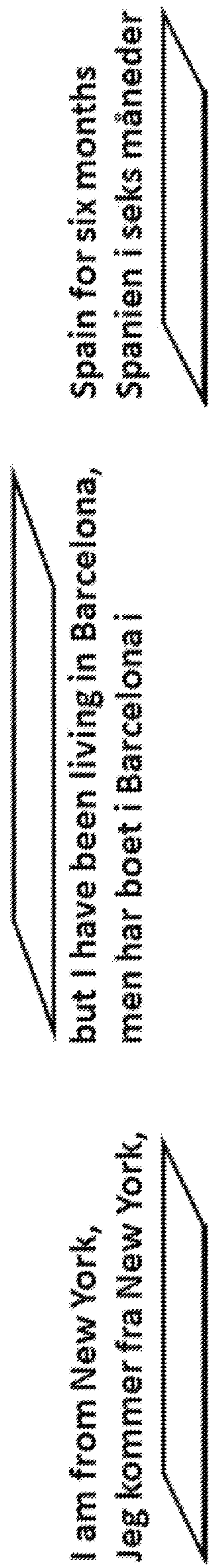
FIG. 9 shows demarcated substring pairs where the visual demarcations are entirely above or entirely below the substrings pairs, according to an embodiment.

FIG. 9 shows demarcated substring pairs, according to an embodiment. Danish primary substrings and English secondary substrings are demarcated by parallelogram demarcations. The visual demarcations are entirely above or entirely below pairs of substrings. At a glance, such visual demarcation placements associate all substrings that are partially walled in by the visual demarcations.

Figure 10:
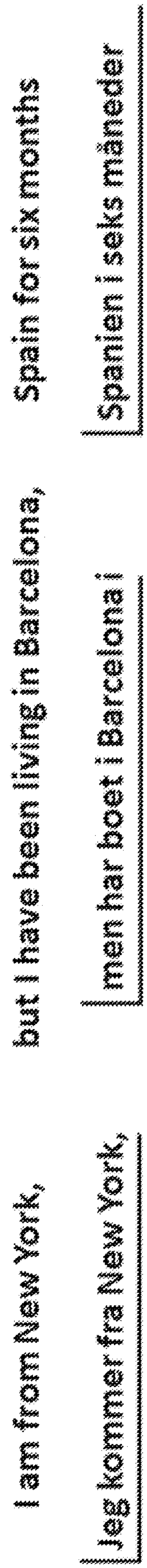
FIG. 10 shows demarcated substring pairs where the visual demarcations are consistently placed relative to the primary substrings, according to an embodiment.

FIG. 10 shows demarcated substring pairs, according to an embodiment. Danish primary substrings and English secondary substrings are demarcated by perpendicular-line demarcations. The visual demarcations are consistently placed relative to the primary substrings. Alternatively, the visual demarcations may be consistently placed relative to the secondary substrings. At a glance, such visual demarcation placements provide a repeating consistency to otherwise inconsistent substrings.

Figure 11:
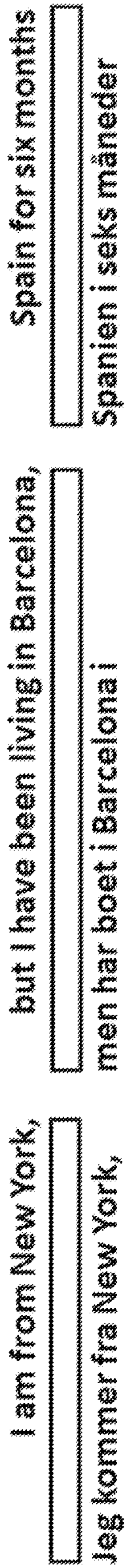
FIG. 11 shows demarcated substring pairs where the secondary substrings are offset from their corresponding primary substrings, according to an embodiment.

FIG. 11 shows demarcated substring pairs, according to an embodiment. Danish primary substrings and English secondary substrings are separated by rectangular demarcations where each English secondary substring is offset from its corresponding Danish primary substring. The rightmost point of each secondary substring is to the right of the rightmost point of its corresponding primary substring. Alternatively, the leftmost point of each secondary substring may be to the left of the leftmost point of its corresponding primary substring. Offsetting secondary substrings from their corresponding primary substrings, in the reading direction of the primary substrings, provides substring arrangements where the primary substrings are introduced before their corresponding secondary substrings. At a glance, such substring placements reduce visual and mental fatigue for a reader focusing on the primary text.

Figure 12A:
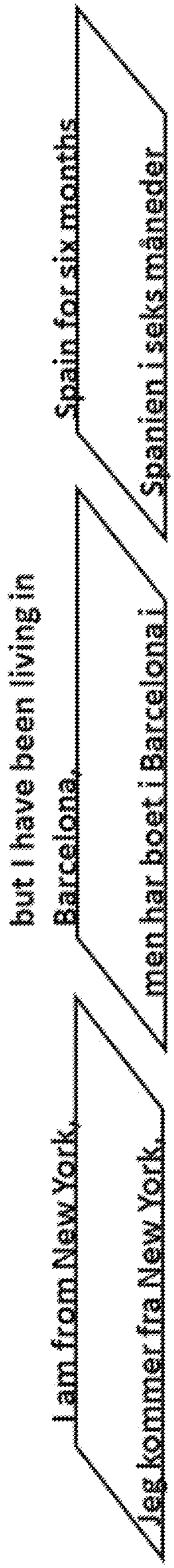
FIGS. 12*a*-12*c* shows demarcated substring pairs where the visual demarcations comprise shapes that cause the secondary substrings to appear on a separate perspective plane relative to their corresponding primary substrings, according to an embodiment.

FIG. 12*a* shows demarcated substring pairs, according to an embodiment. Danish primary substrings and English secondary substrings border parallelogram demarcations. The demarcations comprise shapes that cause the secondary substrings to appear on a separate perspective plane relative to their corresponding primary substrings. Such shapes may include, but are not limited to, shapes with at least one sloped edge such as a parallelogram or trapezoid.

Figure 12B:
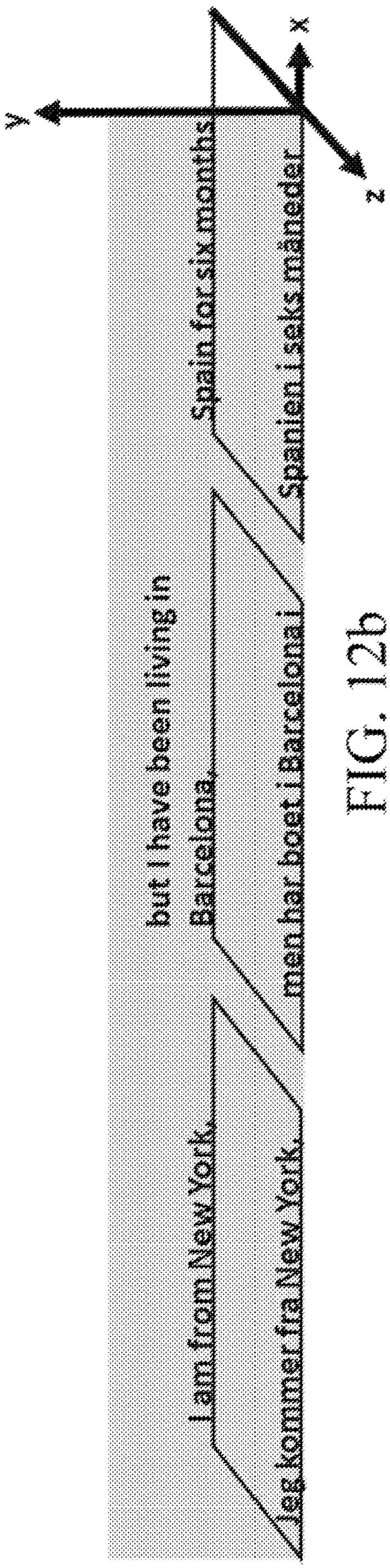
Figure 12C:
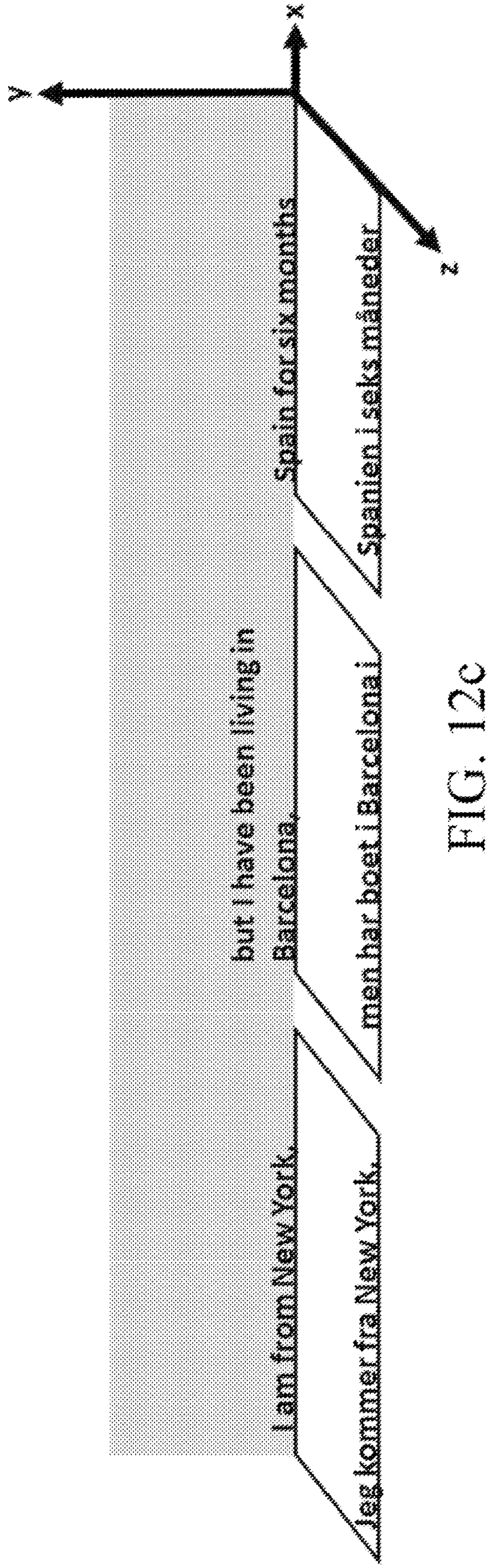

As shown in FIG. 12*b*, the primary substrings are caused to appear on a forward perspective plane due to bordering a bottom edge of the parallelogram demarcations, and, as shown in FIG. 12*c*, the secondary substrings are caused to appear on a recessed perspective plane due to bordering a top edge of the parallelogram demarcations. At a glance, causing the secondary substrings to appear on a recessed perspective plane deemphasizes the secondary substrings relative to the primary substrings, reducing visual and mental fatigue for readers focusing on the primary substrings.

Figure 13:
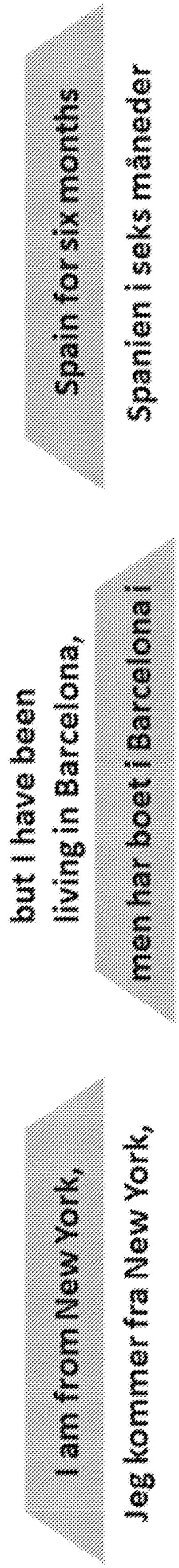
FIG. 13 shows demarcated substring pairs where the visual demarcations border or overlap only one of the substrings.

FIG. 13 shows demarcated substring pairs, according to an embodiment. Danish primary substrings and English secondary substrings overlap trapezoid demarcations. For each substring pair, the visual demarcations border or overlap only one of the substrings. At a glance, such visual demarcation placements delineate paired substrings from each other. Any other such mechanism/means to create substring pairs and visually demarcate them through any representation including, but not limited to a boundary, a shape, or a color based demarcation is well within the scope of the present disclosure.

In another exemplary implementation, system of the present disclosure can allow configuration/definition/modification of any rule based on which the demarcation would take place. For instance, apart from logical phrase-based demarcation, noun/verb/adjective based (i.e. the substring would be formed based on whenever a noun is identified, for instance), or specific character based demarcation can also be defined and undertaken, so as to allow a user to define how he/she would like to see the demarcated sections of pair of substrings. All such variations based on required use cases in different application areas are therefore well within the scope of the present invention.

Figure 14:
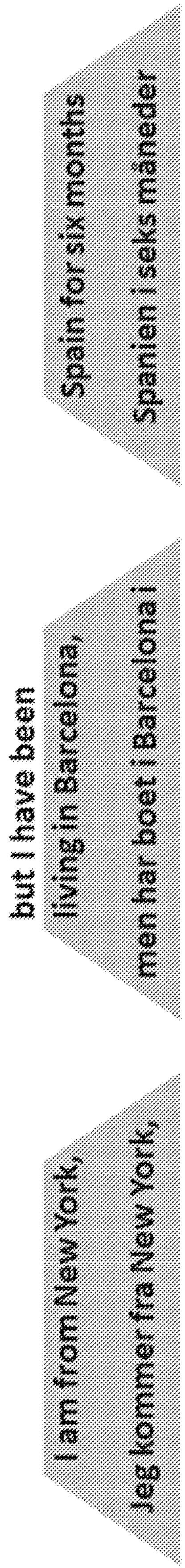
FIG. 14 shows demarcated substring pairs where the visual demarcations border or overlap both of the substrings.

FIG. 14 shows demarcated substring pairs, according to an embodiment. Danish primary substrings and English secondary substrings overlap trapezoid demarcations. The visual demarcations border or overlap both substrings in each substring pair. At a glance, such visual demarcation placements associate paired substrings to each other.

Figure 15:
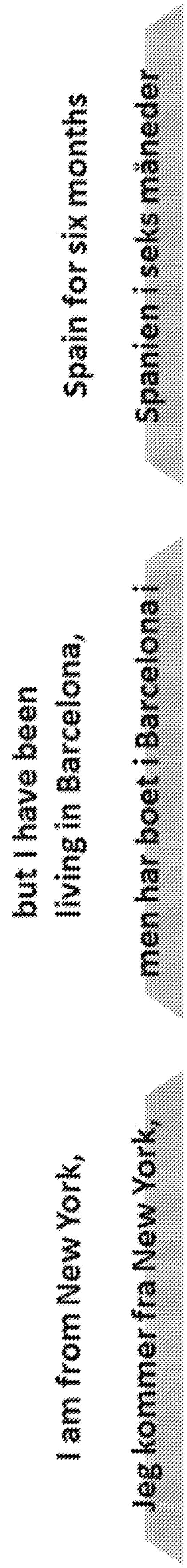
FIG. 15 shows demarcated substring pairs where the topmost point of each visual demarcation overlaps a lower substring in a substring pair.

FIG. 15 shows demarcated substring pairs, according to an embodiment. English secondary substrings are placed above Danish primary substrings that overlap trapezoid demarcations. The topmost point of each visual demarcation overlaps a lower substring in a substring pair. At a glance, such visual demarcation placement causes the visual demarcations to act as a platform, drawing a reader's attention to the platformed substrings.

Figure 16:
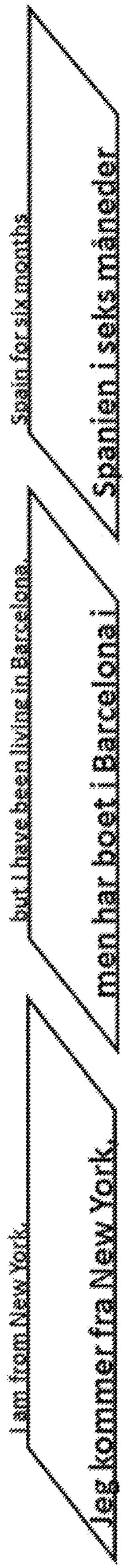
FIG. 16 shows demarcated substring pairs where the font size of each secondary substring is smaller than the font size of its corresponding primary substring, according to an embodiment.

FIG. 16 shows demarcated substring pairs, according to an embodiment. Danish primary substrings and English secondary substrings border parallelogram demarcations where the font size of each English secondary substring is smaller than the font size of its corresponding Danish primary substring. At a glance, using smaller font sizes for the secondary substrings deemphasizes the secondary substrings relative to the primary substrings, reducing visual and mental fatigue for readers focusing on the primary substrings.

Figure 17:
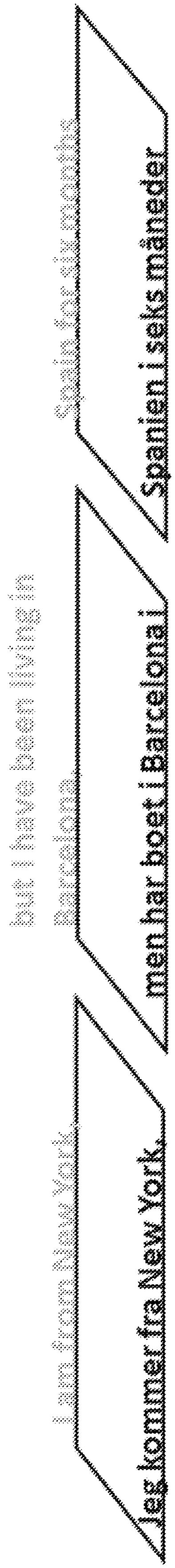
FIG. 17 shows demarcated substring pairs where each secondary substring has a lighter shade than its corresponding primary substring, according to an embodiment.

FIG. 17 shows demarcated substring pairs, according to an embodiment. Danish primary substrings and English secondary substrings border parallelogram demarcations where each English secondary substring has a lighter shade than its corresponding Danish primary substring. At a glance, using lighter shades for the secondary substrings deemphasizes the secondary substrings relative to the primary substrings, reducing visual and mental fatigue for readers focusing on the primary substrings.

Figure 18:
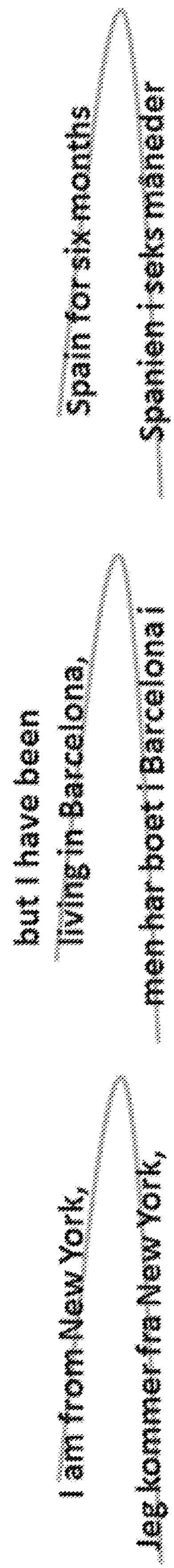
FIG. 18 shows demarcated substring pairs where the demarcations are non-elliptical lines, according to an embodiment.

FIG. 18 shows demarcated substring pairs, according to an embodiment. Danish primary substrings and English secondary substrings overlap non-elliptical line demarcations. One arm of each non-elliptical line demarcation overlaps a primary substring and a second arm of each non-elliptical line demarcation overlaps a secondary substring. At a glance, such visual demarcations simultaneously delineate and associate substrings within substring pairs.

Figure 19:
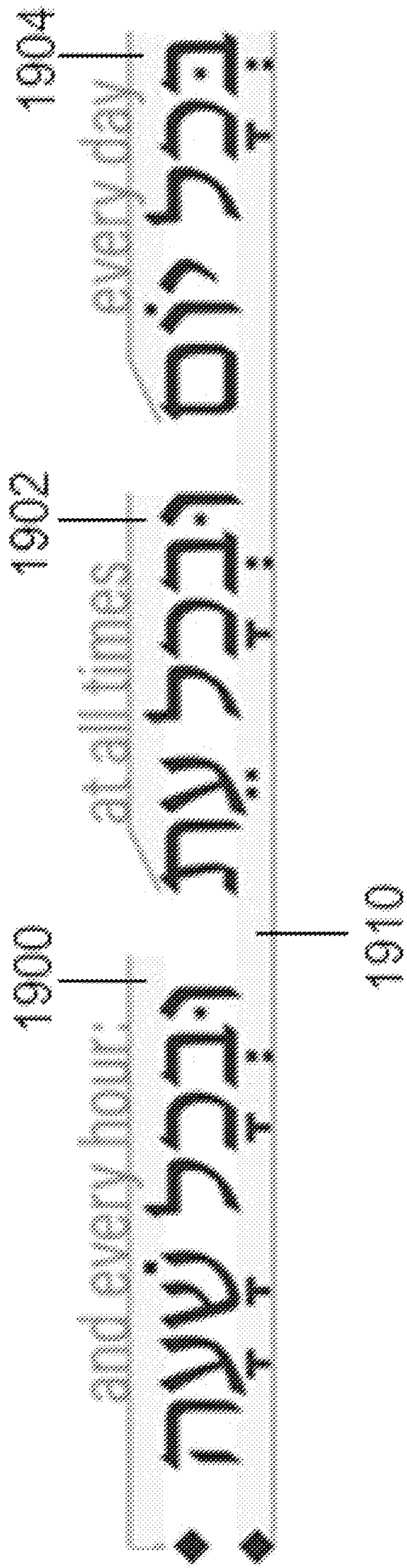
FIG. 19 shows demarcated substring pairs where one of the demarcations overlaps each of the primary substrings, according to an embodiment.

FIG. 19 shows demarcated substring pairs, according to an embodiment. Hebrew primary substrings and English secondary substrings overlap quadrilateral demarcations 1900 1902 1904. Furthermore, a rectangular demarcation 1910 overlaps each of the primary substrings. Alternatively, a visual demarcation may overlap each of the secondary substrings. At a glance, by overlapping multiple primary substrings, such visual demarcations associate adjacent primary substrings to each other. Such visual demarcations may also indicate a superstructure of multiple string pairs such as phrases or sentences.

Figure 20:
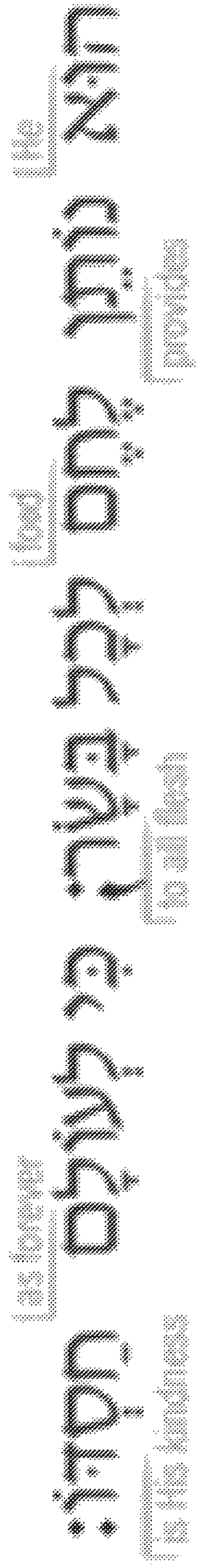
FIG. 20 shows demarcated substring pairs where the demarcation is an implied transparent oblique parallelogram with at least two shadow-outlined edges, according to an embodiment.

FIG. 20 shows demarcated substring pairs, according to an embodiment. Hebrew primary substrings and English secondary substrings overlap shadow-outlined edges of an implied transparent oblique parallelogram.

Figure 21:
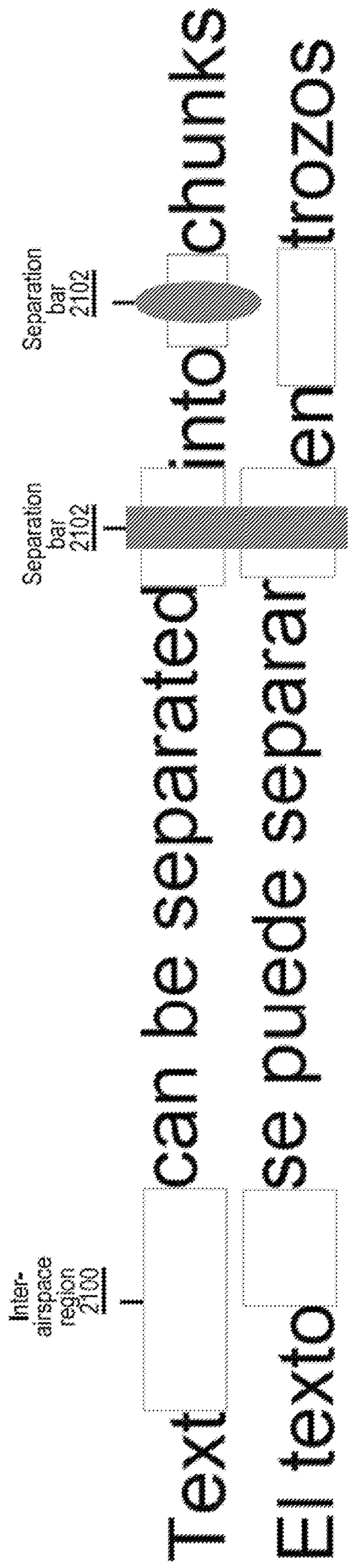

In an aspect, as illustrated in FIG. 21, visual demarcation can be configured through an inter-airspace region 2100 that can be configured as a rectangular space in between adjacent text segments. The left edge of each inter-airspace region can be immediately to the right of the rightmost point of the text segment to its left, the right edge of each inter-airspace region is immediately to the left of the leftmost point of the text segment to its right, the top edge of each inter-airspace region is flush with the higher of one of the top edge of the text segment to its left and the top edge of the text segment to its right, and the bottom edge of each inter-airspace region is flush with the lower of one of the bottom edge of the text segment to its left and the bottom edge of the text segment to its right. As illustrated in FIG. 21, one of the inter-airspace regions is located in between the text segment "Text," and the text segment "can be separated." The left edge of the inter-airspace region can be immediately to the right of the rightmost point of the "t" in "Text," the right edge of the inter-airspace region 2100 is immediately to the left of the leftmost point of the "c" in "can," the top edge of the inter-airspace region 2100 is flush with the topmost points of the "b," "t," and "d," in "can be separated," and the bottom edge of the inter-airspace region 2100 is flush with the bottommost points of the "T," "e," "x," and "t," in "Text." Inter-airspace regions can be left empty or filled with separation bars to achieve different purposes, depending on user preference. FIG. 21 further discloses a separation bar 2102 that can be configured as a shaped marker placed in the inter-airspace region of adjacent text segments that can function to distinguish adjacent text segments from each other, where the shaped marker is, for example, but not limited to, a rectangle, line, square, oval, and the like. As illustrated in FIG. 21, one separation bar 2102 is rectangular and enters two inter-airspace regions, and the other separation bar 2102 is oval and enters a single inter-airspace region.

Figure 22A:
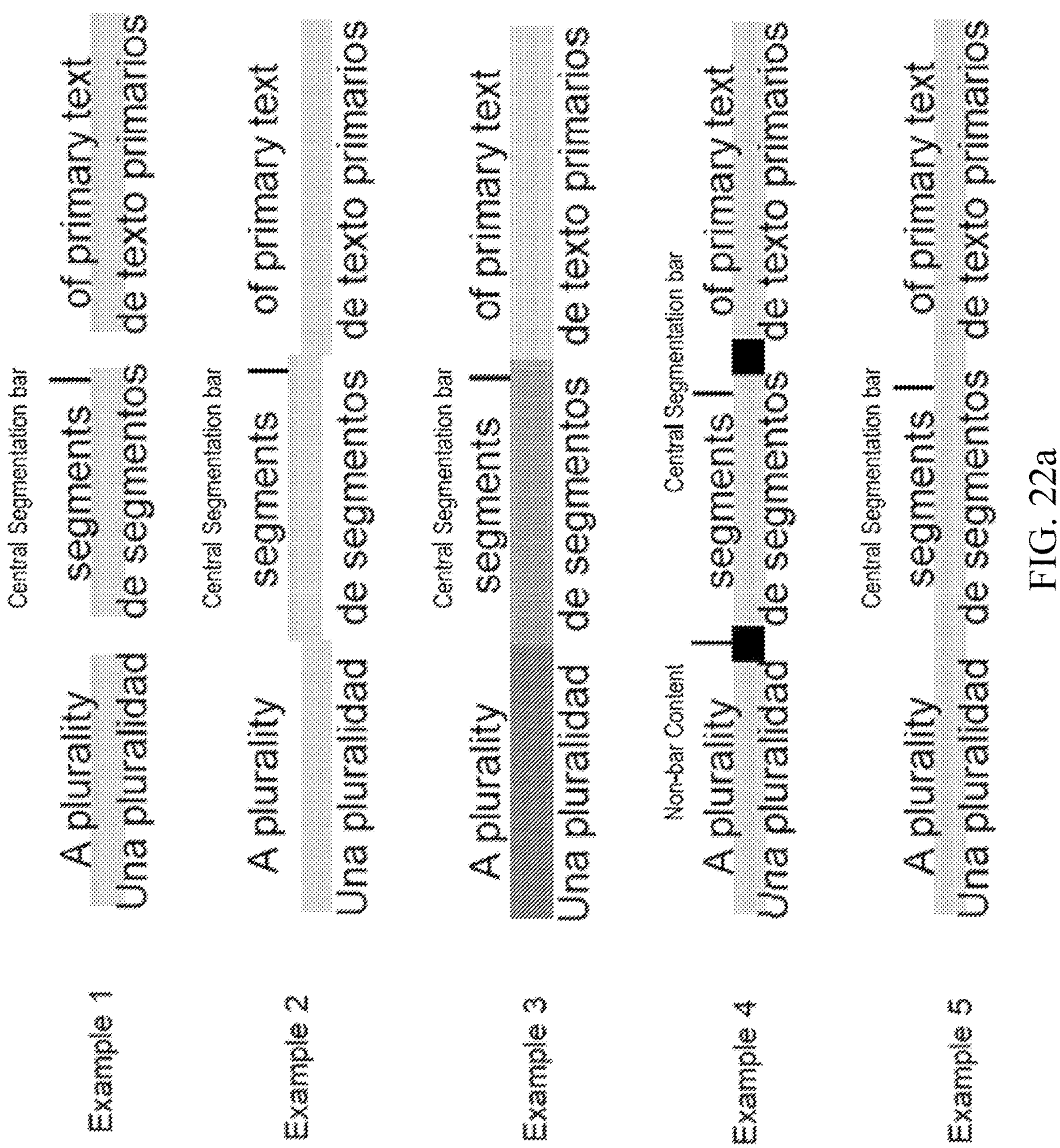
Figure 22B:
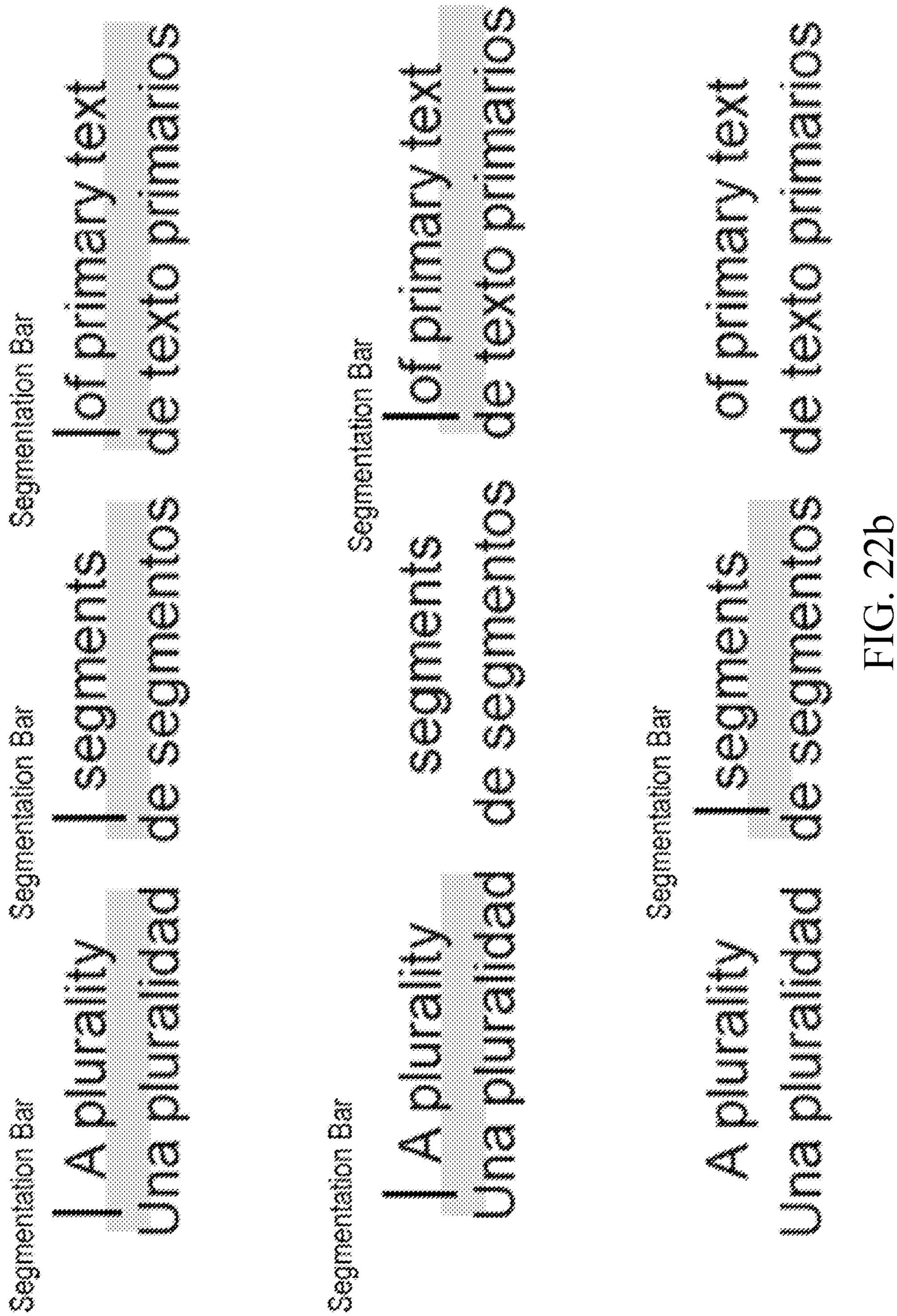
Figure 22C:
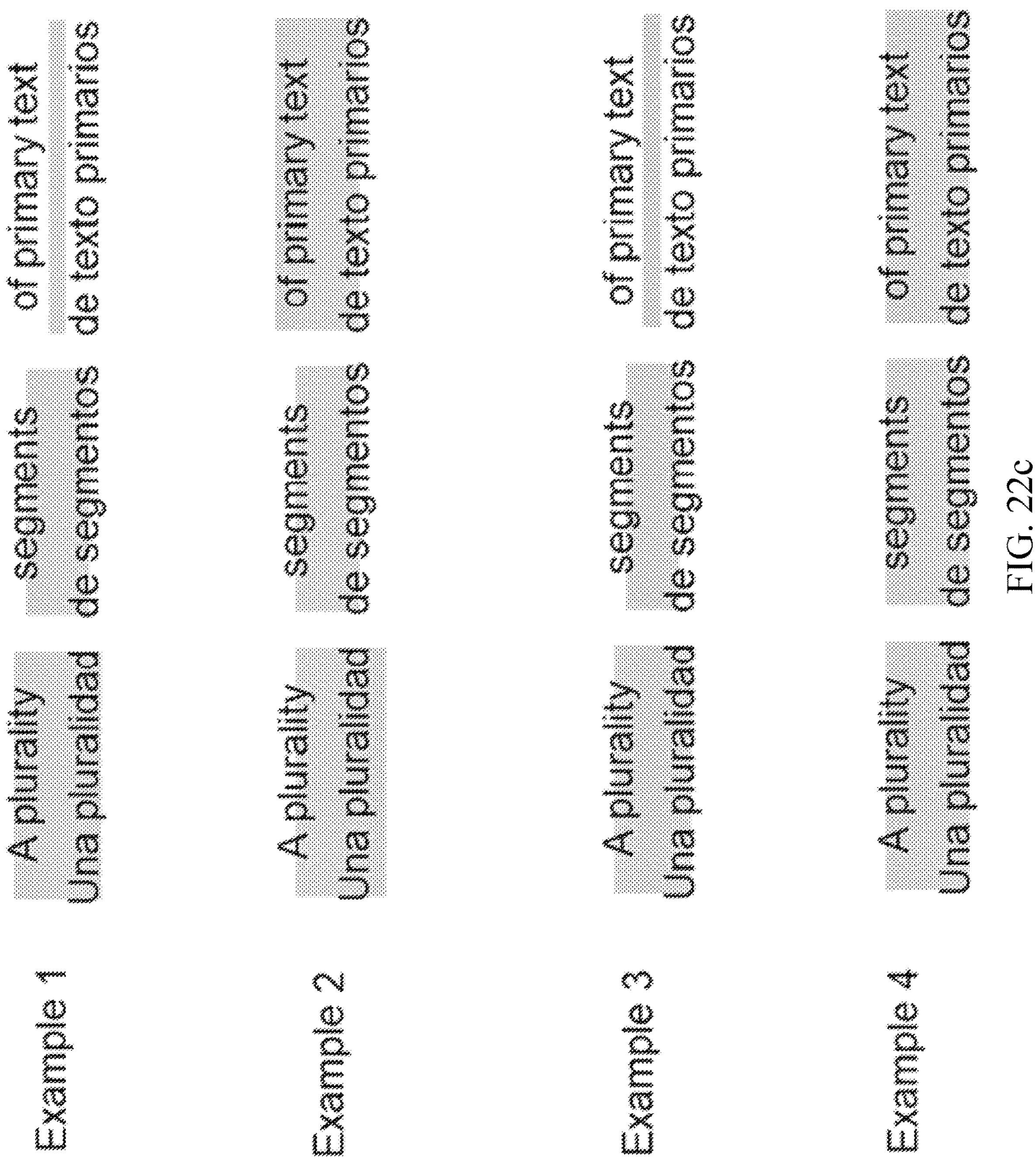
Figure 22E:
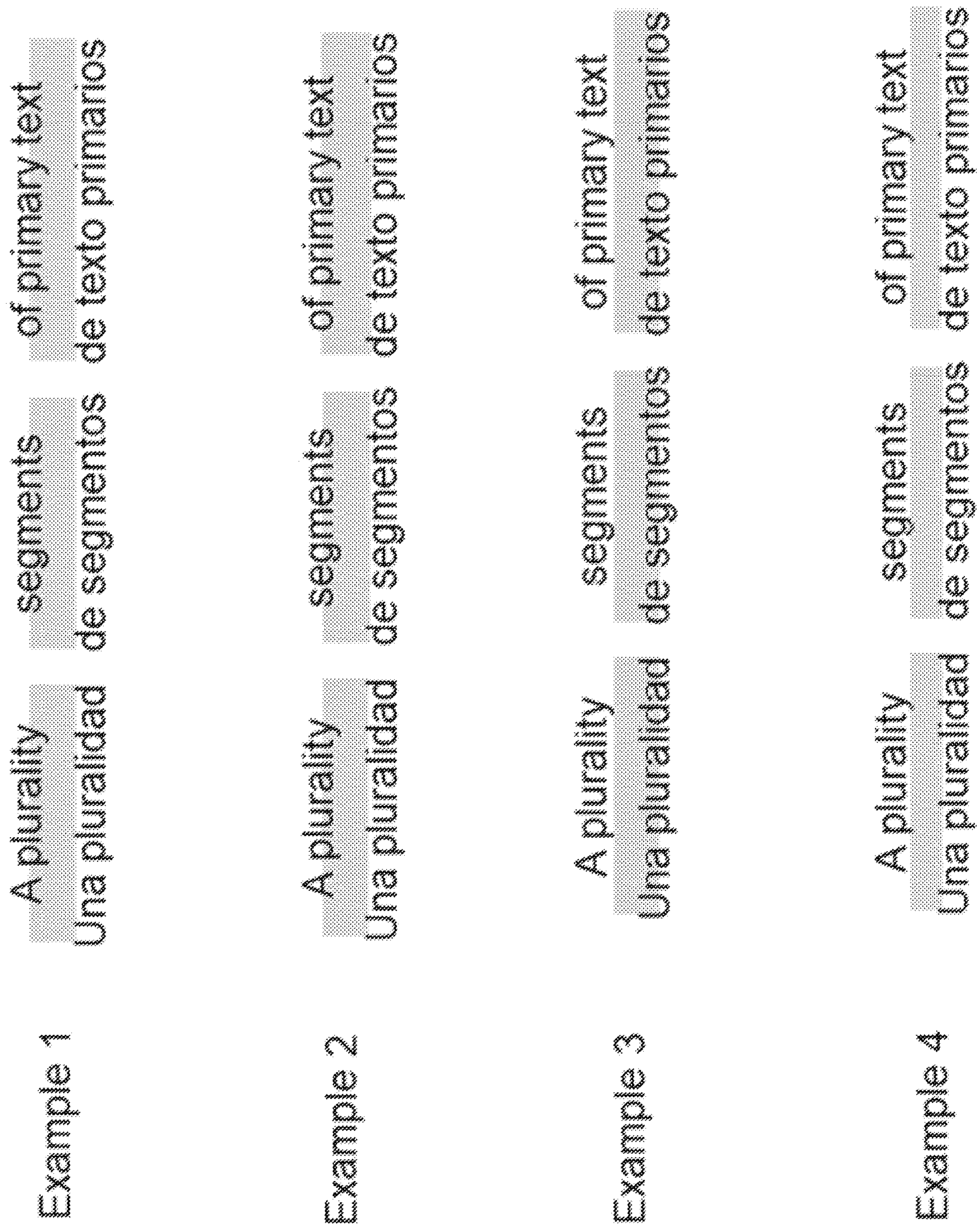
Figure 22F:
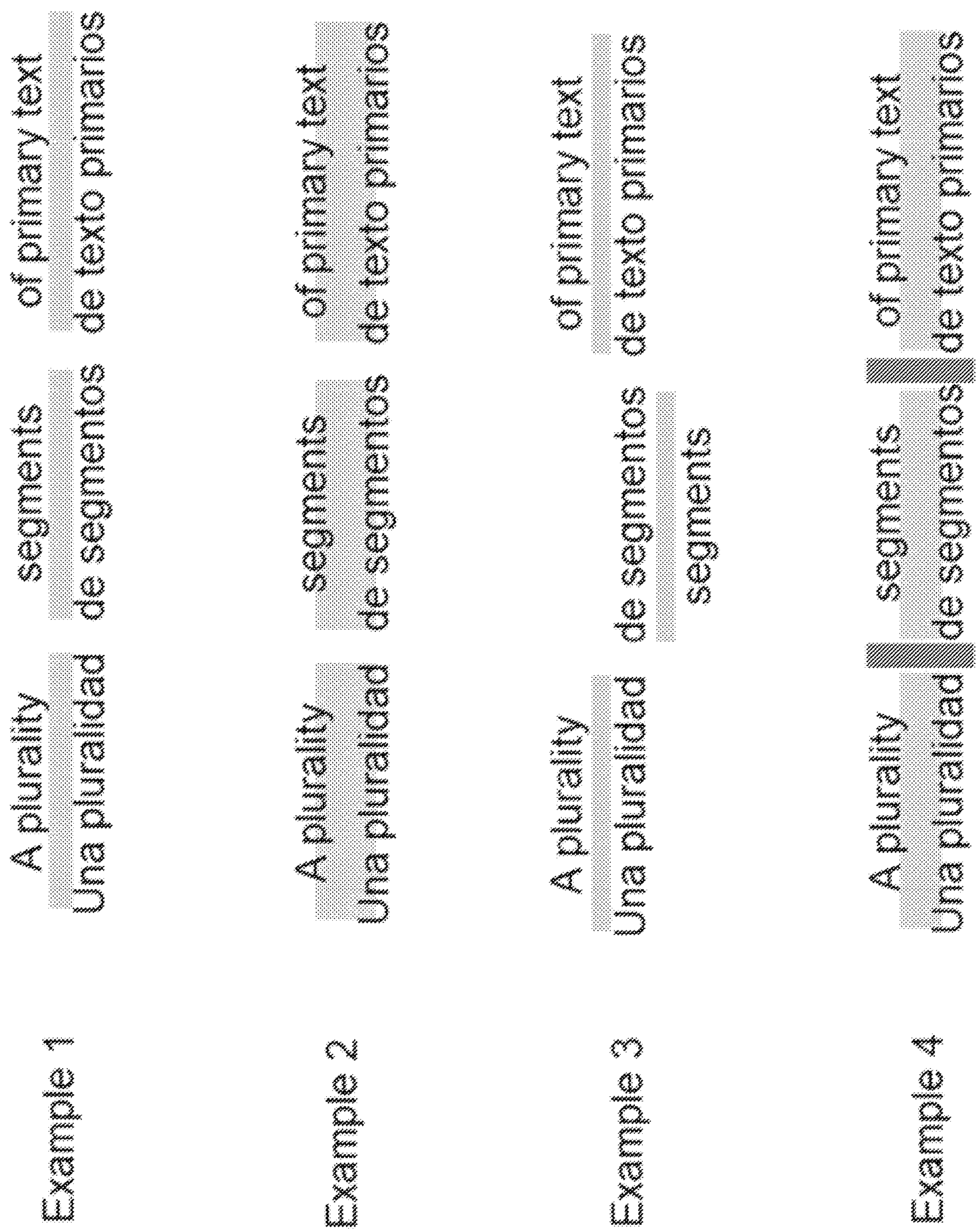
Figure 22G:
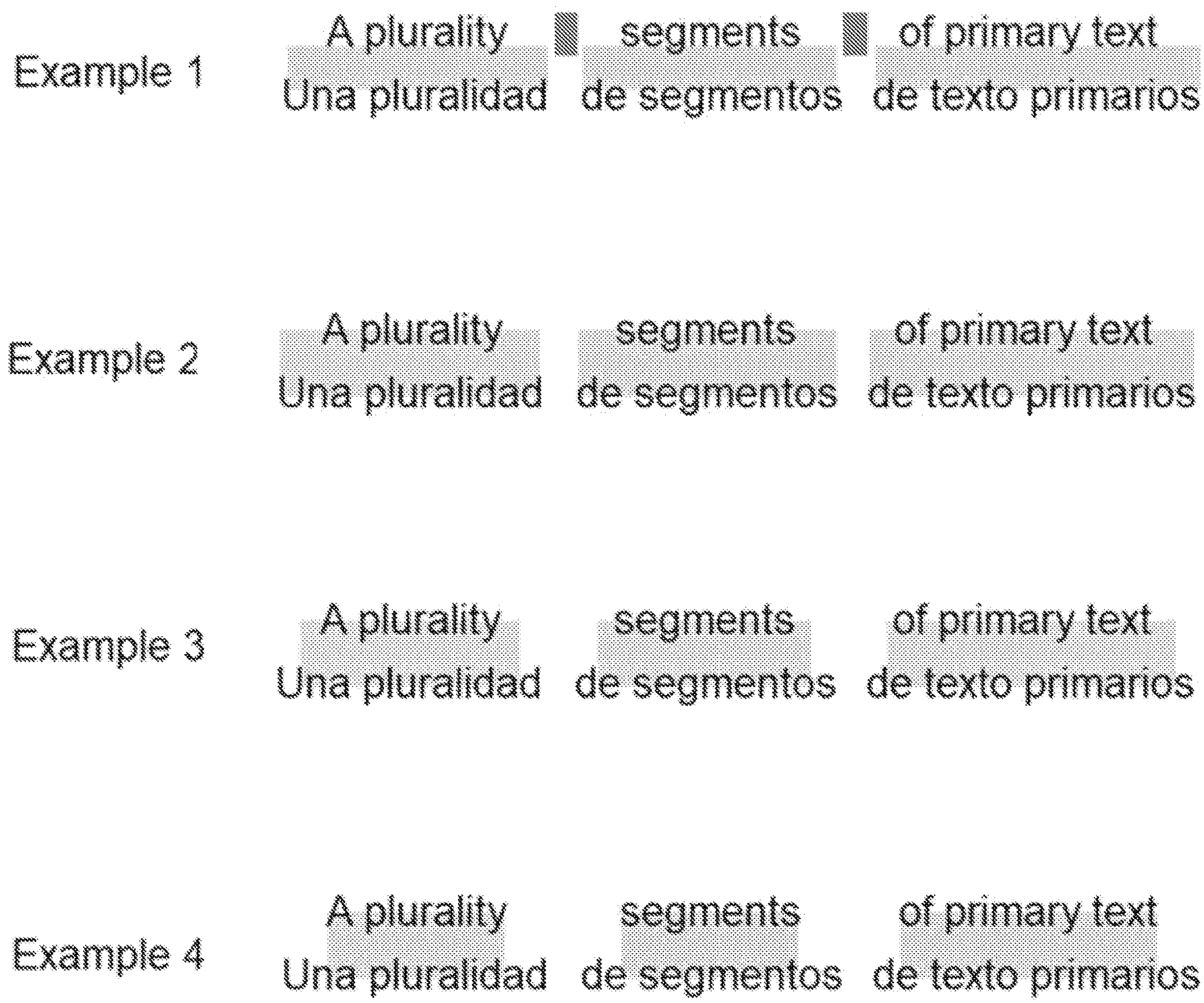
Figure 22I:
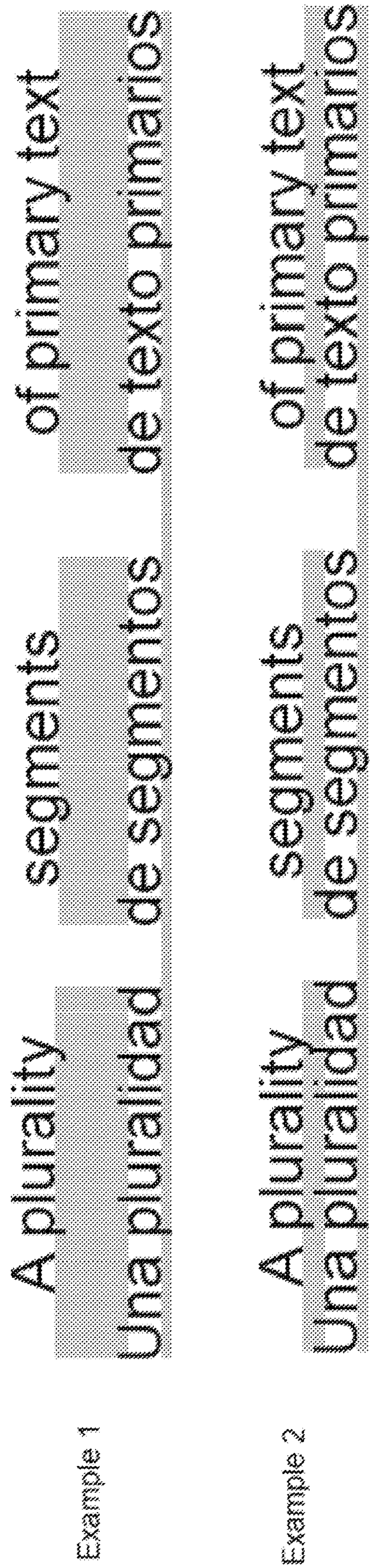
Figure 22J:
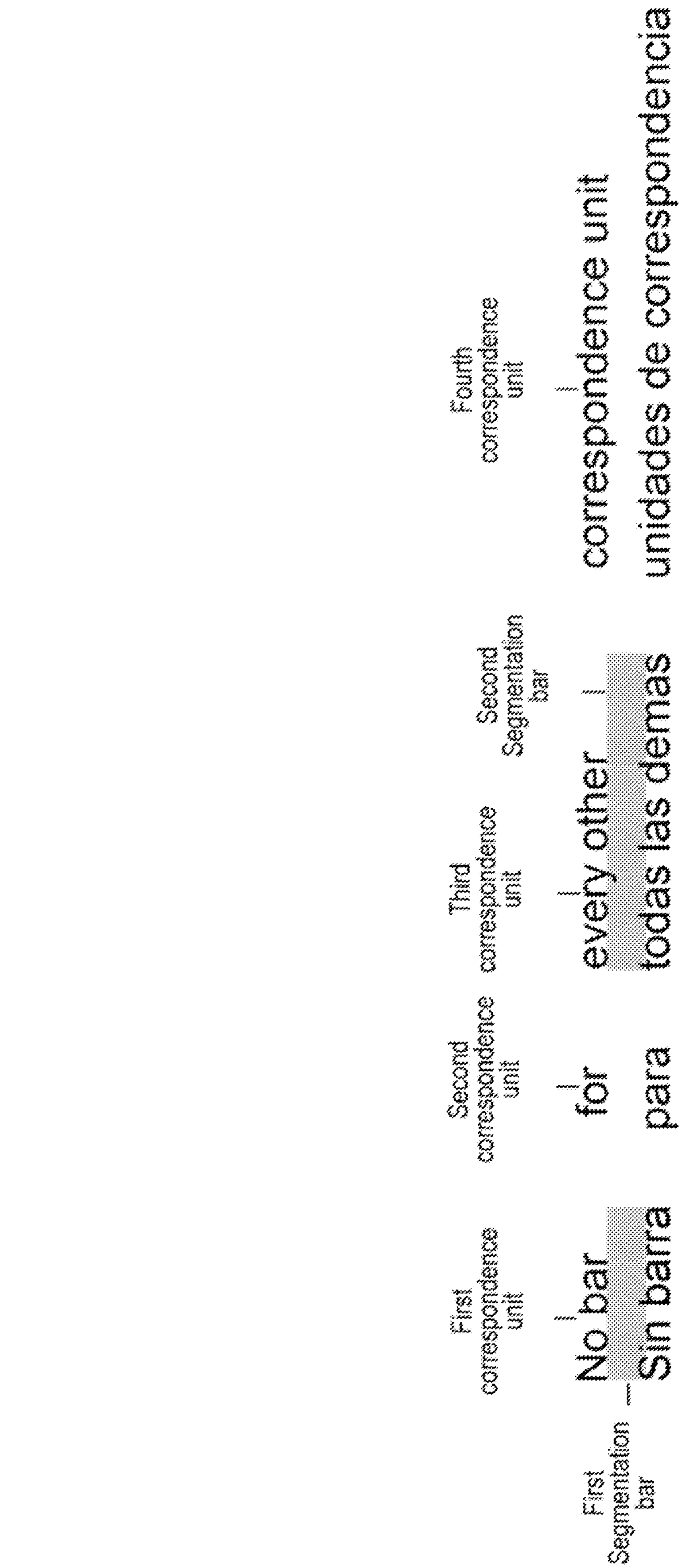
Figure 22K:
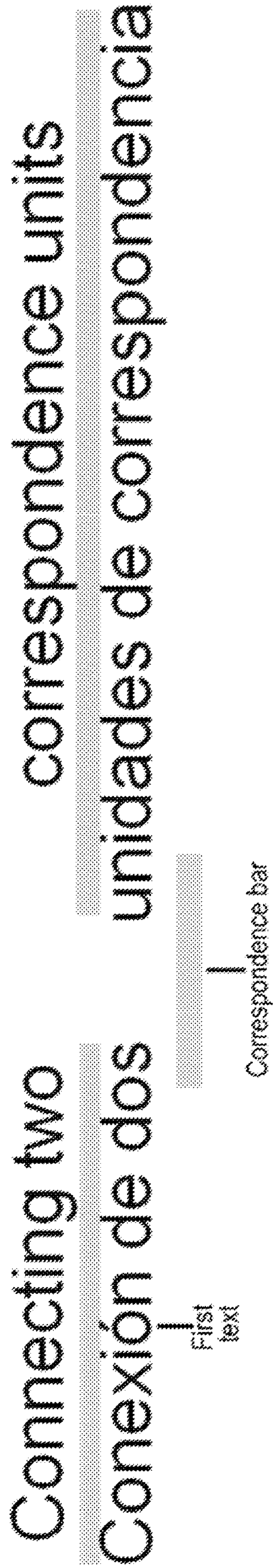
Figure 221:
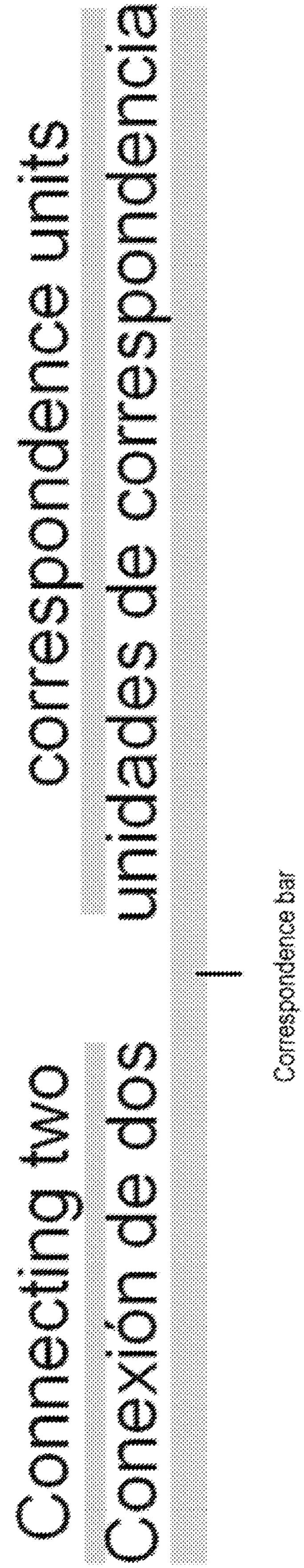
Figure 22M:
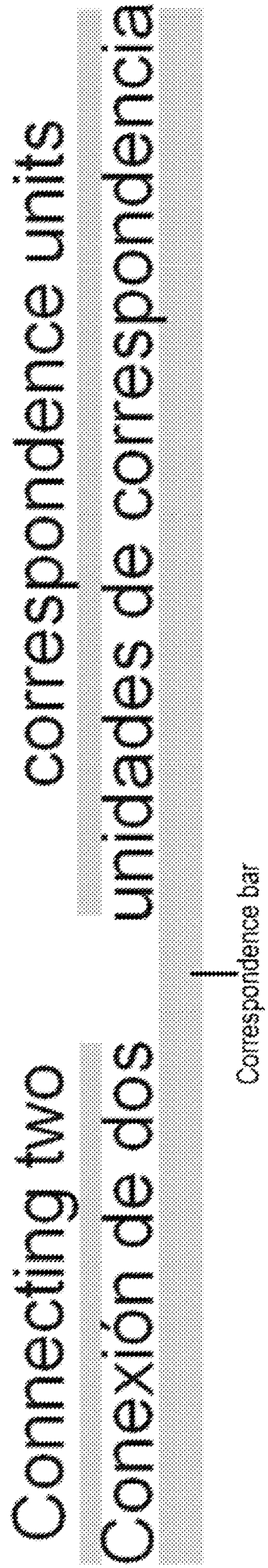
Figure 22N:
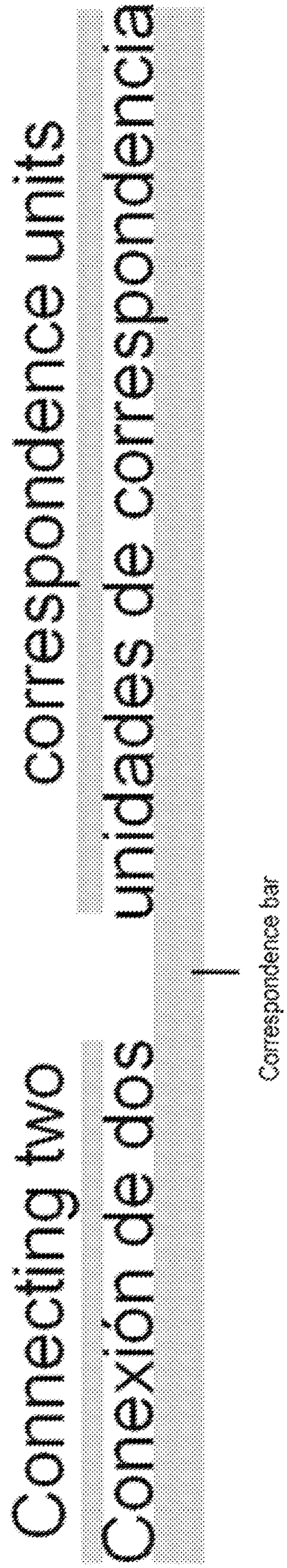
Figure 22O:
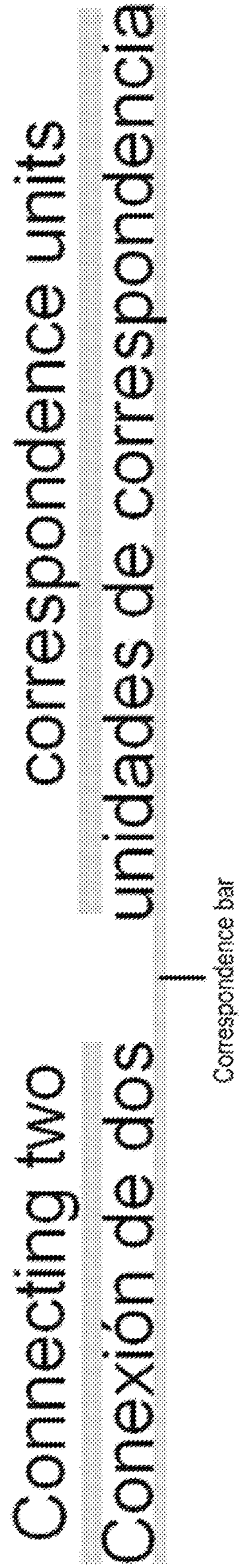
Figure 22P:
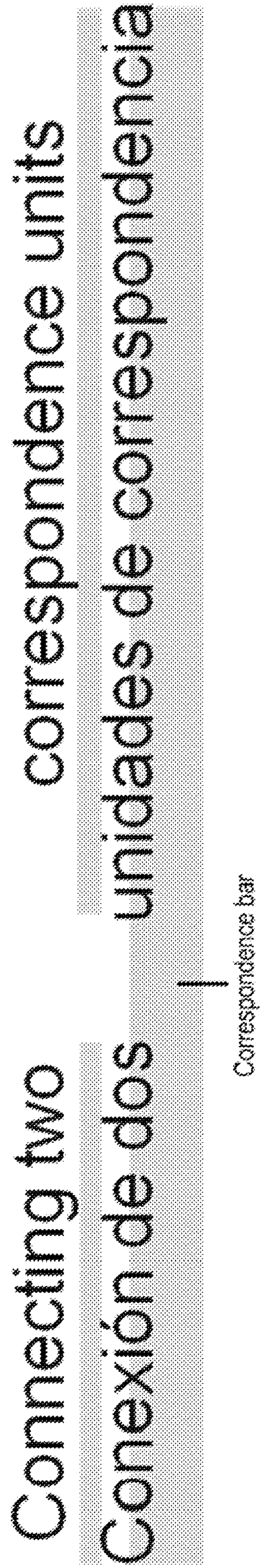
Figure 22Q:
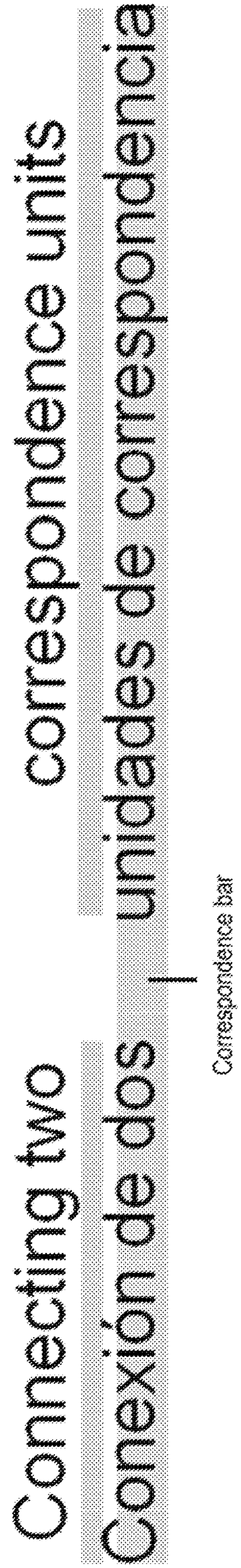
Figure 22R:
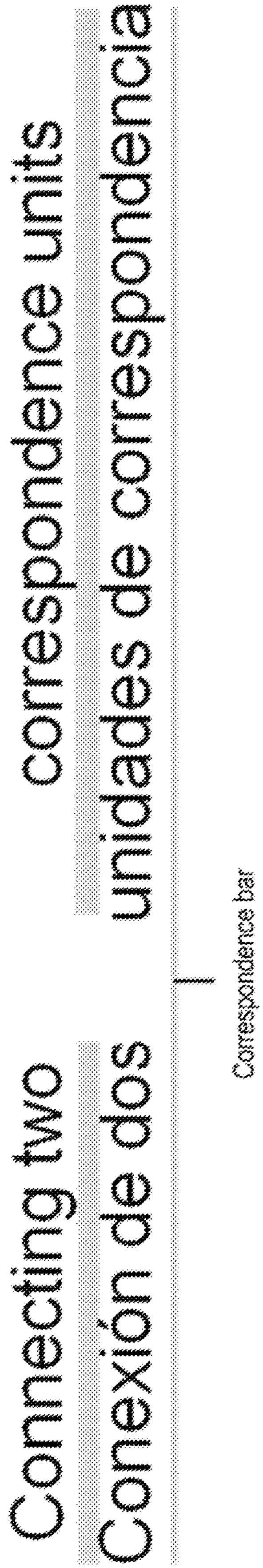
Figure 22S:
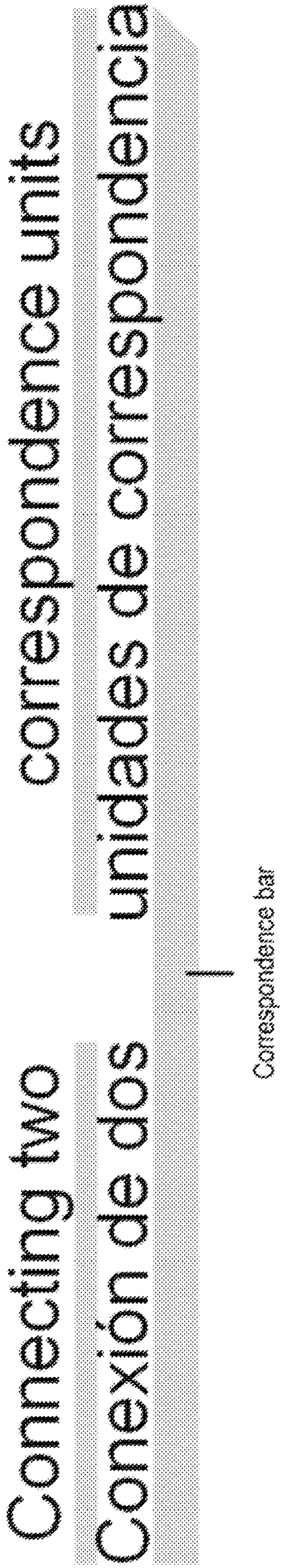
Figure 22T:
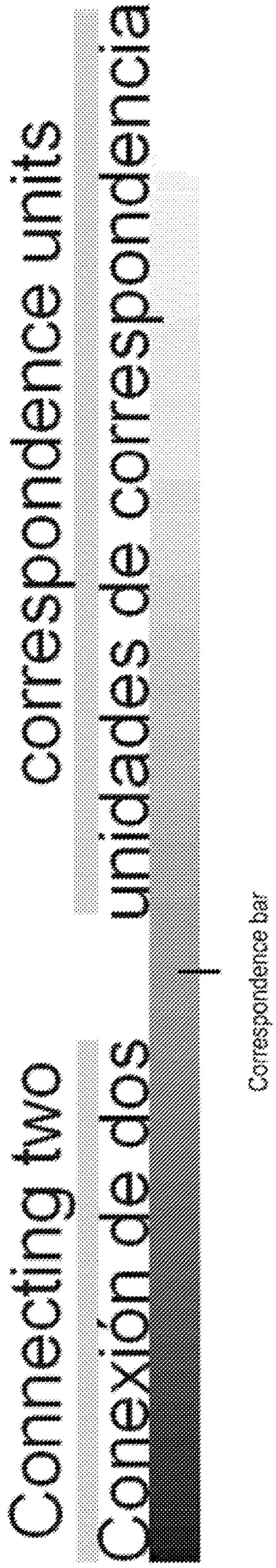
Figure 22U:
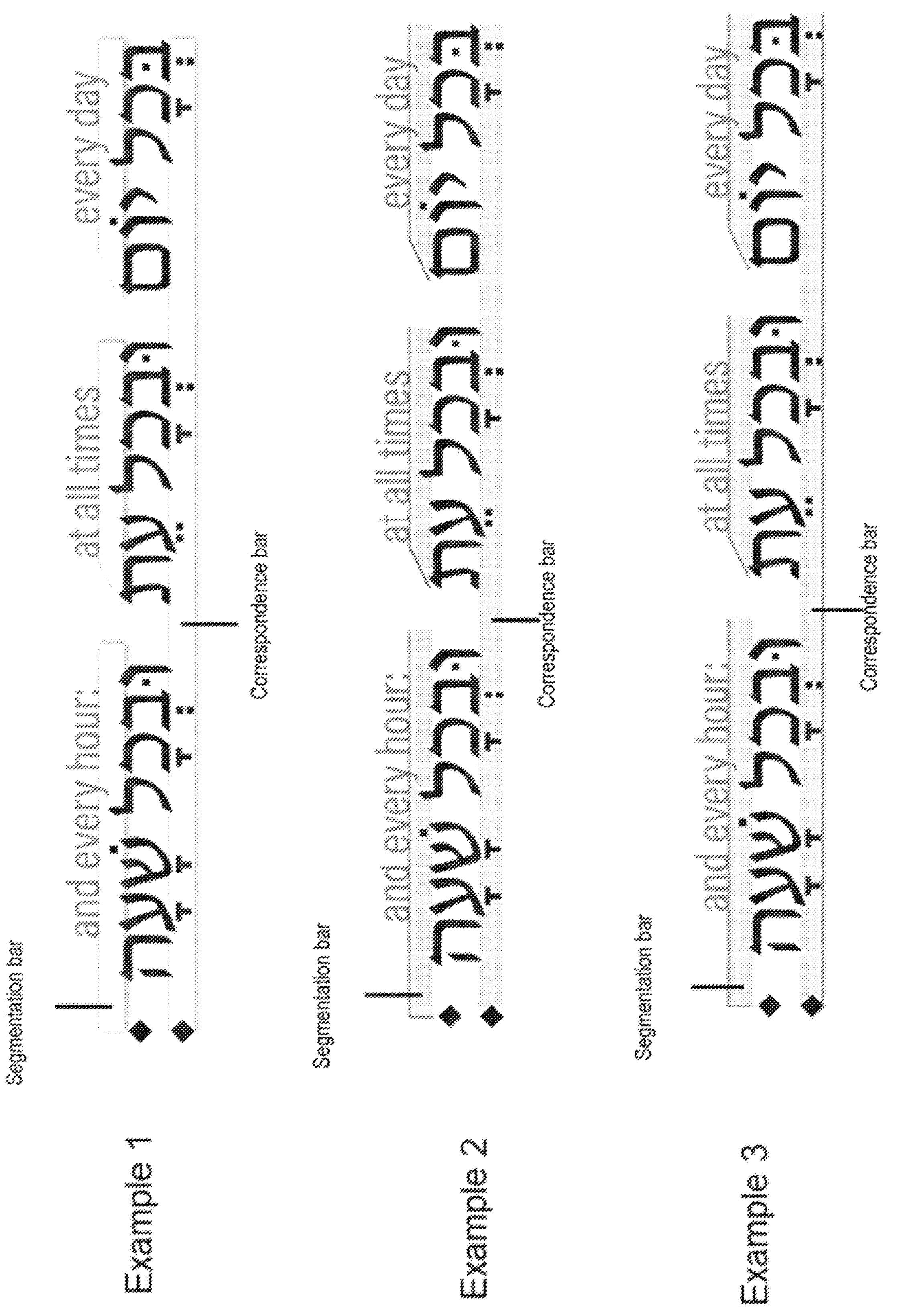
Figure 22V:
Figure 22W:
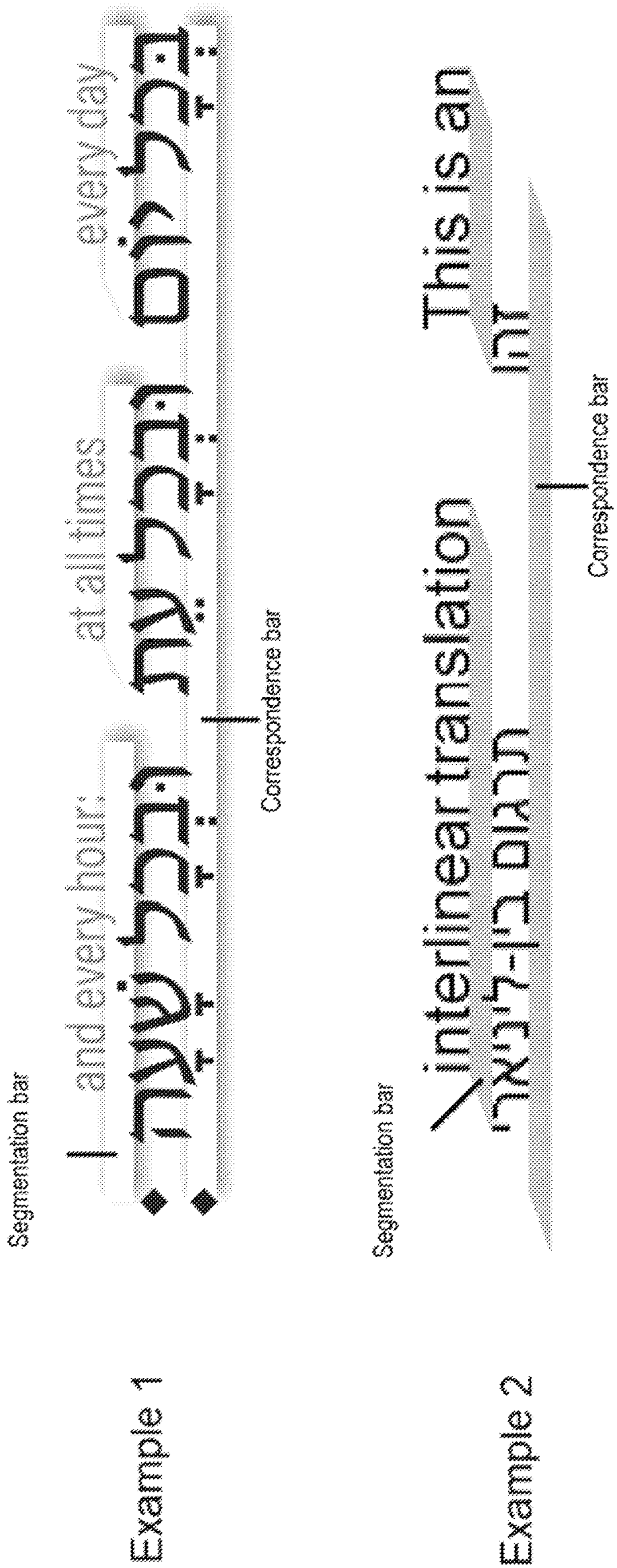
Figure 22X:
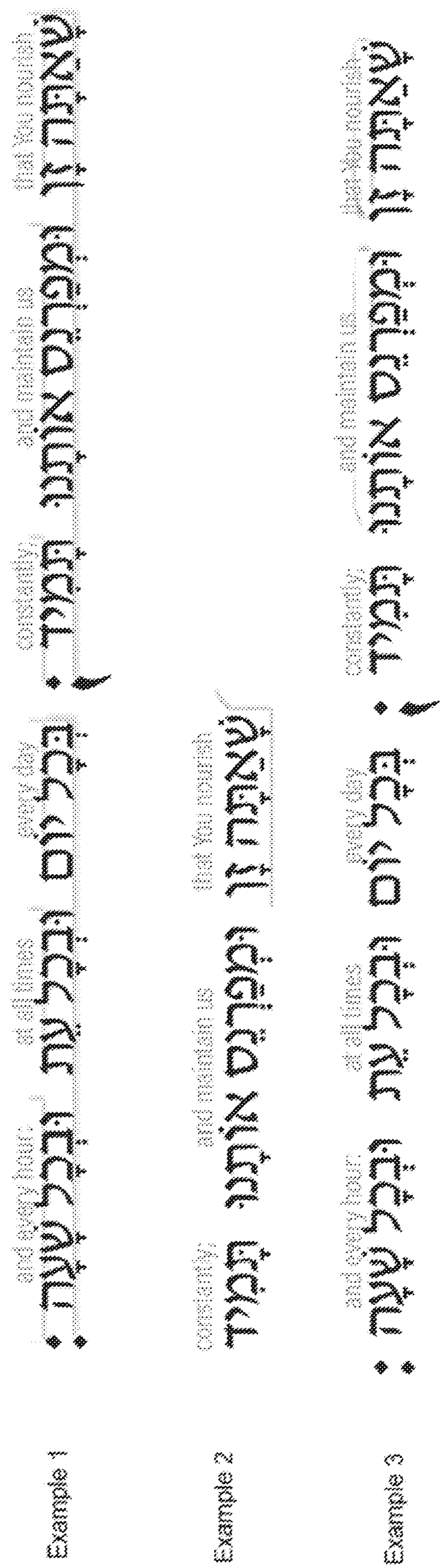
Figure 22Y:
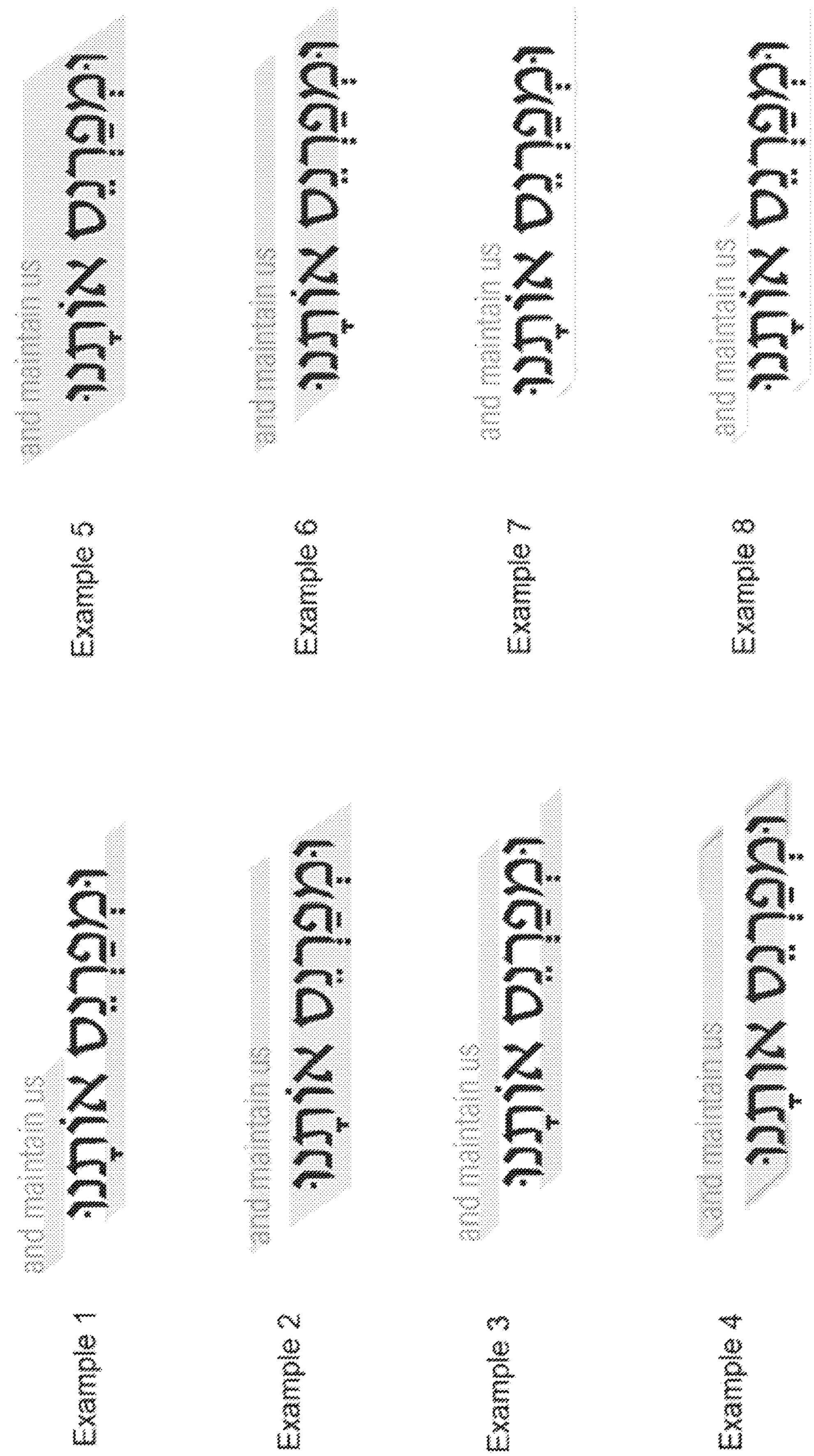
Figure 22Z:
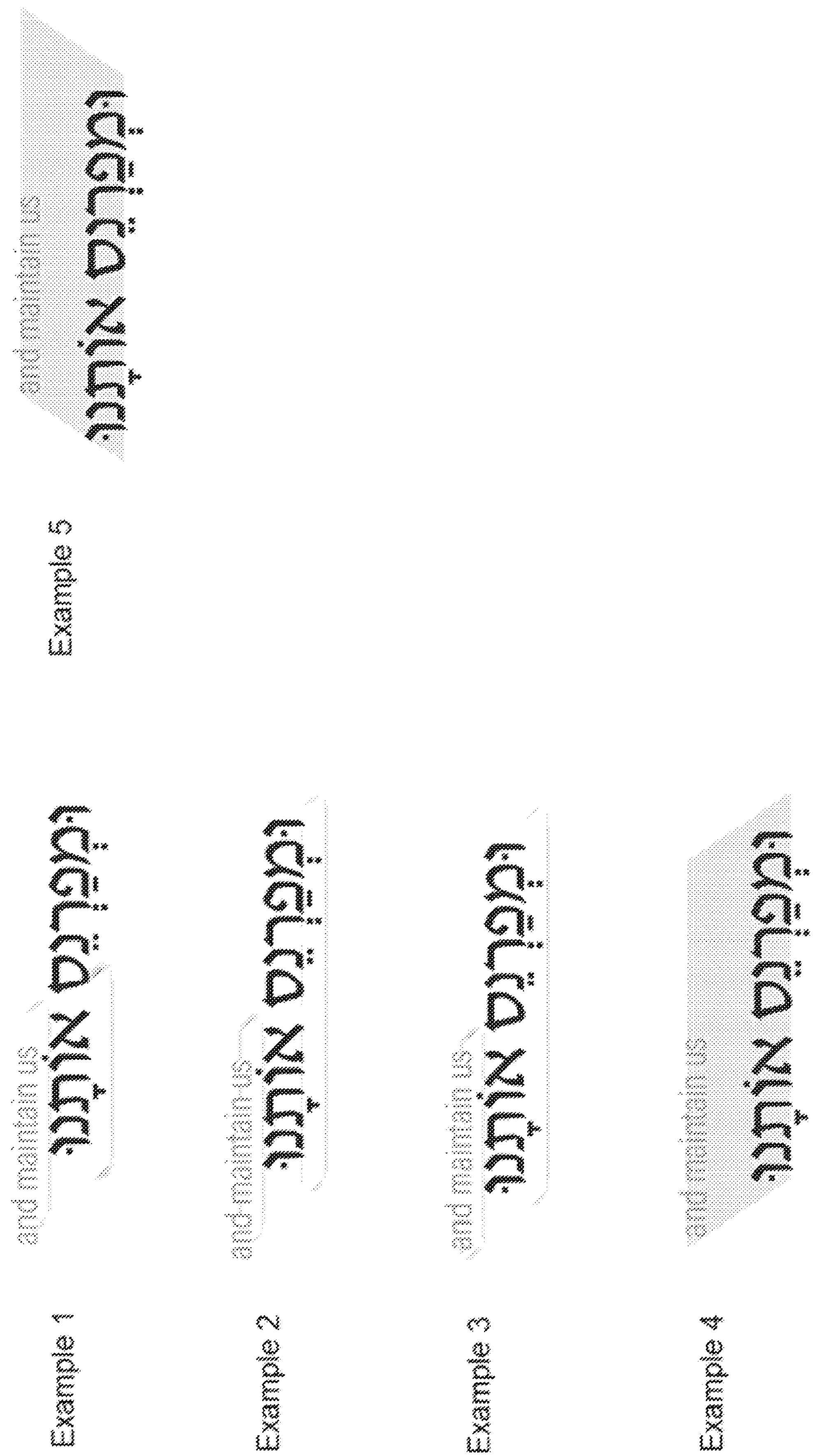

FIGS. 22*a*-22*z* illustrate further non-limiting examples of the visual demarcations, all of which are well within the scope of the present disclosure/invention and are also well encompassed within the definition of visual demarcations.

In an aspect, as illustrated, visual demarcation can be created based on one or more segmentation bars to the left of the segmentation bar or another segmentation bar to the right of the segmentation bar, the segmentation bar may be colored, patterned, placed, or otherwise modified such that it is distinct from the other adjacent segmentation bars. For example, as illustrated in the instant figures, a central segmentation bar is distinct because there is empty space in between the bars, creating a clear distinction between the ends of the central segmentation bar and the ends of adjacent segmentation bars. As illustrated in other examples, the central segmentation bar may be distinct because the bottom and top edges of central segmentation bar are at different levels from the bottom and top edges of adjacent segmentation bars, creating a clear distinction between the ends of the central segmentation bar and the ends of adjacent segmentation bars. The central segmentation bar may further be distinct from adjacent segmentation bars because the bars have different colors, creating a clear distinction between the ends of the central segmentation bar and the ends of adjacent segmentation bars. As illustrated, the central segmentation bar can be distinct because there is non-bar content in between the segmentation bars, creating a clear distinction between the ends of the central segmentation bar and the ends of adjacent segmentation bars. As illustrated in other examples, the central segmentation bar is not distinct from adjacent segmentation bars because there is no clear distinction between the ends of the central segmentation bar and the ends of adjacent segmentation bars.

In another embodiment, at least one segmentation bar can be placed into every other correspondence area. For example, as illustrated in FIG. 22*b*, there is a segmentation bar in the first correspondence area, no segmentation bar in the second correspondence area, and a segmentation bar in the third correspondence area. In another example, at least one segmentation bar can be placed into at least one third of correspondence areas. For example, as illustrated in FIG. 22*b*, there is no segmentation bar in the first correspondence area, a segmentation bar in the second correspondence area, and no segmentation bar in the third correspondence area.

In another embodiment, demarcations include a plurality of segmentation bars and at least one demarcation that delineates a text string pair from at least one other text string pair. For example, vertical dark grey bars delineate text string pairs from each other in example 4 of FIG. 22*f*. Alternatively, demarcations include a plurality of segmentation bars and at least one demarcation that delineates a text string pair from at least two other text string pairs. The use of segmentation bars and such demarcations in between text string pairs defines substructures and superstructures of the text string. Such demarcations in between text string pairs may appear as punctuation.

In a further embodiment, FIG. 22 towards the end further presents a box-free display of an alternative embodiment in which the segmentation bars and the correspondence bar are transparent and outlined with a light shadow effect. This appearance for the segmentation bars and the correspondence bar makes them less prominent while maintaining the same functionality. Further examples are showing a top portion of the segmentation bars outlined with a thin line that is darker than the inside of the segmentation bars. This appearance for the segmentation bars improves their ability to act as a platform for the text above them.

Further examples show an alternative embodiment in which a bottom portion of the correspondence bar is outlined with a thin line that is darker than the inside of the correspondence bar. This appearance for the segmentation bars and correspondence bar improves the correspondence between the top and bottom texts.

In an alternative embodiment, any combination of the edges of the segmentation bars and correspondence bar may be outlined with a thin line that is darker than the inside of the segmentation bars and/or the correspondence bar. In an alternative embodiment, the thin line may be any color and/or pattern that is different from the color and/or pattern of the inside of the segmentation bars and/or the correspondence bar.

In another alternative embodiment, all of the edges of the segmentation bars and the correspondence bar can be outlined with a thin line that is darker than the inside of the segmentation bars and/or the correspondence bar. Further examples present a final box-free display of an alternative embodiment in which the segmentation bars and the correspondence bar are gradually faded from bottom to top, indicating that any vertically adjacent correspondence units should be read from bottom to top. In an alternative embodiment, the gradual fading may occur in any direction, indicating that the vertically adjacent correspondence units should be read in the direction of the gradual fade. In an alternative embodiment, a user may select the direction of the gradient based on user preference.

In a further embodiment, the segmentation bars and the correspondence bar can be parallelograms with angled left and right edges, wherein the top right edges of the segmentation bars and the correspondence bar appear to be pointing to the right, which indicates to the reader that the directionality of the top text is to the right while the bottom left edges of the segmentation bars and the correspondence bar appear to be pointing to the left, which indicates to the reader that the directionality of the bottom text is to the left. This effect may be compounded by placing the top texts to the right of the bottom texts as seen here.

Figure 23A:
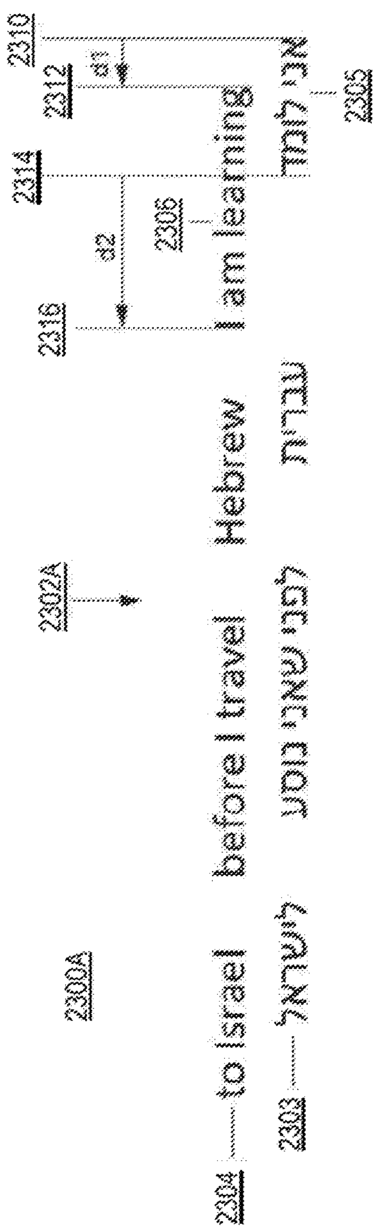
Figure 23B:
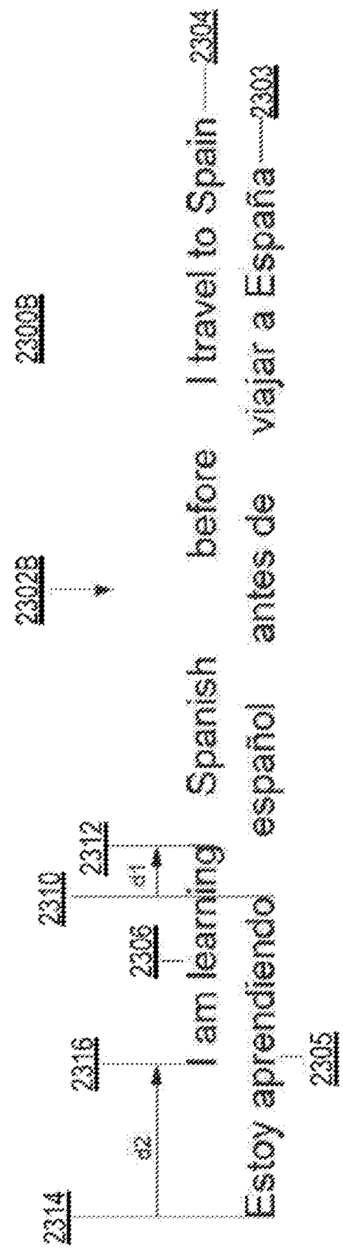

FIGS. 23*a*-23*b* show a series of exemplary display schemes/formats 2300A-2300B of a primary text string 2303 and a secondary text string 2304 where secondary text segments are offset from their corresponding primary text segments, according to an embodiment. Such offset therefore is indicative of a visual demarcation that enables pair of substrings to be visually demarcated from each other through different and respective correspondence areas.

FIG. 23*a* shows a comparative-text display format (CTDF) 2300A that can employ a related text layout 2302A. The text layout 2302A for the CTDF 2300A can include arranging the primary and secondary text segments such that 1) secondary text segments 2306 are one of above and below their corresponding primary text segments 2305 and 2) secondary text segments 2306 are offset relative to their corresponding primary text segment 2305 such that rightmost point 412 of each secondary text segment is to the left of the rightmost point 2310 of each corresponding primary text segment by at least distance d1 and the leftmost point 2316 of each secondary text segment is to the left of the leftmost point 2314 of each corresponding primary text segments by at least distance d2, where d1 and d2 may be any distance greater than zero. Alternatively, d1 may be any distance greater than zero and d2 may be a width of at least a syllable of the secondary text segment 2306.

This CTDF 2300A can be used where the primary text has a right-to left directionality like with Hebrew. In contrast to the prior art, if one attempted to study the Hebrew of FIG. 23*a* by reading from right to left, he or she would encounter a Hebrew text segment 2305 before the English text segment 2306. Such text arrangements introduce texts one at a time, and in an order which allows a student to read a foreign text segment before deciding whether or not to reference the corresponding native language text segment for a better understanding.

FIG. 23*b* shows a comparative-text display format (CTDF) 2300B that can employ a related text layout 2302B. The text layout 2302B for the CTDF 2300B can include arranging the primary and secondary text segments such that 1) secondary text segments 2306 are one of above and below their corresponding primary text segments 2305 and 2) secondary text segments 2306 are offset relative to their corresponding primary text segment 2305 such that rightmost point 2312 of each secondary text segment is to the right of the rightmost point 2310 of each corresponding primary text segment by at least distance d1 and the leftmost point 2316 of each secondary text segment is to the right of the leftmost point 2314 of each corresponding primary text segments by at least distance d2, where d1 and d2 are greater than zero. Alternatively, d1 may be greater than zero and d2 may be a width of at least a syllable of the secondary text segment 2306.

This CTDF 2300B can be used where the primary text has a left-to-right directionality like with English. The benefits of CTDF 2300B are similar to those of CTDF 2300A. It should be appreciated that the primary text segments in the primary text string 2303 may be further distinguished from the secondary text segments in the secondary text string 2304 by modifying the text strings. For example, by creating a size discrepancy between the primary and secondary text strings (e.g., the text of primary text string 2303 is larger than the text of secondary text string 404 in FIG. 23*c*), by modifying the fonts of the primary and/or secondary text strings (e.g., the text of the primary text string 2303 is bolded in FIG. 23*c* and the text of the secondary text string 404 is italicized in FIG. 23*d*), by modifying the color and/or pattern of the primary and/or secondary text strings (e.g., the color of the text of the secondary text string 2304 is grey in FIG. 23*e*), or by increasing the spacing in between the primary and secondary text strings (e.g., the secondary text string 404 is further away from the primary text string 2303 in FIG. 23*f* than it is in FIG. 23*e*).

Figure 23G:
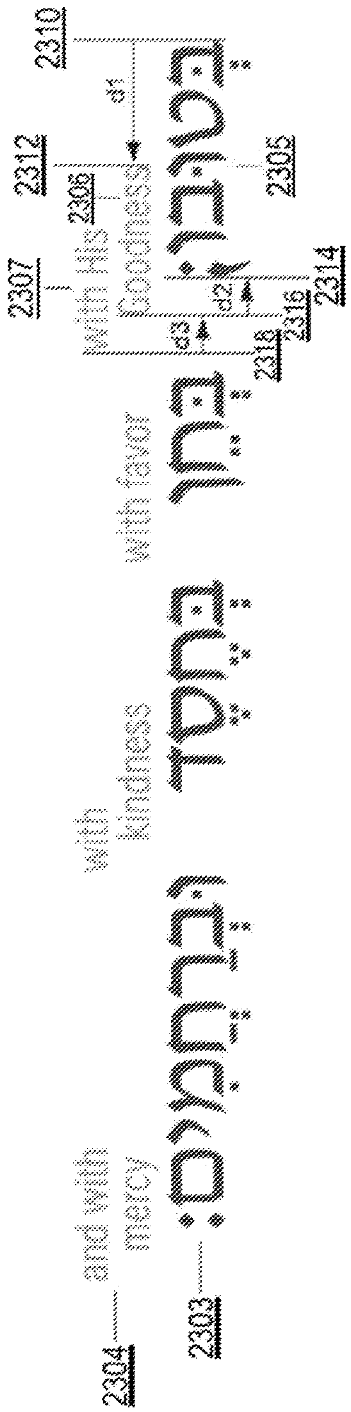
Figure 23H:
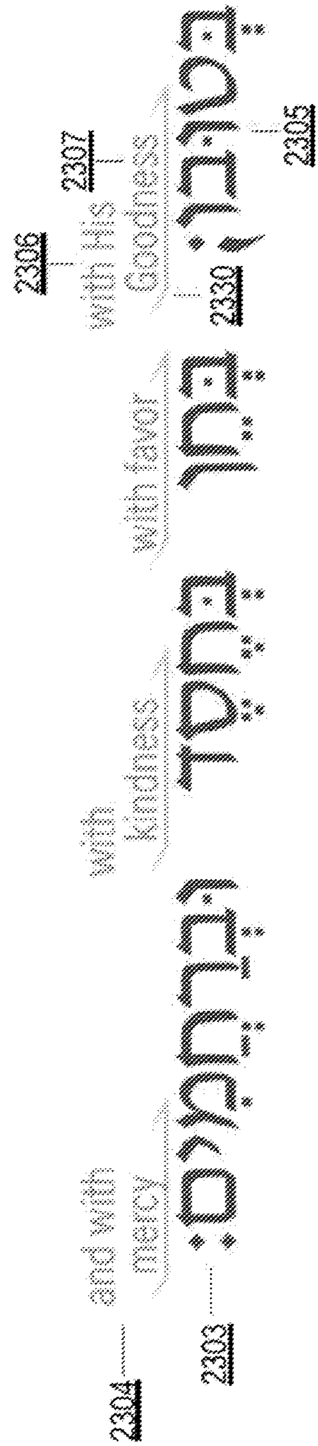

FIGS. 23*g*-23*h* show a series of display schemes/formats 2300G-2300H of a primary text string 2303 and a secondary text string 2304 where secondary text segments are offset from each other and their corresponding primary text segments, according to an embodiment.

FIG. 23*g* shows a comparative-text display format (CTDF) 2300G that can employ a related text layout 2302G. The text layout 2302G for the CTDF 2300G can include arranging the primary and secondary text segments such that 1) secondary text segments 2306 are one of above and below each other and their corresponding primary text segments 2305, 2) secondary text segments 2306 that are immediately adjacent to their primary text segments 2305 (e.g., no other secondary text segments in between the secondary text segment and the primary text segment) are offset relative to their corresponding primary text segment 2305 such that rightmost point 2312 of each secondary text segment is to the left of the rightmost point 2310 of each corresponding primary text segment by at least distance d1, the leftmost point 2316 of each secondary text segment is to the left of the leftmost point 2314 of each corresponding primary text segments by at least distance d2, where d1 and d2 may be any distance greater than zero, and 3) secondary text segments 2307 that are immediately adjacent to other secondary text segments 2307 (e.g., not adjacent to a primary text segment 2305) are offset relative to the other secondary text segments 2306 such that the leftmost point 2318 of each secondary text segment 2307 is to the left of the leftmost point 2314 of each other secondary text segment 2306 by at least distance d3. Alternatively, d1 may be any distance greater than zero and d2 may be a width of at least a syllable of the secondary text segment 2306. Alternatively, d3 may be a width of at least a syllable of the secondary text segment 2307. Alternatively, the direction of the offsets must match the directionality of the associated text strings as will be later discussed.

This CTDF 2300G can be used where the width of the secondary text string 2304 far exceeds the width of the primary text string 2303, requiring several secondary text segments 2306 2307 to be presented for each primary text segment 2305. In contrast to the prior art, if one attempted to study the Hebrew of FIG. 23*a* by reading from right to left, he or she would encounter a Hebrew text segment 2305 before the English text segment 2306. Such text arrangements introduce texts one at a time, and in an order which allows a student to read a foreign text segment before deciding whether or not to reference the corresponding native language text segment for a better understanding.

FIG. 23*h* shows a comparative-text display format (CTDF) 2300H that can employ a related text layout 2302H. The text layout 2302H for the CTDF 2300H is similar to the text layout 2302G for the CTDF 2300G but further includes shading or shadows 430 to further distinguish a primary text segment 2305 from secondary text segments 2306 2307.

Figure 24A:
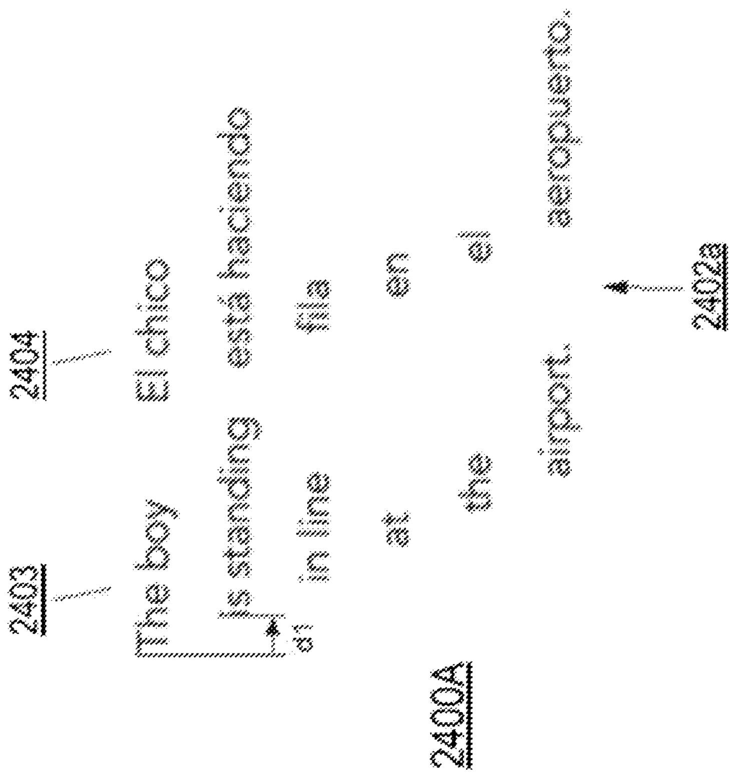
Figure 24B:
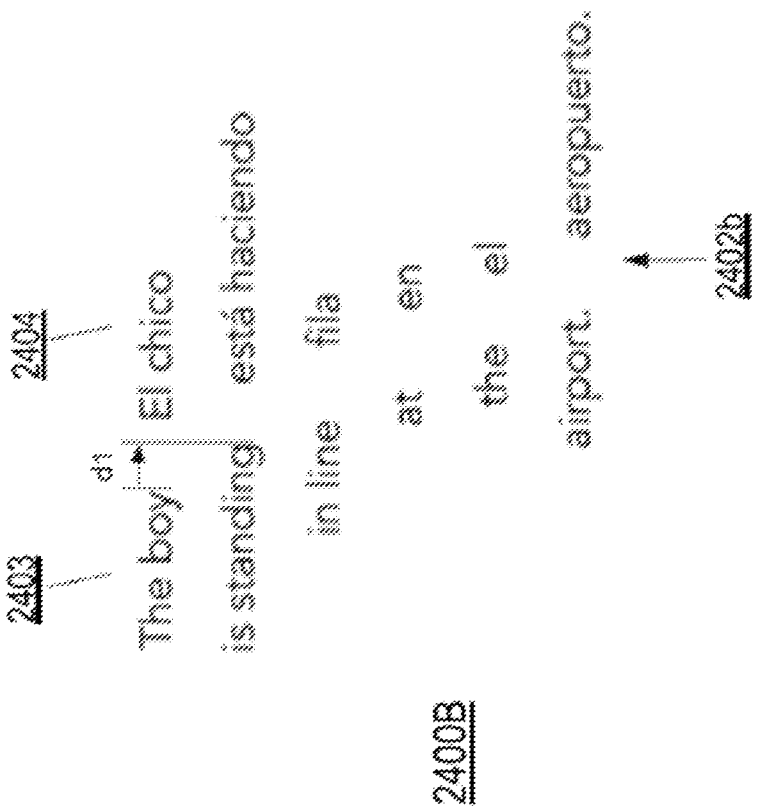
Figure 24C:
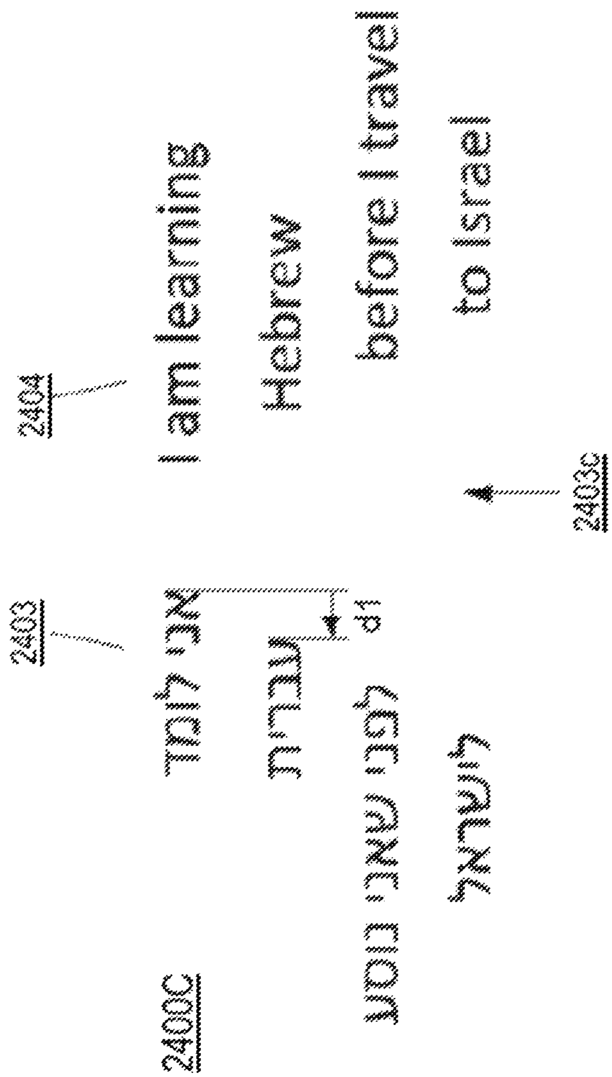

FIGS. 24*a*-24*c* show a series of display schemes/formats 2400A-2400C of a primary text string 2403 and a secondary text string 2404 where primary text segments and secondary text segments are presented side-by-side parallel to one another, using an offset progression between adjacent lines, according to an embodiment.

FIG. 24A shows a comparative-text display format (CTDF) 2400A that can employ a related text layout 2402A. The text layout 2402A for the CTDF 2400A can include arranging the primary and secondary text segments such that 1) the primary text segments are arranged in a column and the secondary text segments are placed one of right and left of their corresponding primary text segments and 2) each text segment is offset from its immediately previous text segment by a distance d1, where d1 may be greater than zero. Alternatively, d1 may be a width of at least a syllable of a text segment. Offsetting the respective front ends of each text segment may cause the primary text string 2403 and the secondary text string 2404 to be front aligned such as in FIG. 24*a*. Alternatively, offsetting the respective back ends of the primary text segments and the respective front ends of the secondary text segments may cause the primary text string 2403 and the secondary text string 2404 to be internally aligned such as in FIG. 24*b*.

The CTDF 2400A and the CTDF 2400B can be used where the primary and secondary texts have a left to right directionality like with English and Spanish. Such text arrangements introduce text segments one at a time in a manner which reduces visual and mental fatigue.

FIG. 24*c* shows a comparative-text display format (CTDF) 2400C that can employ a related text layout 2402C. The text layout 2402B for the CTDF 2400B is similar to the text layout 2402A for the CTDF 2400A, but further requires the direction of any offset to match the directionality of the associated text string. Here, Hebrew has a right to left directionality so the Hebrew text segments are offset to the left of immediately previous Hebrew text segments while English has a left to right directionality to the English text segments are offset to the right of immediately previous English text segments.

This CTDF 2400C can be used for primary and secondary texts of any directionality. The benefits of CTDF 2400C are similar to those of CTDF 2400A and CTDF 2400B, but further include an indication of the directionality of a text string based on the offset direction from one text segment to the next.

FIGS. 25*a*-25*d* show a series of display schemes/formats 2500A-2500D of a primary text string 2503 and a secondary text string 2504 where primary text segments and secondary text segments are presented side-by-side parallel to one another, using an offset progression between adjacent lines, further aligned using a parallelogram format, according to an embodiment.

Figure 25A:
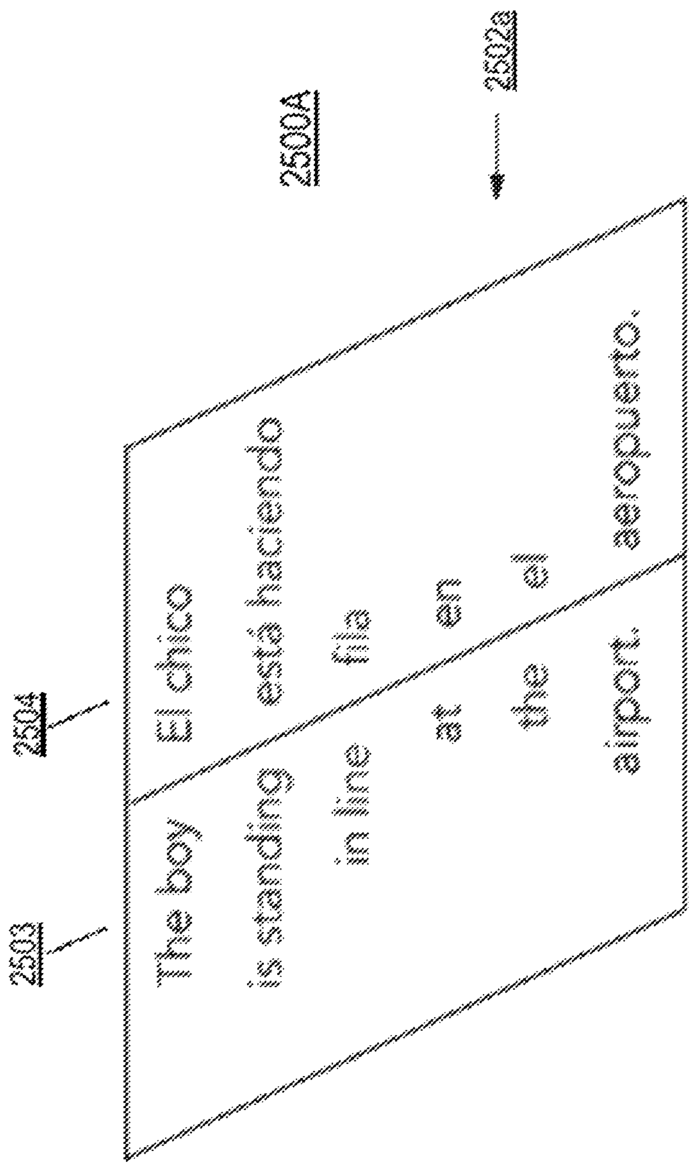

FIG. 25*a* shows a comparative-text display format (CTDF) 2500A that can employ a related text layout 2502A. The text layout 2502A, like the text layout 2502B, for the CTDF 2500A can include arranging the primary and secondary text segments such that 1) their respective offsets are internally aligned and 2) a bisected parallelogram further distinguishes the primary text string 2503 and the secondary text string 2505. Although the primary text segments 2505 and the secondary text segments 2506 are shown to be internally aligned, they can instead be, for example, front-end or back-end aligned and still employ the bisected parallelogram of this embodiment.

Figure 25B:
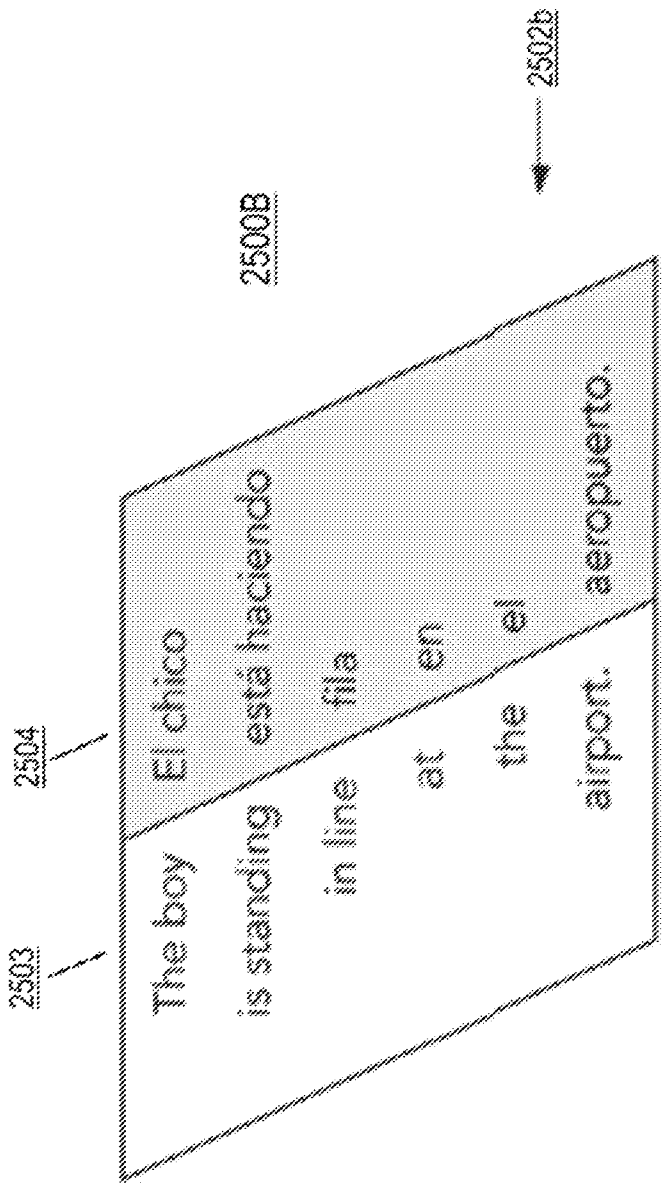

FIG. 25*b* shows a comparative-text display format (CTDF) 2500B that can employ a related text layout 2502B. The text layout 2502B, like the text layout 2502A, for the CTDF 2500B can include arranging the primary and secondary text segments such that 1) their respective offsets are internally aligned and 2) a bisected parallelogram, the right-hand portion of which is shaded, further distinguishes the primary text string 2503 and the secondary text string 2505. It is to be understood that the shading may instead be employed relative to the left side of the bisected parallelogram and be within the scope of the present system. Although the primary text segments 2505 and the secondary text segments 2506 are shown to be internally aligned, they can be, for example, front-end or back-end aligned and still otherwise employ the shading and bisected parallelogram aspects of this embodiment.

Figure 25C:
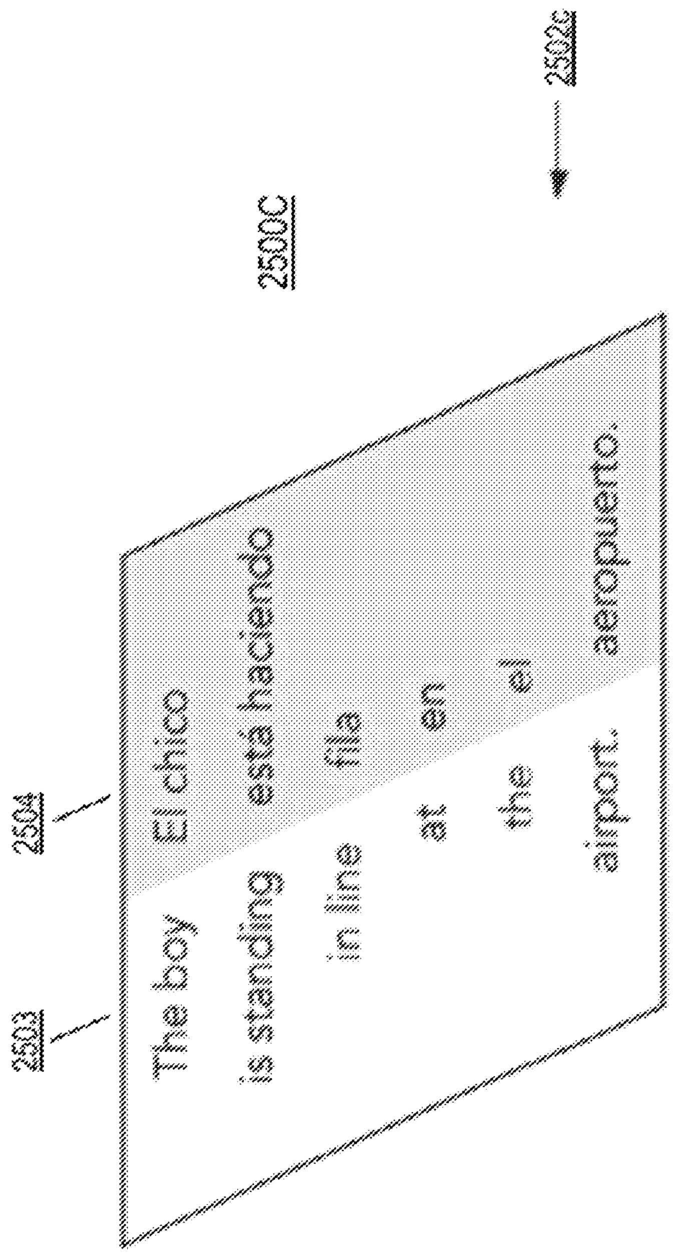

FIG. 25*c* shows a comparative-text display format (CTDF) 2500C that can employ a related text layout 2502C. The text layout 2502C, like the text layout 2502B, for the CTDF 2500C can include arranging the primary and secondary text segments such that 1) their respective offsets are internally aligned and 2) an outer parallelogram (e.g., no bisection), the right-hand portion of which is shaded (e.g., encompassing the secondary text string 2504), further distinguishes the primary text string 2503 and the secondary text string 2504. It is to be understood that the shading may instead be employed relative to the left side (e.g., encompassing the primary text string 2503) and be within the scope of the present system. Although the primary text segments 2505 and the secondary text segments 2506 are shown to be internally aligned, they can be, for example, front-end or back-end aligned and still otherwise employ the shading and outer parallelogram aspects of this embodiment.

Figure 25D:
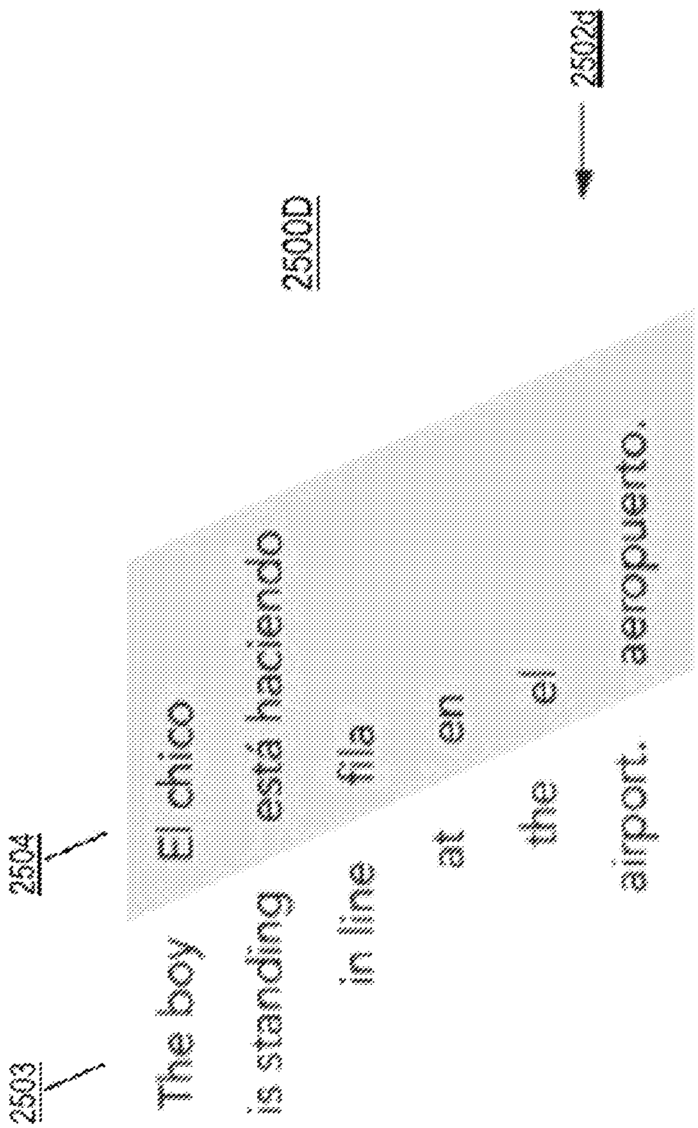

FIG. 25*d* shows a comparative-text display format (CTDF) 2500D that can employ a related text layout 2502D. The text layout 2502D, like the text layout 2502B, for the CTDF 2500D can include arranging the primary and secondary text segments such that 1) their respective offsets are internally aligned and 2) parallelogram-shaped shading may instead be employed relative to the left side (e.g., encompassing the primary text string 2503), further distinguishing the primary text string 2503 and the secondary text string 2504. It is to be understood that the parallelogram-shaped shading may instead be employed relative to the right side (e.g., encompassing the secondary text string 2504) and be within the scope of the present system. Although the primary text segments 2505 and the secondary text segments 2506 are shown to be internally aligned, they can be, for example, front-end or back-end aligned and still otherwise employ the parallelogram shaped shading of this embodiment.

FIGS. 26*a*-26*d* show a series of display schemes/formats 2600A-2600D of a primary text string 2603 and a secondary text string 2604 where primary text segments and secondary text segments are presented side by side parallel to one another, using an offset progression between vertically adjacent lines of text, where those groups of text are further aligned as using a parallelogram format, with additional lines or shading relative to FIGS. 25A-25D, according to an embodiment.

Figure 26A:
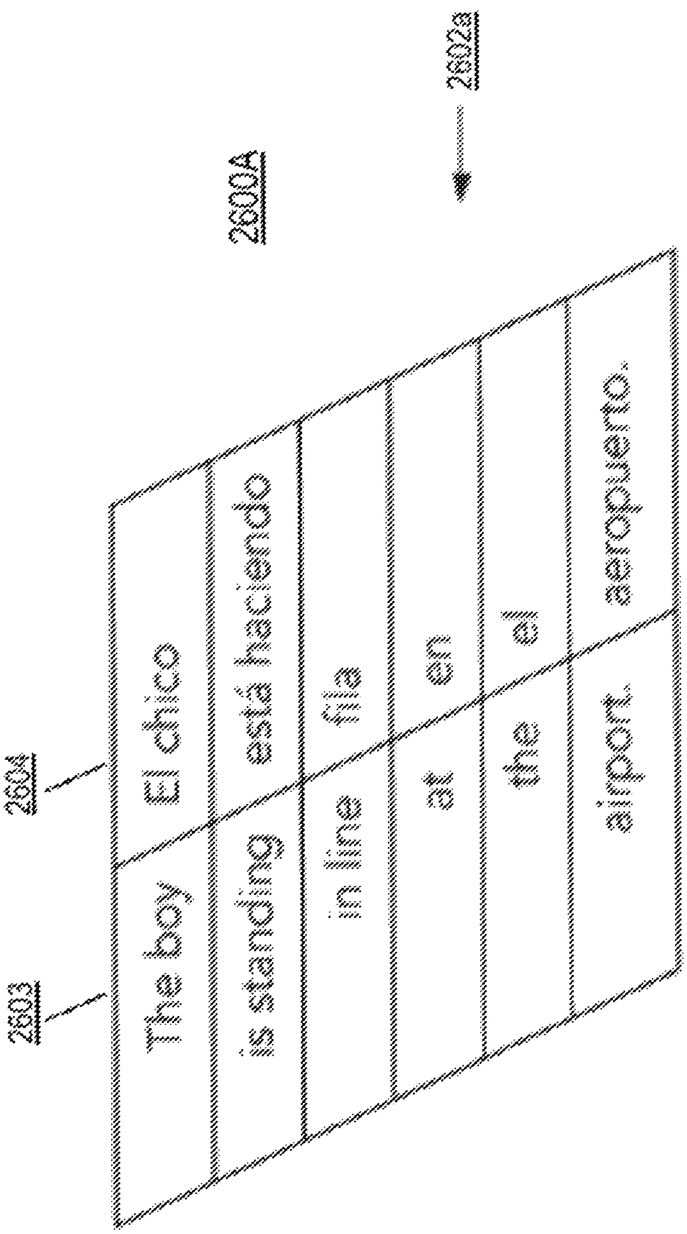

FIG. 26*a* shows a comparative-text display format (CTDF) 2600A that can employ a related text layout 2602A. The text layout 2602A for the CTDF 122A can include arranging the primary and secondary text segments such that 1) their respective offsets are internally aligned and 2) a bisected parallelogram (i.e., dividing between text on a same horizontal line), along with line-by-line boxing, further distinguishes the primary text string 2603 and the secondary text string 2605 by delineating text segments. Although the primary text segments 2605 and the secondary text segments 2606 are shown to be internally aligned, they can be, for example, front-end or back-end aligned and still otherwise employ the bisected parallelogram and boxing of this embodiment.

Figure 26B:
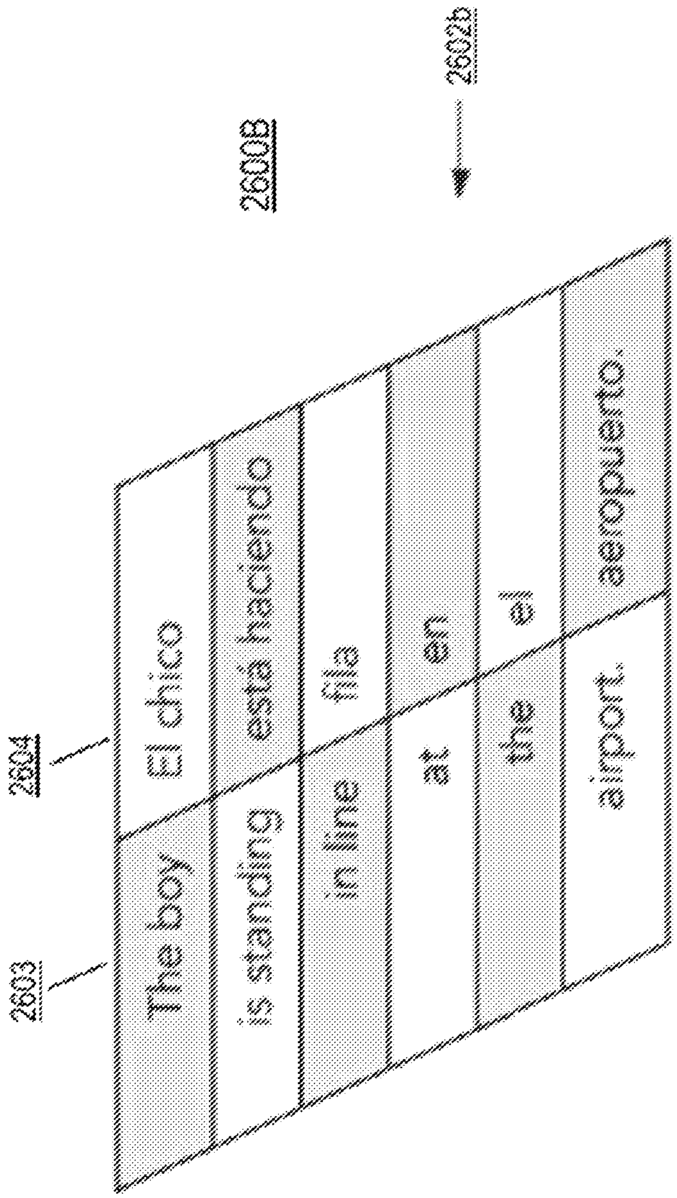

FIG. 26*b* shows a comparative-text display format (CTDF) 700B that can employ a related text layout 2602B. The text layout 2602B for the CTDF 122B can include arranging the primary and secondary text segments such that 1) their respective offsets are internally aligned and 2) a bisected parallelogram (i.e., dividing between text on a same horizontal line), along with line-by-line boxing and alternating shading (e.g., shading switching between sides of the bisector proceeding between vertically adjacent text segments), further distinguishing the primary text string 703 and the secondary text string 2605 by delineating text segments (e.g., creating a "ladder effect"). Although the primary text segments 2605 and the secondary text segments 706 are shown to be internally aligned, they can be, for example, front-end or back-end aligned and still otherwise employ the bisected parallelogram, boxing, and alternating shading of this embodiment.

Figure 26C:
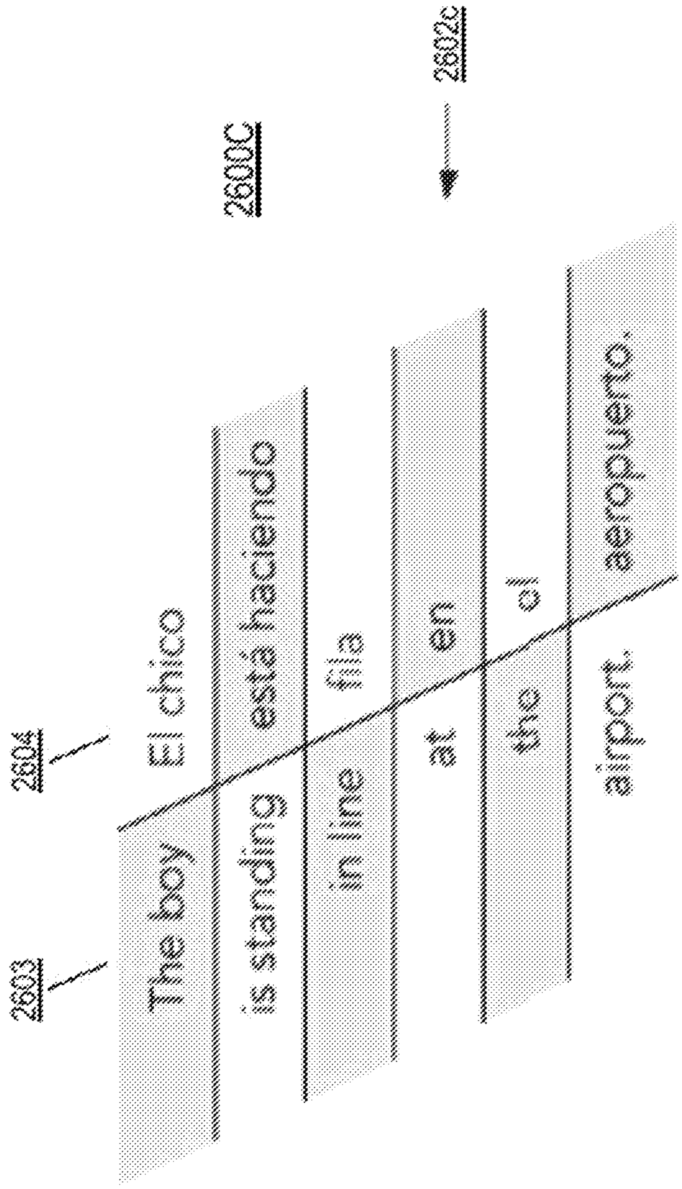

FIG. 26*c* shows a comparative-text display format (CTDF) 2600C that can employ a related text layout 702C. The text layout 2602C for the CTDF 122C can include arranging the primary and secondary text segments such that 1) their respective offsets are internally aligned and 2) a bisecting line (i.e., dividing between text on a same horizontal line), along with horizontal lining and alternating shading, further distinguishes the primary text string 2603 and the secondary text string 2605 by delineating text segments (e.g., creating a "ladder effect"). Although the primary text segments 2605 and the secondary text segments 706 are shown to be internally aligned, they can be, for example, front-end or back-end aligned and still otherwise employ the bisecting line, horizontal lining, and alternating shading of this embodiment.

Figure 26D:
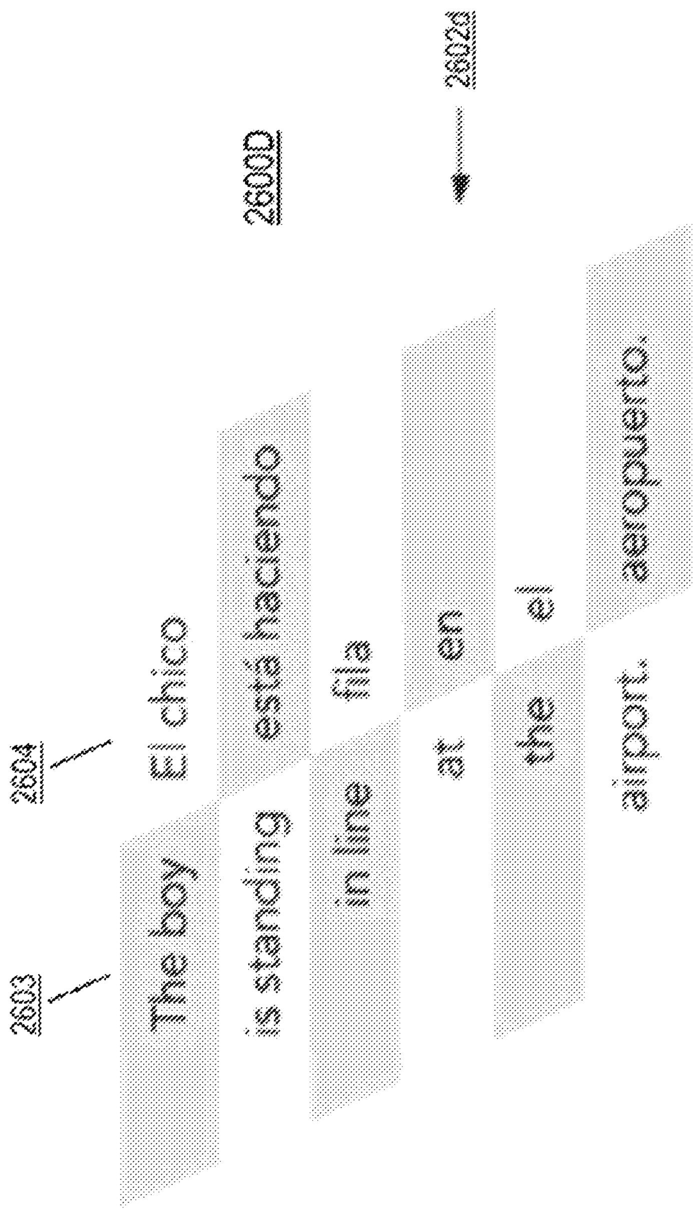

FIG. 26*d* shows a comparative-text display format (CTDF) 2600D that can employ a related text layout 2602D. The text layout 2602D for the CTDF 2600D can include arranging the primary and secondary text segments such that 1) their respective offsets are internally aligned and 2) alternating shading further distinguishes the primary text string 2603 and the secondary text string 2605 by delineating text segments (e.g., creating a "ladder effect"). Although the primary text segments 2605 and the secondary text segments 2606 are shown to be internally aligned, they can be, for example, front-end or back-end aligned and still otherwise employ the alternating shading of this embodiment. It is to be understood that shading is not limited to an alternating progression, but, for example, can be used in a full-line alternating pattern (e.g., full-line shaded, next line of horizontal text not shaded), if desired.

Figure 27A:
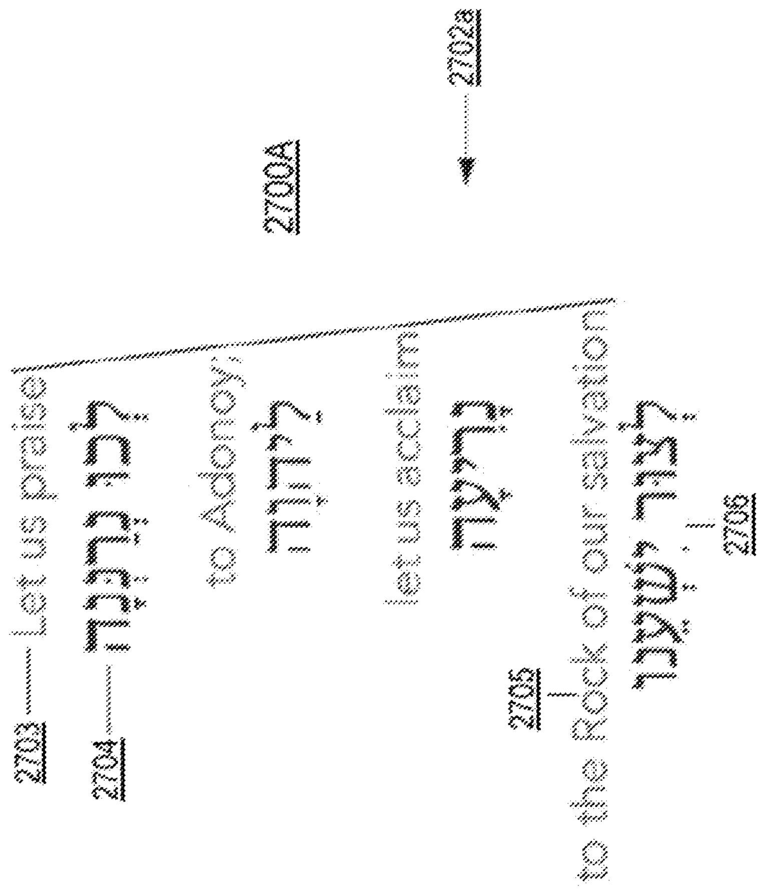
Figure 27B:
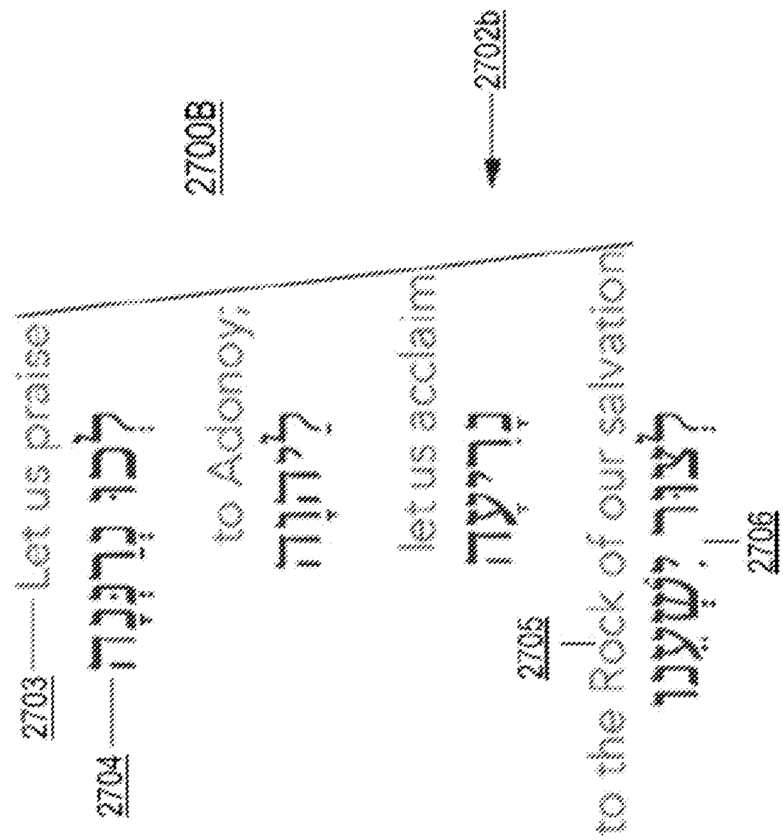
Figure 27C:
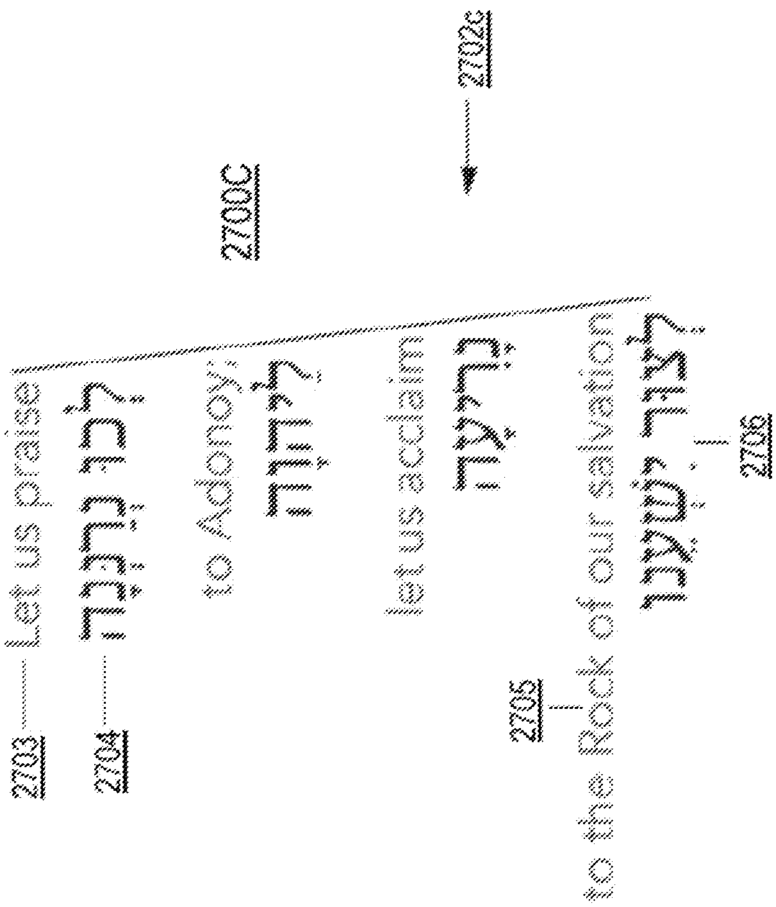

FIGS. 27*a*-27*c* show a series of display schemes/formats 2700A-2700C of a primary text string 2703 and a secondary text string 2704 where primary text segments and secondary text segments are arranged in an alternating vertical progression, where at least one of the primary or secondary texts 144, 146 incorporates an offset vertical progression.

FIG. 27*a* shows a comparative-text display format (CTDF) 2700A that can employ a related text layout 802A. The text layout 2702A for the CTDF 2700A can include arranging the primary text segments 2705 and the secondary text segments 2706 in an alternating vertical progression pattern, where the primary text string 2703 (e.g., in this case, the English text) incorporates an offset vertical progression relative to the back (or right) edge of each of its primary text segments 2705, and the secondary text string 2704 (e.g., in this case, the Hebrew text) is vertically aligned relative to the back or right end of each of its secondary text segments 2706. In the embodiment shown, the primary text segments 2705 are moved or offset by one space for each succeeding line of English text, but it is to be understood that another offset may be chosen.

FIG. 27*b* shows a comparative-text display format (CTDF) 2700B that can employ a related text layout 2702B. The text layout 2702B for the CTDF 2700B is similar to the text layout 2702A for the CTDF 2700A but further includes a placement of secondary text segments 2706 further inset from their corresponding primary text segments 2705, further distinguishing the primary and secondary text strings.

FIG. 27*c* shows a comparative-text display format (CTDF) 2700C that can employ a related text layout 2702C. The text layout 2702C for the CTDF 2700C can include arranging the primary text segments 2705 and the secondary text segments 2706 in an alternating vertical progression pattern, where both the primary text string 2703 (e.g., in this case, the English text) and the secondary text string 2704 (e.g., in this case, the Hebrew text) incorporates an offset vertical progression relative to the back (or right) edge of each of its text segments. In the embodiment shown, the text segments are moved or offset by one space for each succeeding line of text, progressing in a downward fashion. In the illustrated text layout 2702C, the offset is shown to be one space or letter, but it is to be understood that another offset may be chosen. The right/backside alignment lines are provided in FIGS. 27*a*-27*c* to help accentuate the use of text alignment in those embodiments. Those alignment lines shown respectively in FIGS. 27*a*-27*c* may or may not be included as part of the printed/displayed text layouts 2702A-2702C.

FIGS. 28*a*-28*f* show various CTDFs of a Hebrew text string comprised of Hebrew text segments and a corresponding English text string comprised of English text segments.

Figure 28A:
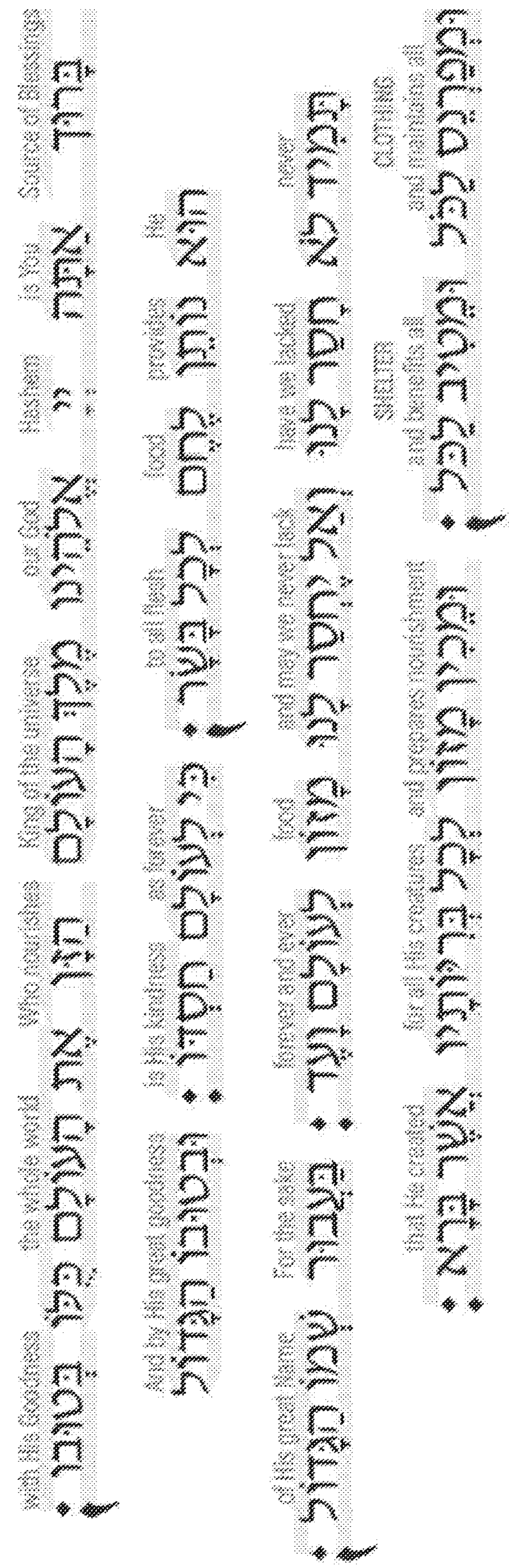
Figure 28B:
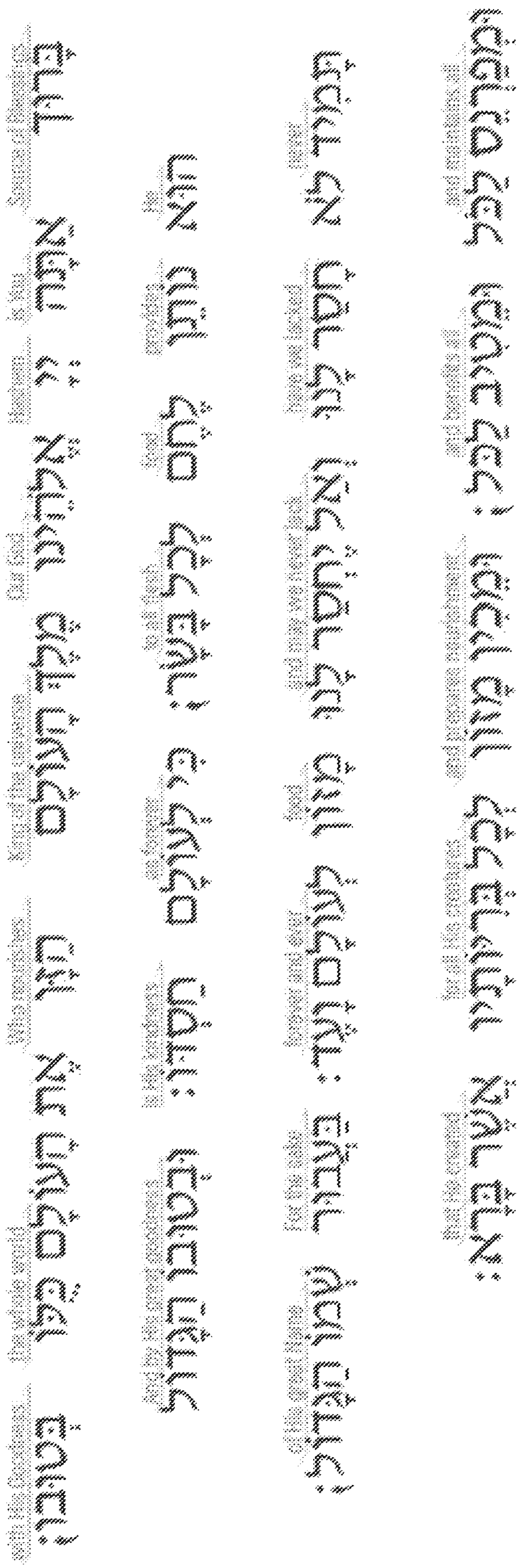
Figure 28C:
Figure 28D:
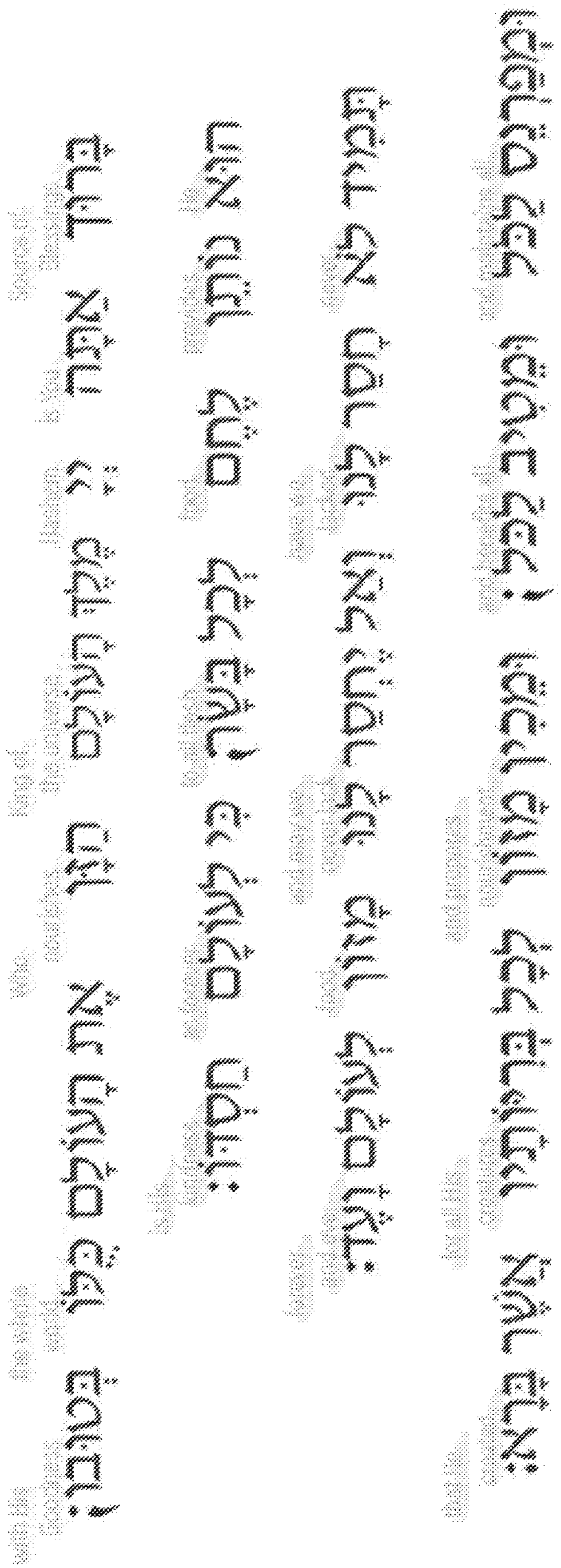
Figure 28E:
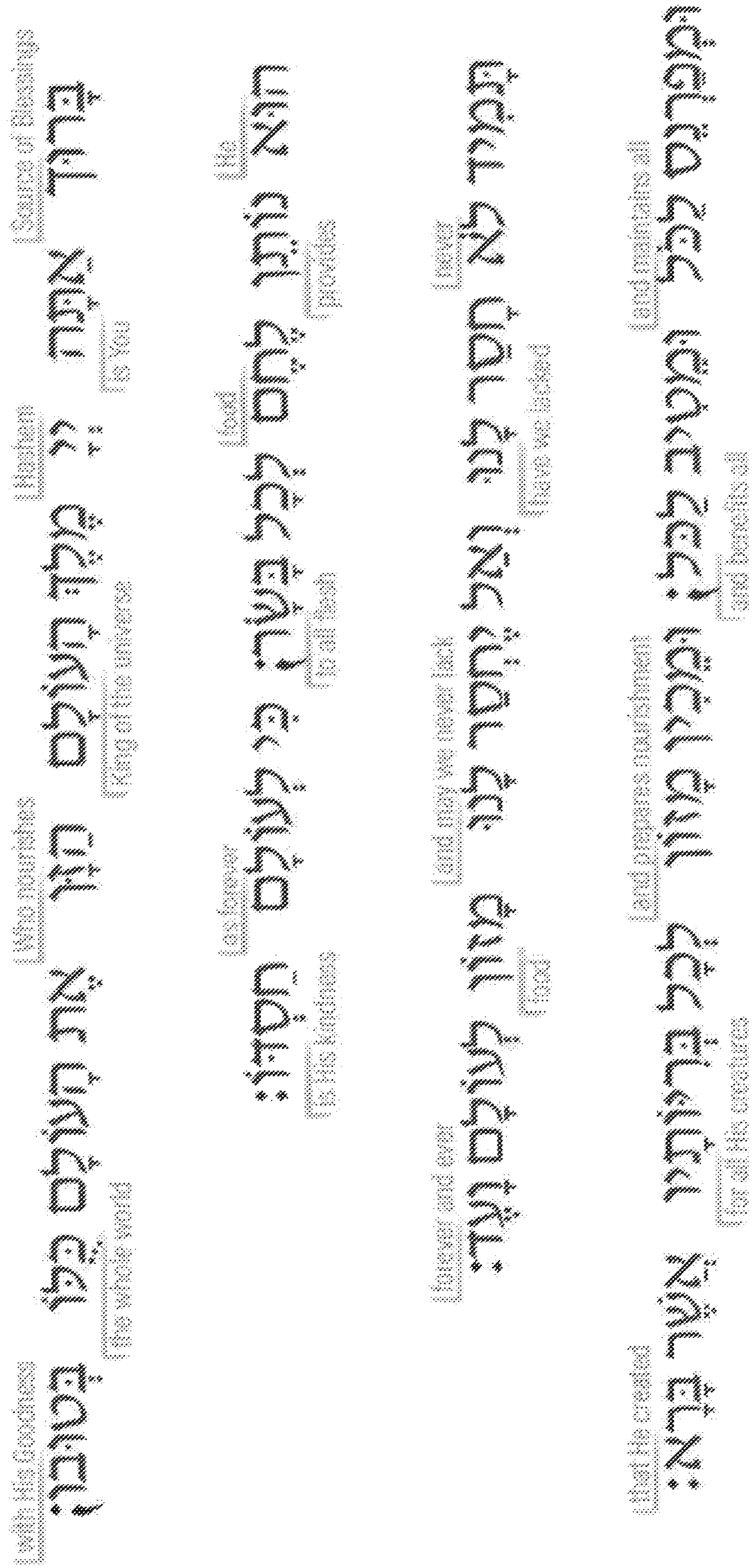
Figure 28F:
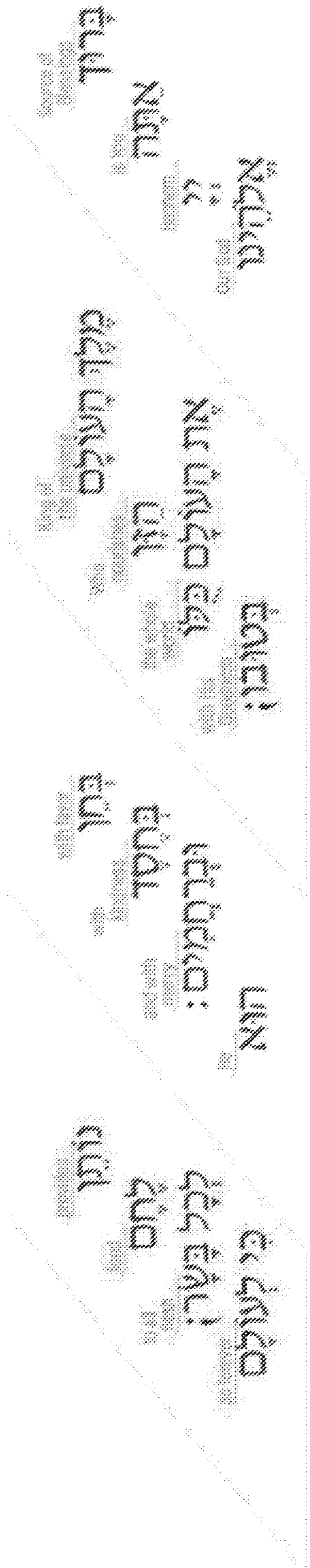
Figure 29A:
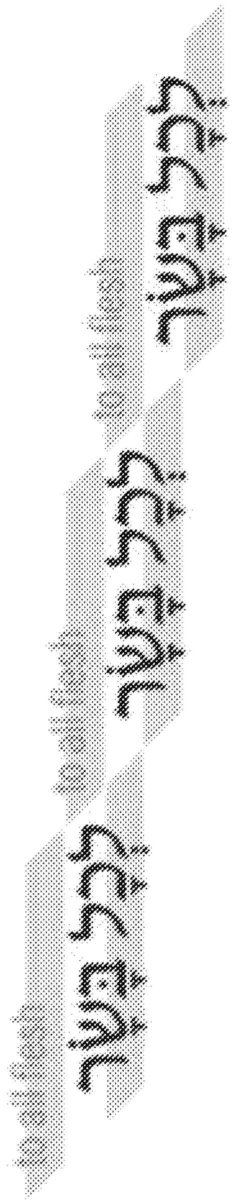
Figure 29B:
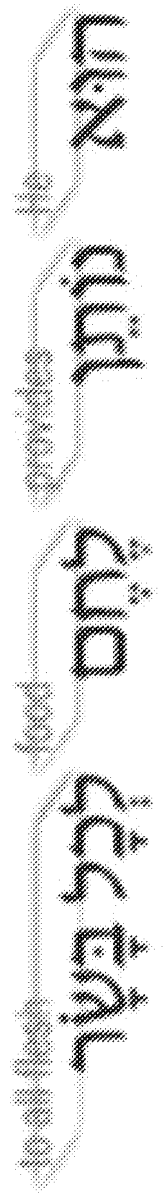
Figure 29C:
Figure 29D:
Figure 29E:
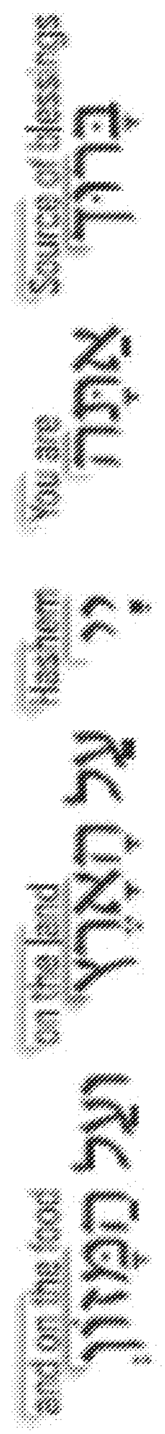
Figure 29F:

Line 1 of FIG. 28*b* shows a CTDF with an uneven spacing in between adjacent Hebrew substrings and an uneven spacing in between adjacent English substrings, harming the flow of the text from one substring pair to the next. In contrast, line 3 of FIG. 28*b* shows a CTDF with an improved spacing in between adjacent Hebrew substring and an improved spacing in between adjacent English substrings, improving the flow of the text from one substring pair to the next.

In an embodiment, the calculation module 318 generates an improved spacing schematic for the primary substrings and/or the secondary substrings. The placement module 320 then places the primary substrings and/or the secondary substrings according to improved spacing schematic. In an embodiment, the calculation module 318 generates the improved spacing schematic by 1) determining the total spacing in between the primary substrings and/or the secondary substrings, 2) determining the total number of spaces in between the primary substrings and/or the secondary substrings, and 3) calculating the average spacing in between the primary substrings and/or the secondary substrings, and 4) generating an improved spacing schematic where the primary substrings and/or the secondary substrings are spaced apart by the average spacing. Alternatively, the calculation module generates the improved spacing schematic using any formula or method that improves the flow of the text from one substring pair to the next when the primary substrings and/or the secondary substrings are placed according to the improved spacing schematic.

FIGS. 29*a*-29*f* show various CTDFs of a Hebrew text string comprised of Hebrew text segments and a corresponding English text string comprised of English text segments.

Figure 30A:
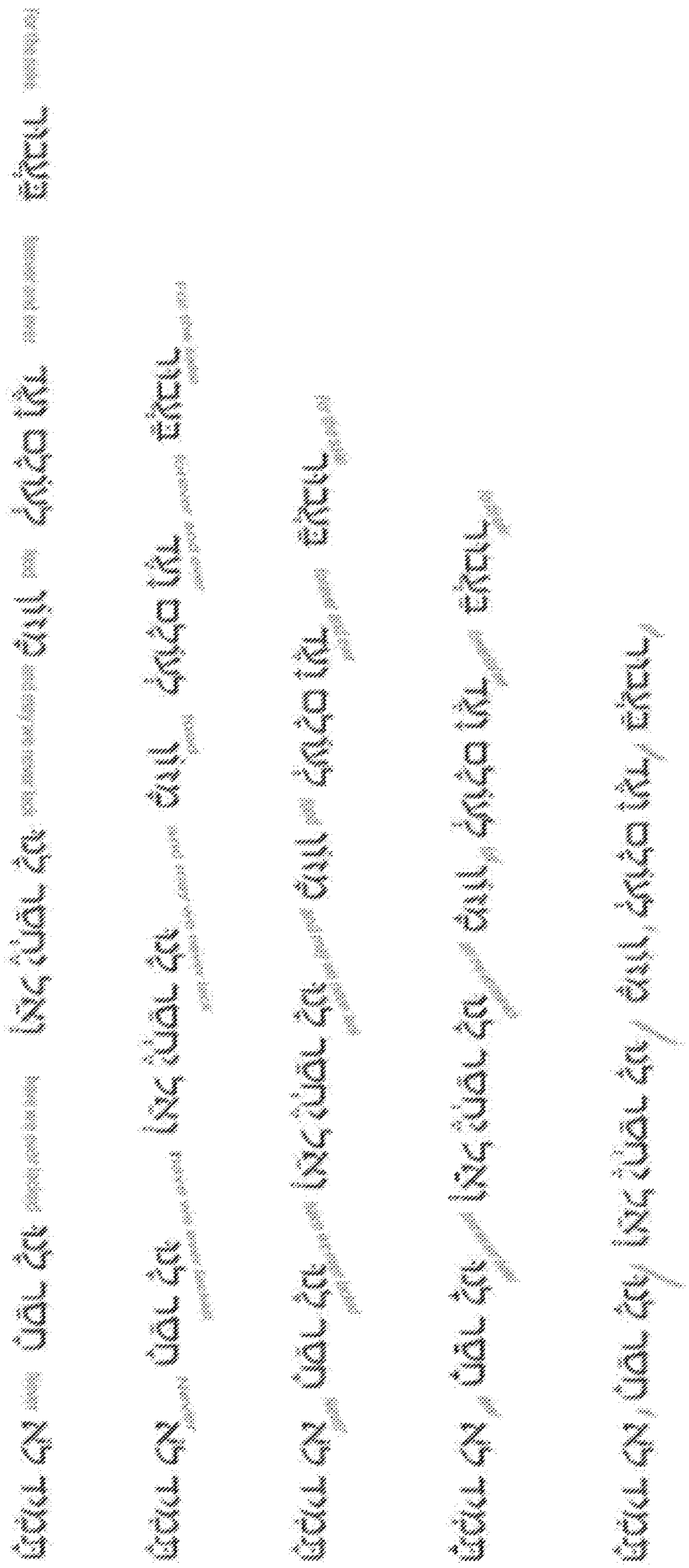

FIG. 30*a* shows a gradual deemphasis of secondary text segments in each consecutive iteration, starting from the bottom and moving upwards.

Figure 30B:

FIG. 30*b* shows a CTDF of a Hebrew text string comprised of Hebrew text segments and a corresponding English text string comprised of English text segments.

Figure 30C:
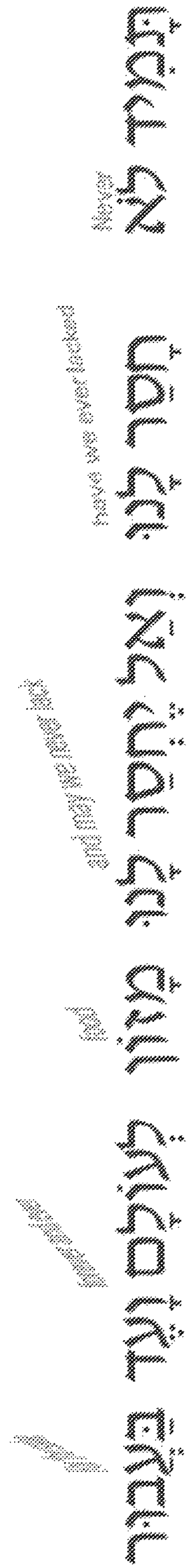

FIG. 30*c* shows a gradual deemphasis of secondary text segments for each pairing of corresponding primary and secondary text segments, starting from the right and moving left.

Figure 31A:
Figure 31B:
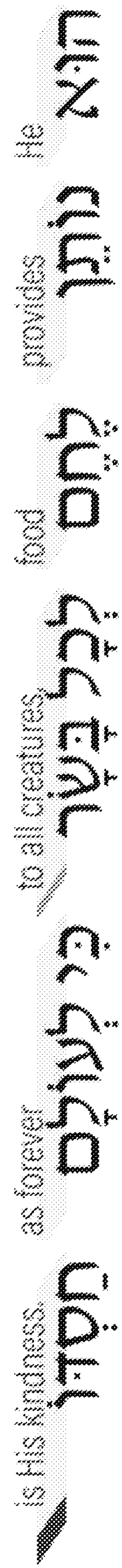
Figure 32E:
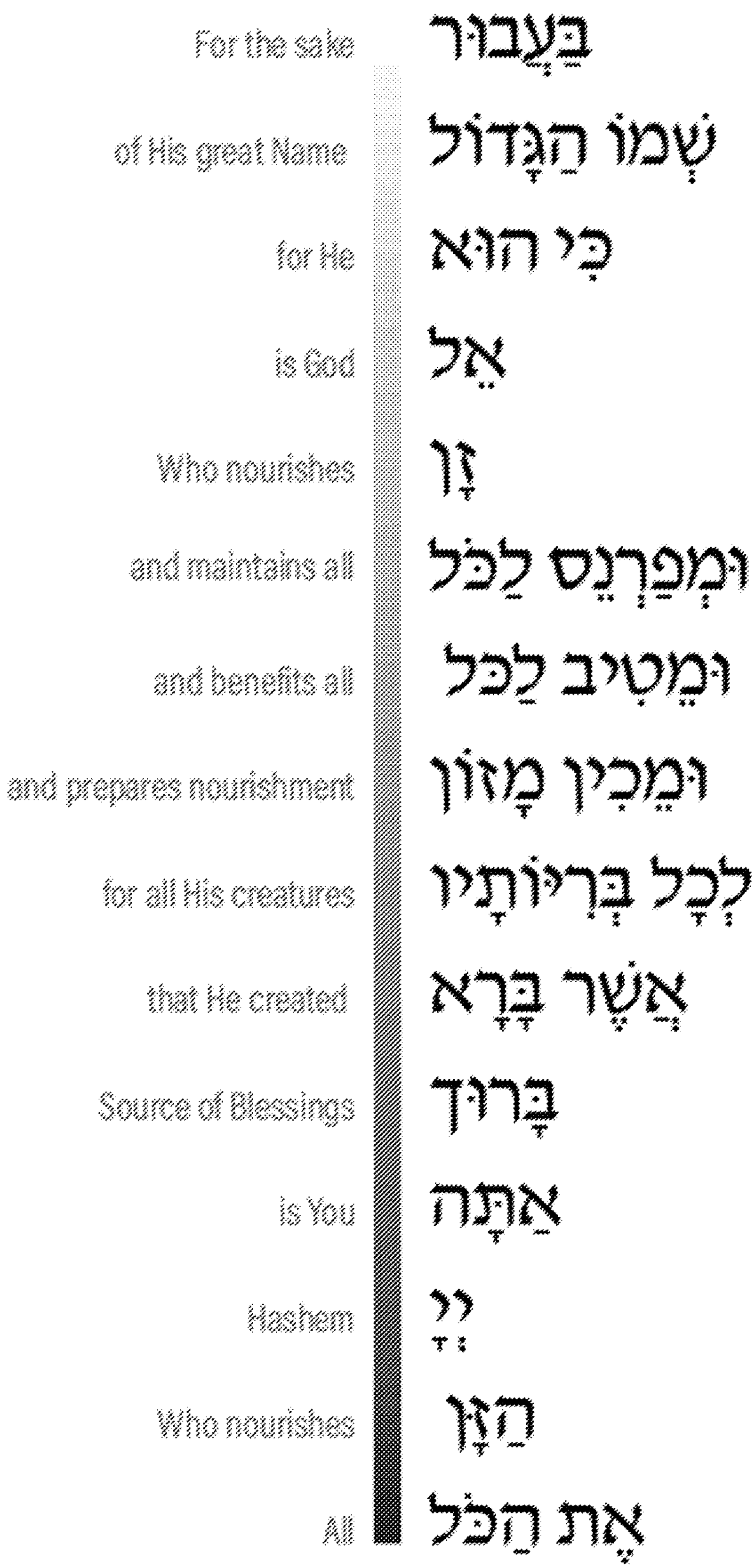
Figure 32G:
Figure 32I:
Figure 32J:
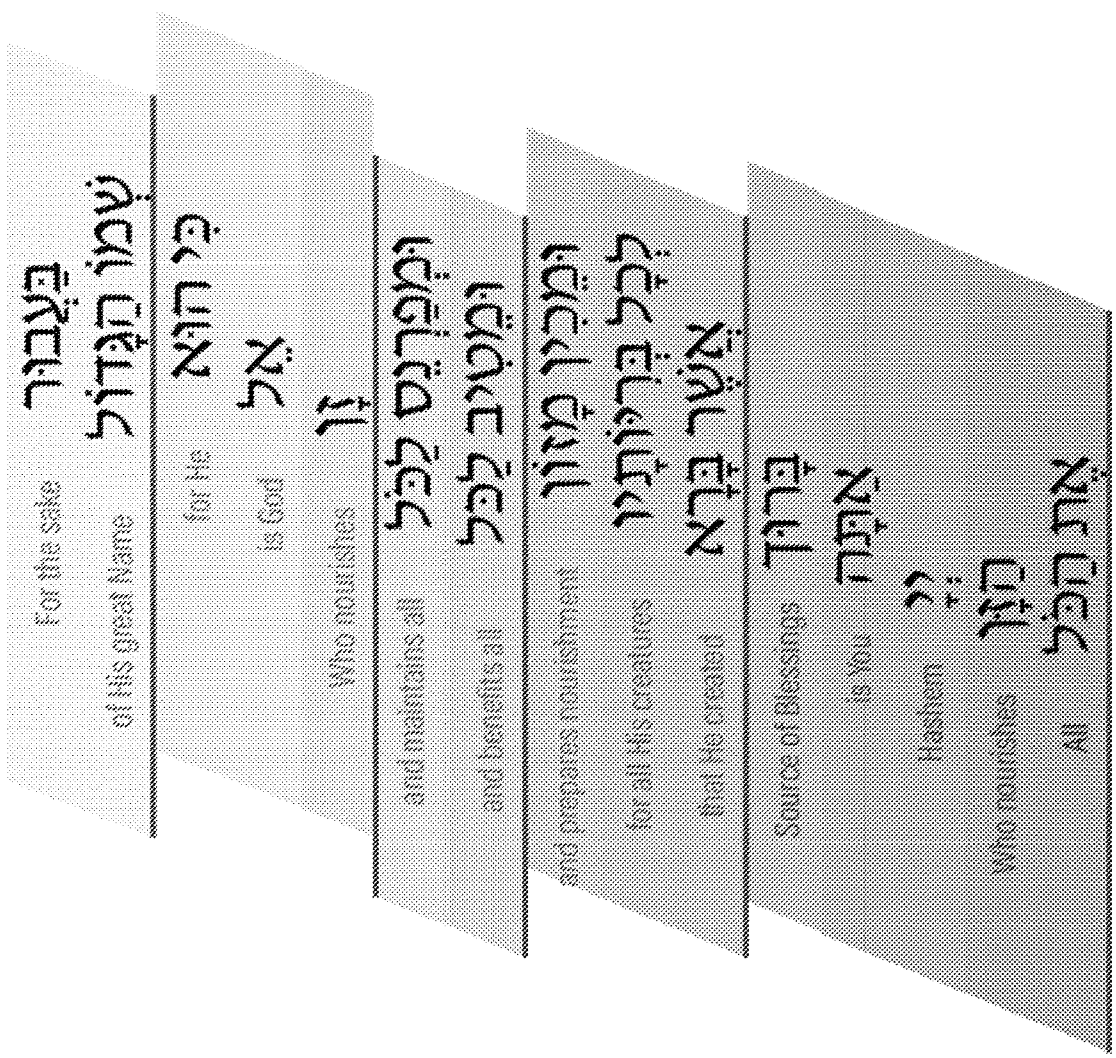
Figure 32K:
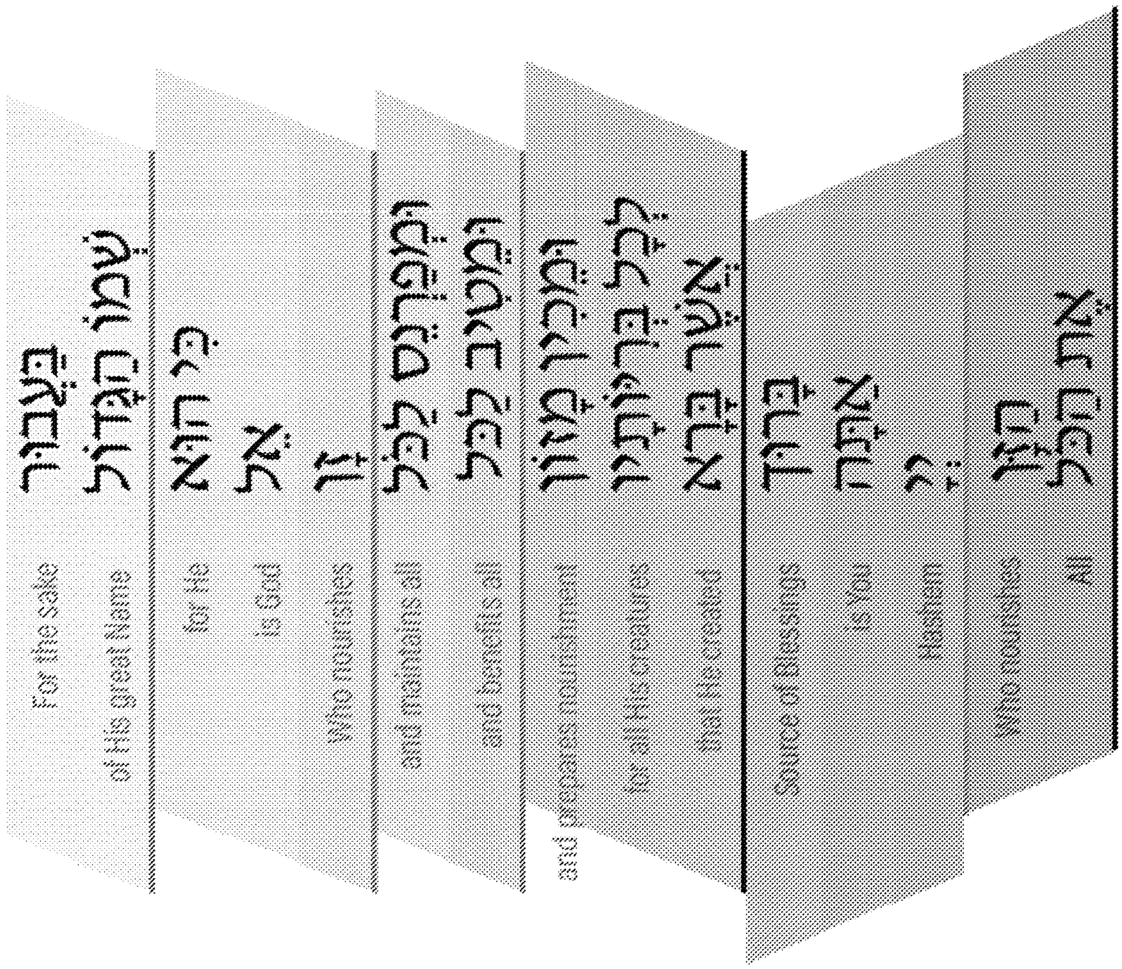
Figure 321:
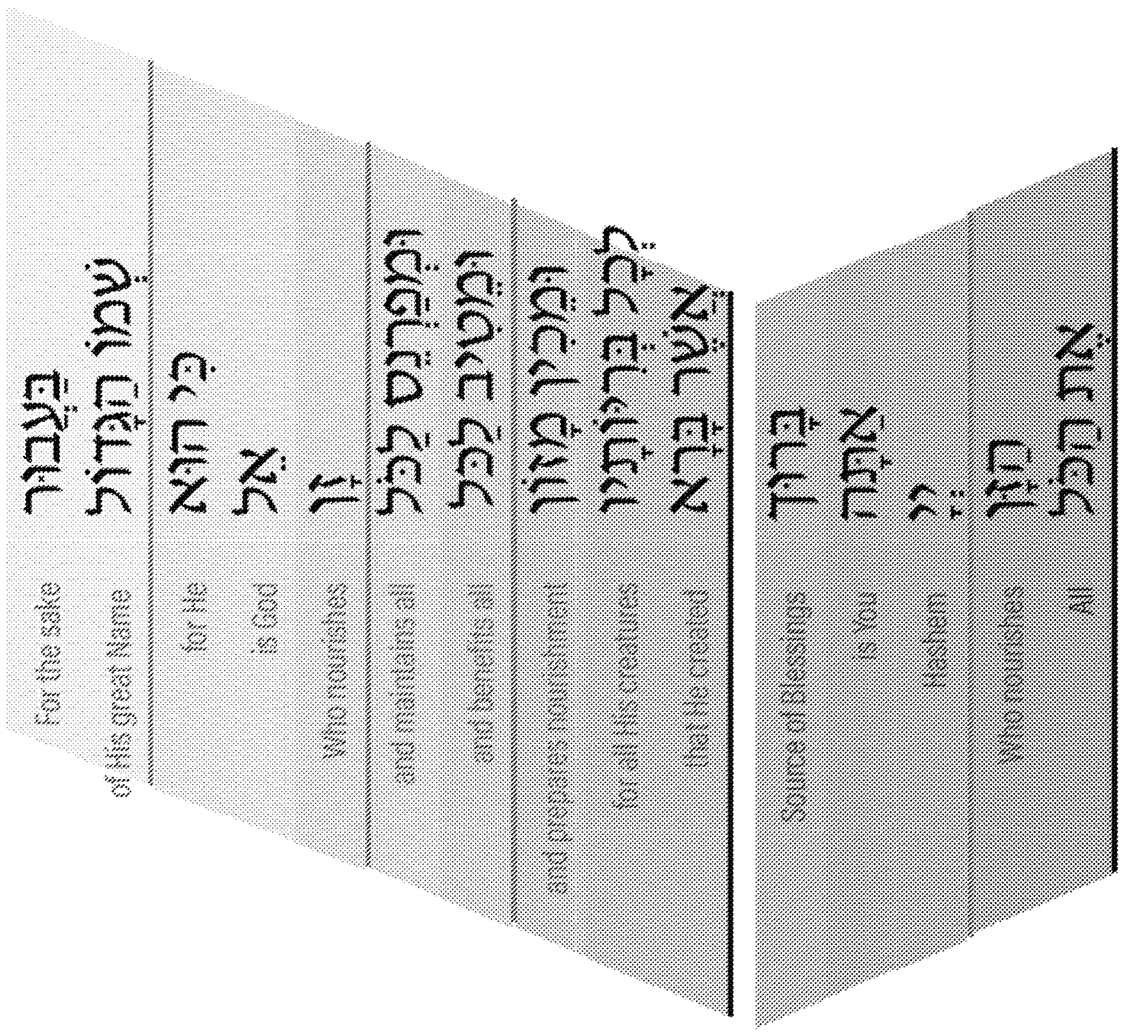
Figure 32R:
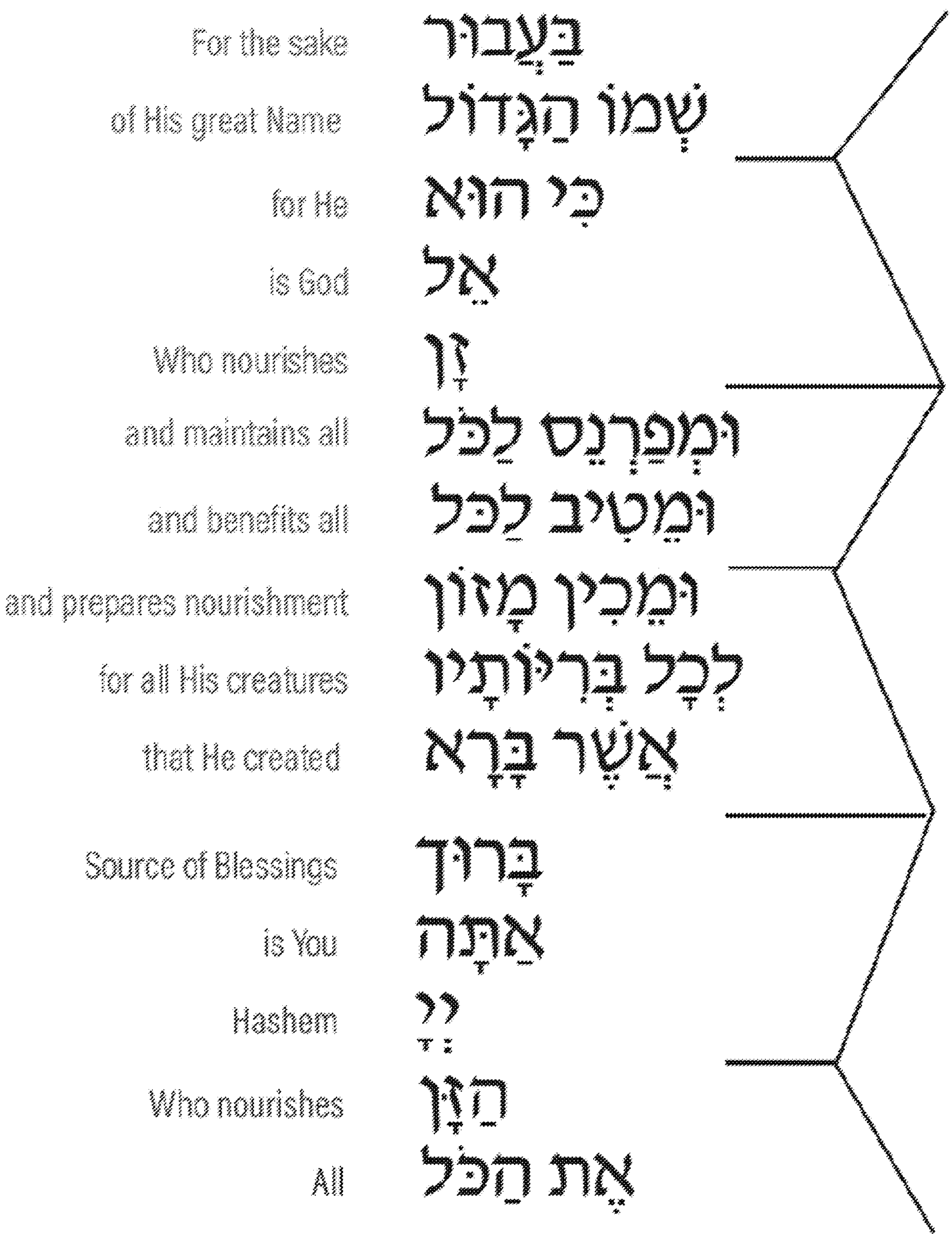
Figure 32S:
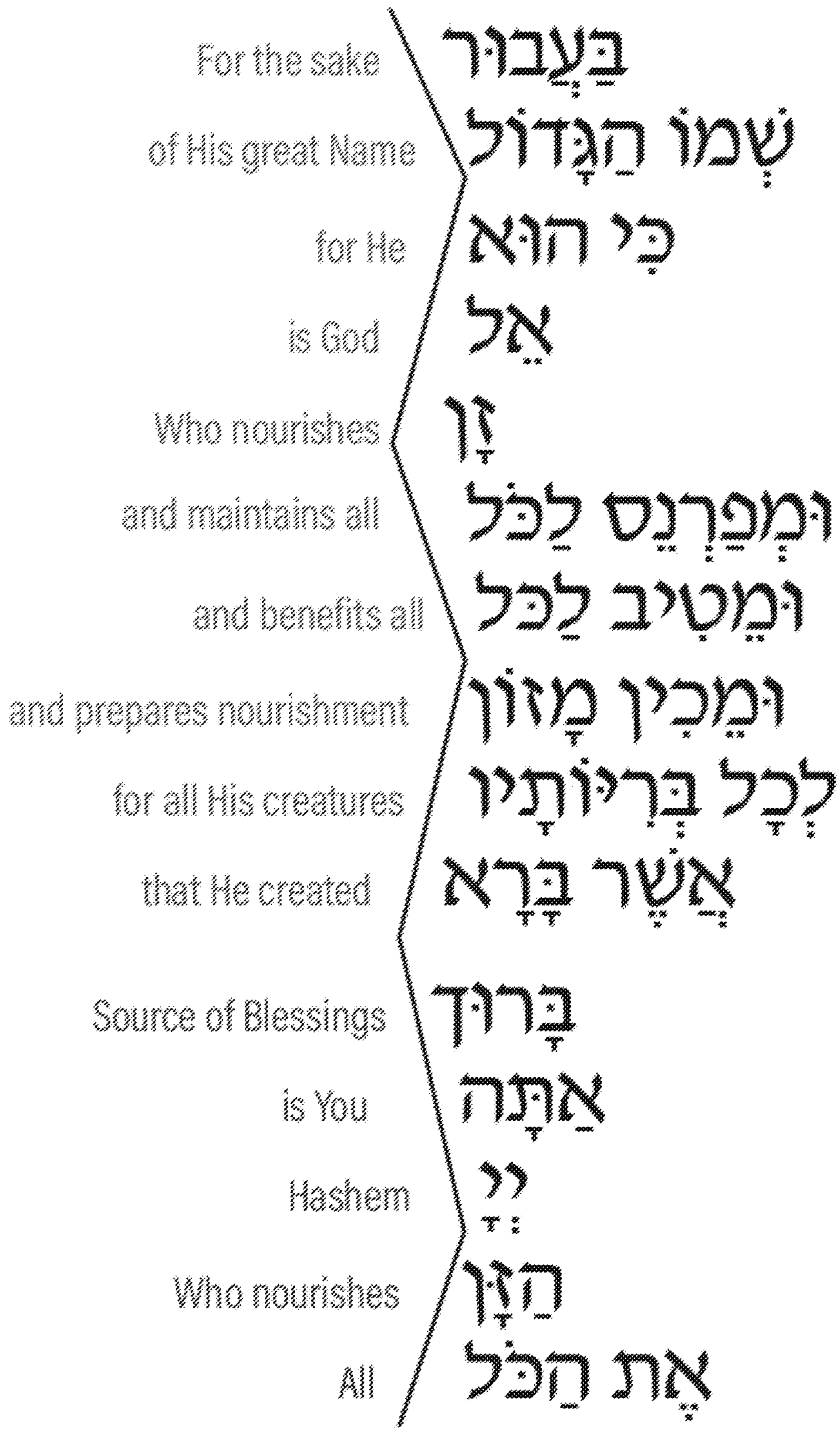
Figure 32T:
Figure 33A:
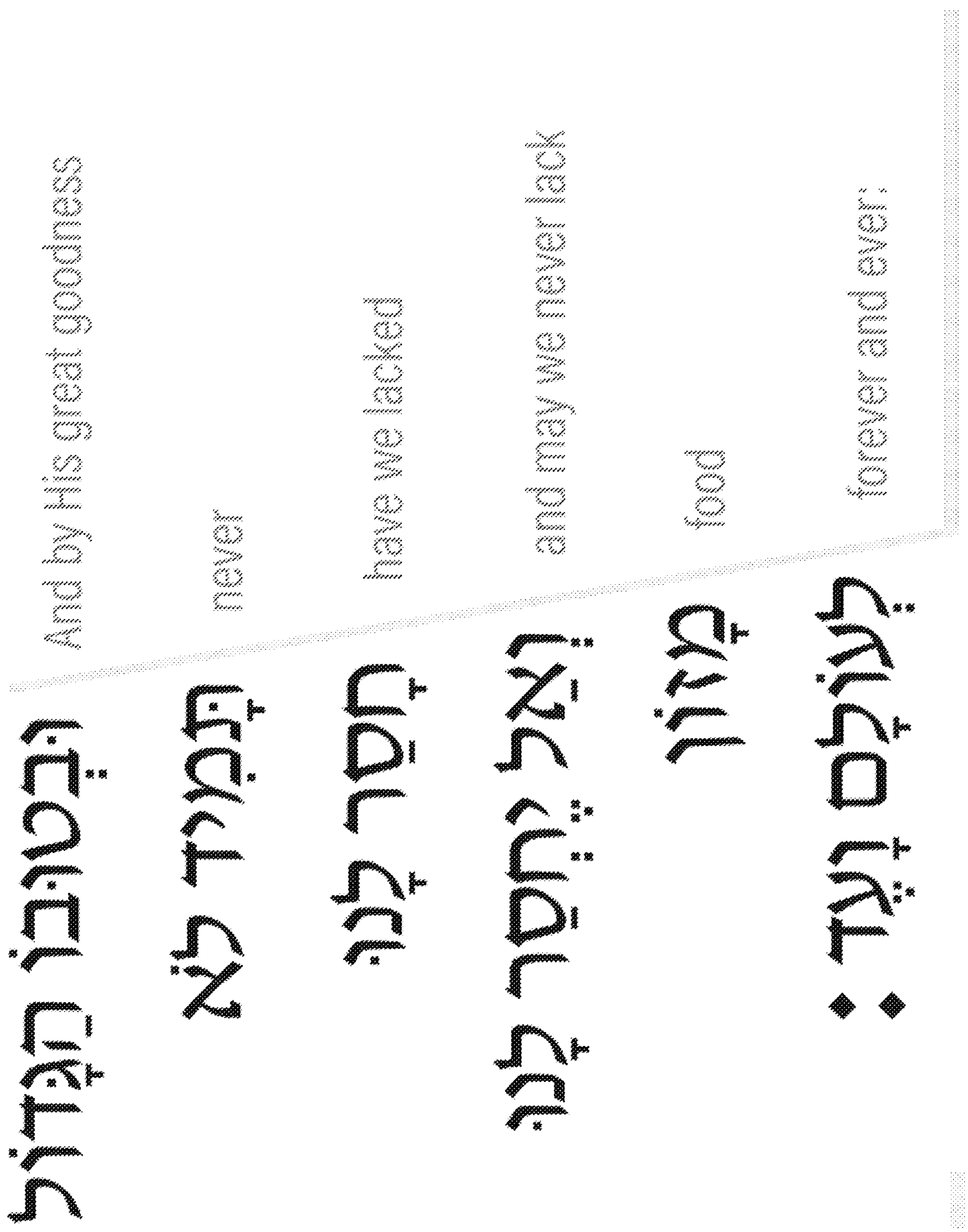
Figure 33B:
Figure 33C:
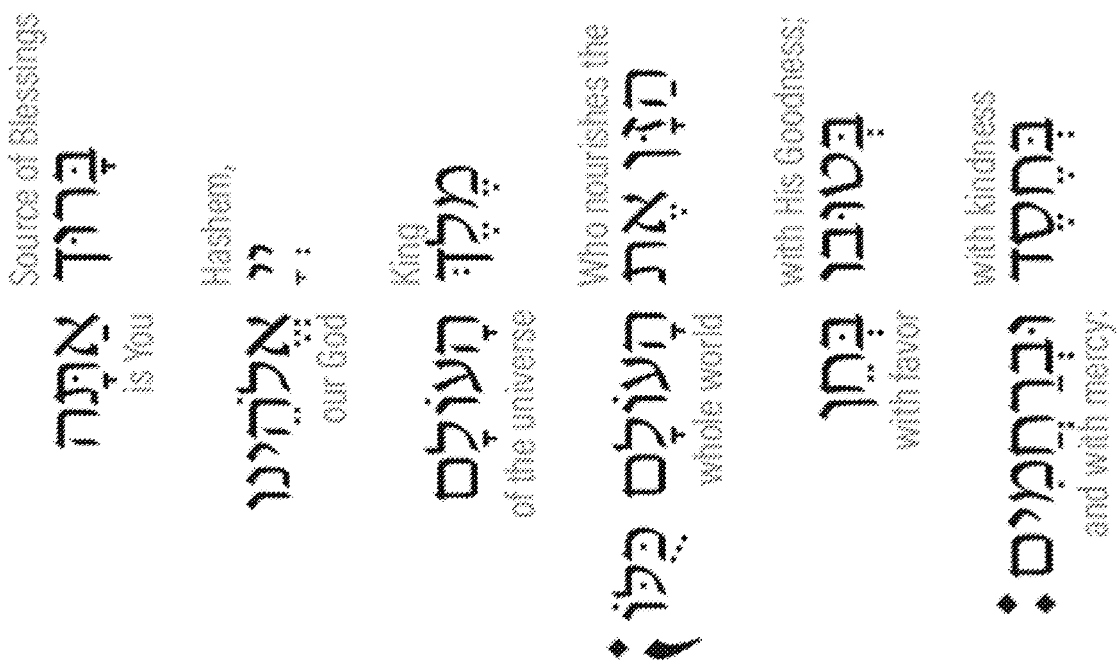
Figure 33D:
Figure 33E:
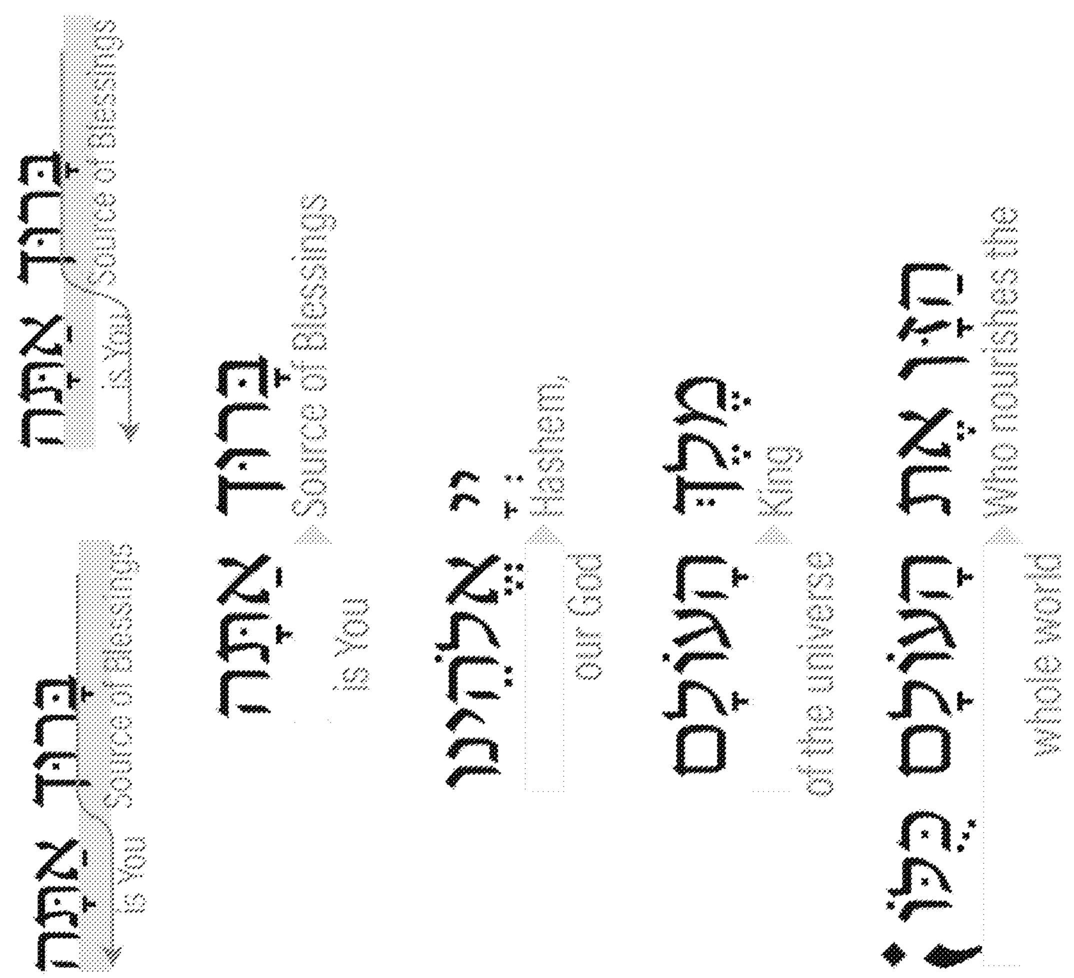
Figure 34A:
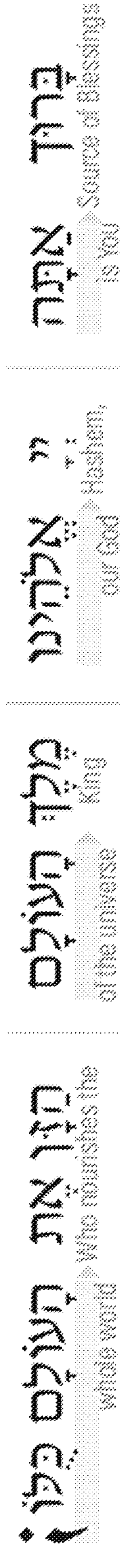
Figure 34B:
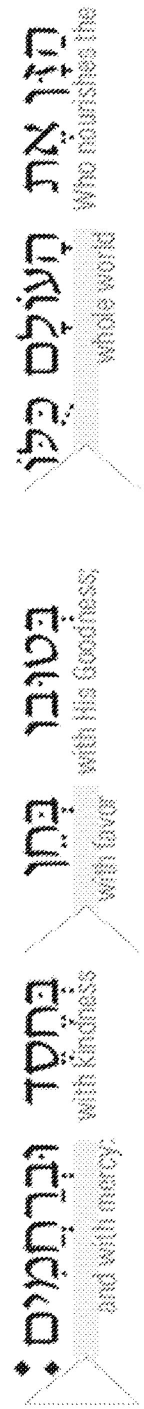
Figure 35A:
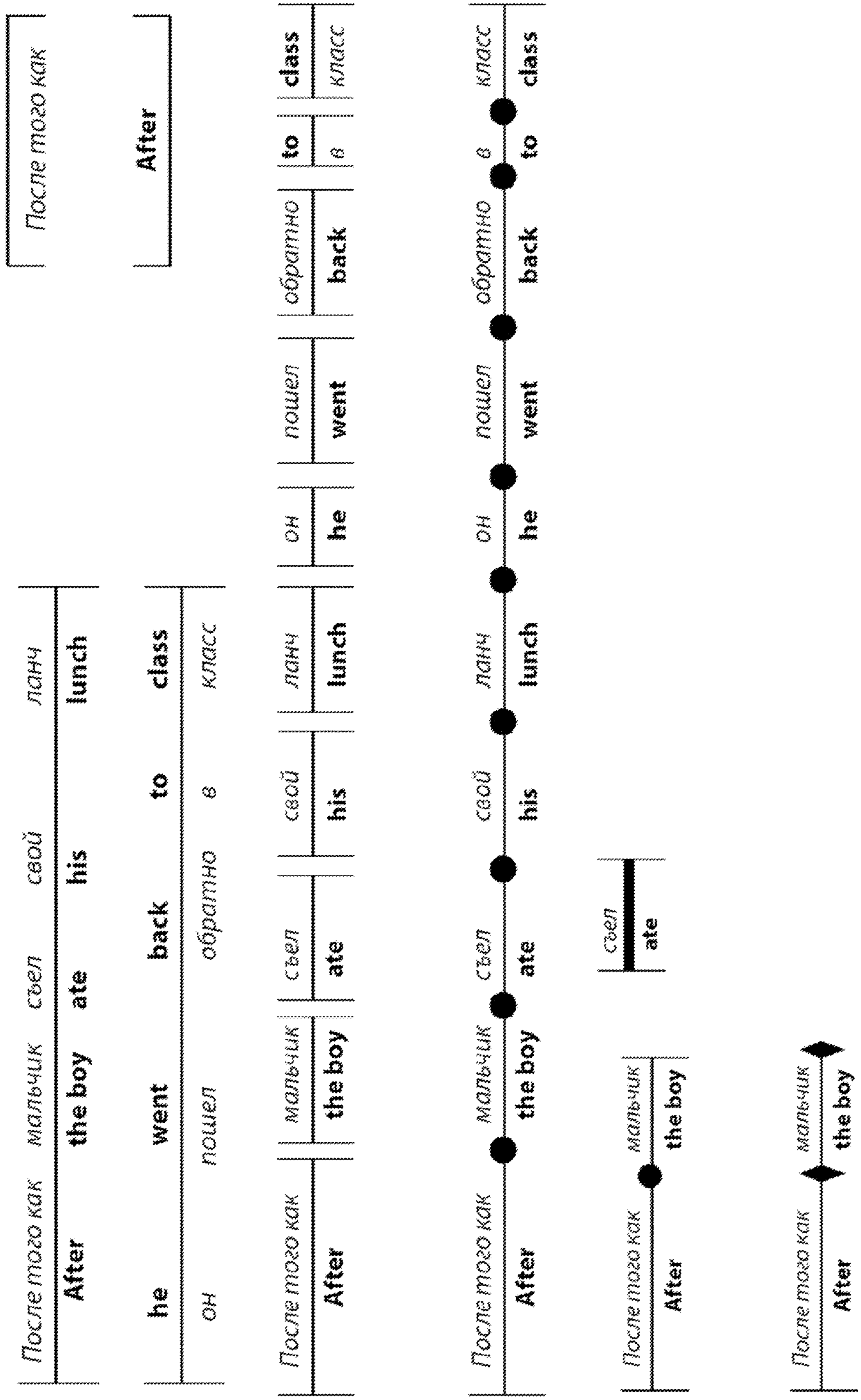
Figure 35B:
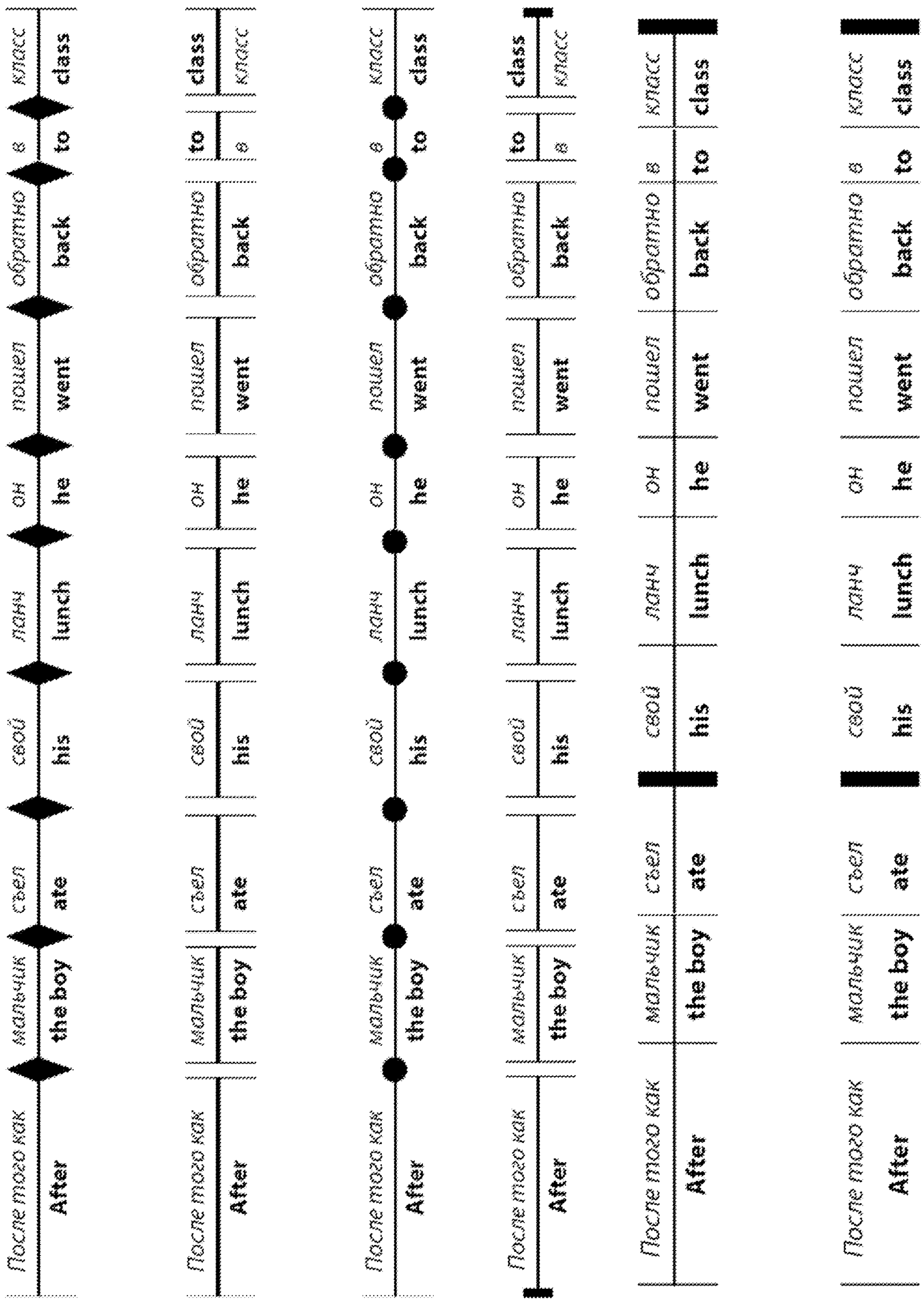
Figure 35C:
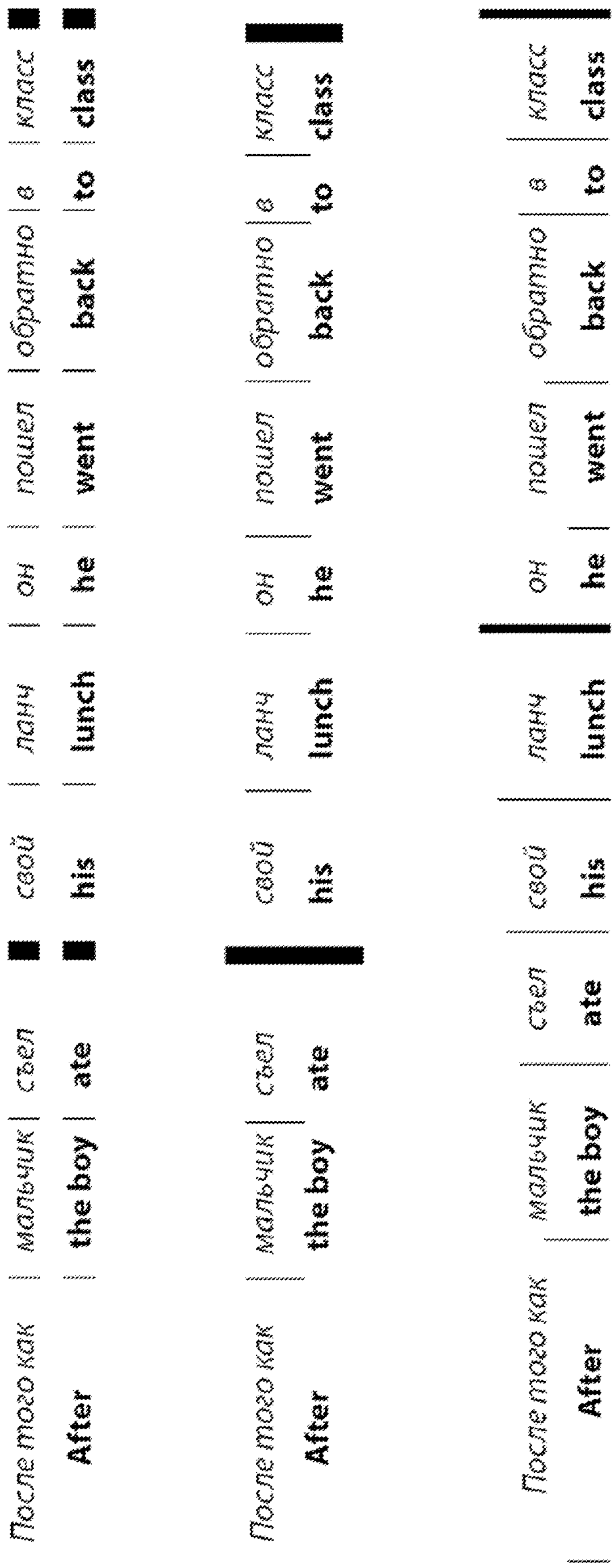
Figure 35D:
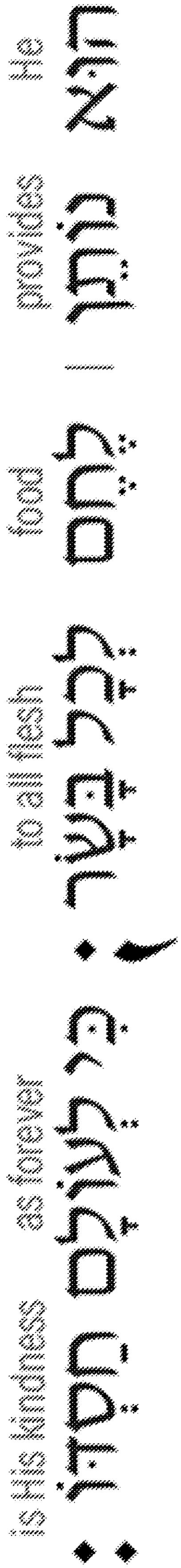
Figure 35E:
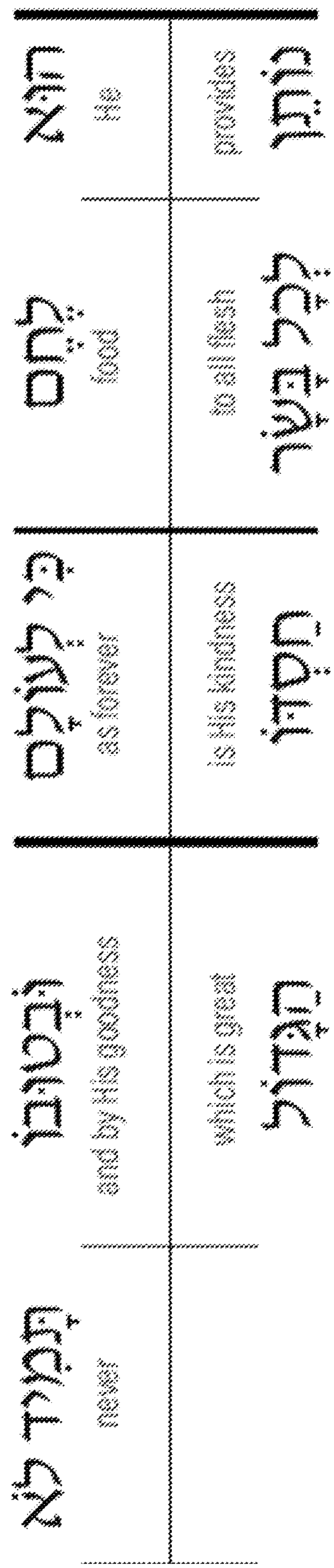
Figure 35F:
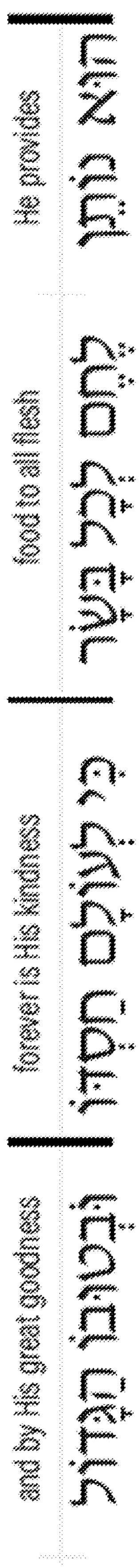
Figure 35G:
Figure 36A:
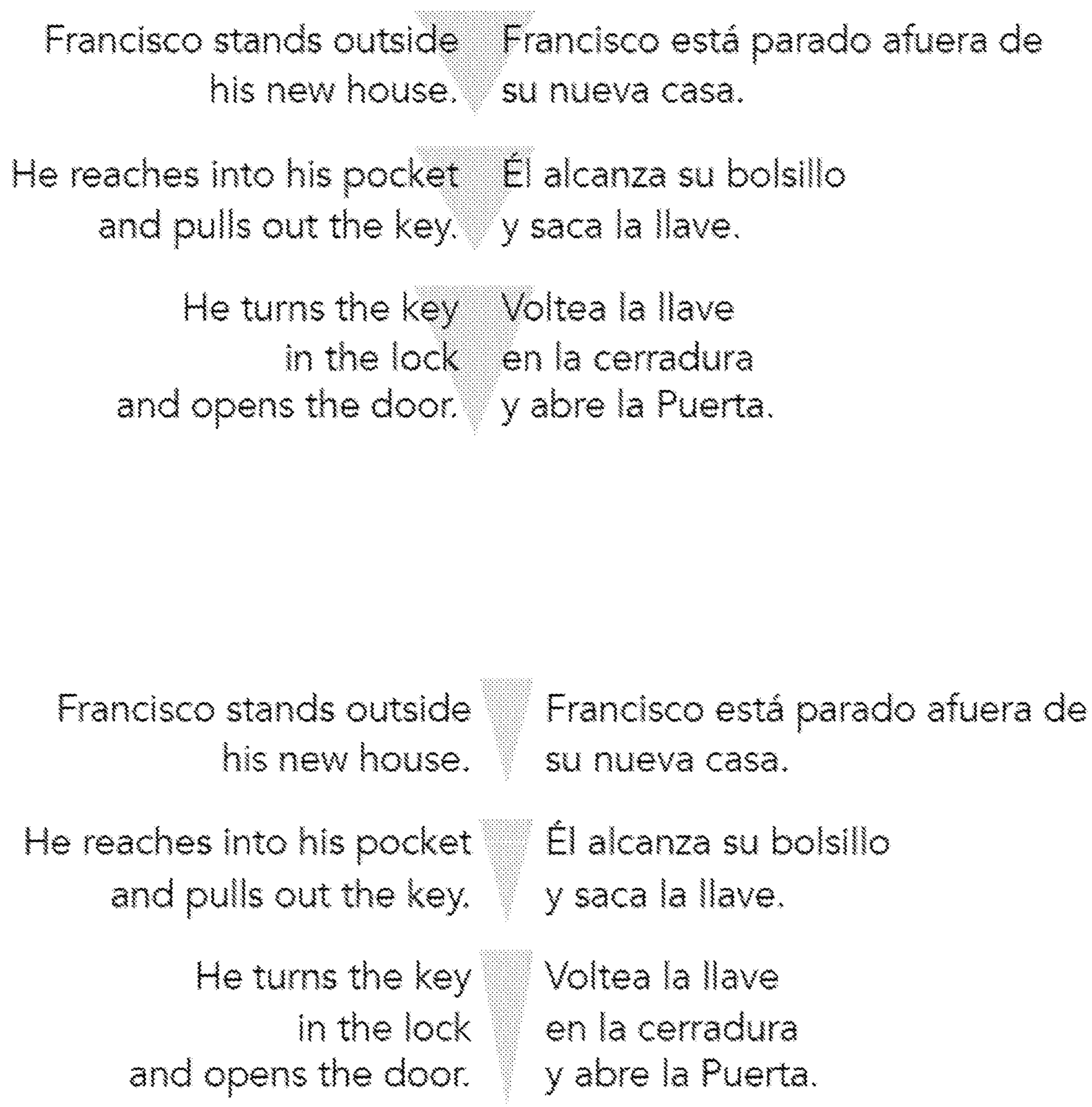
Figure 36C:
Figure 36D:
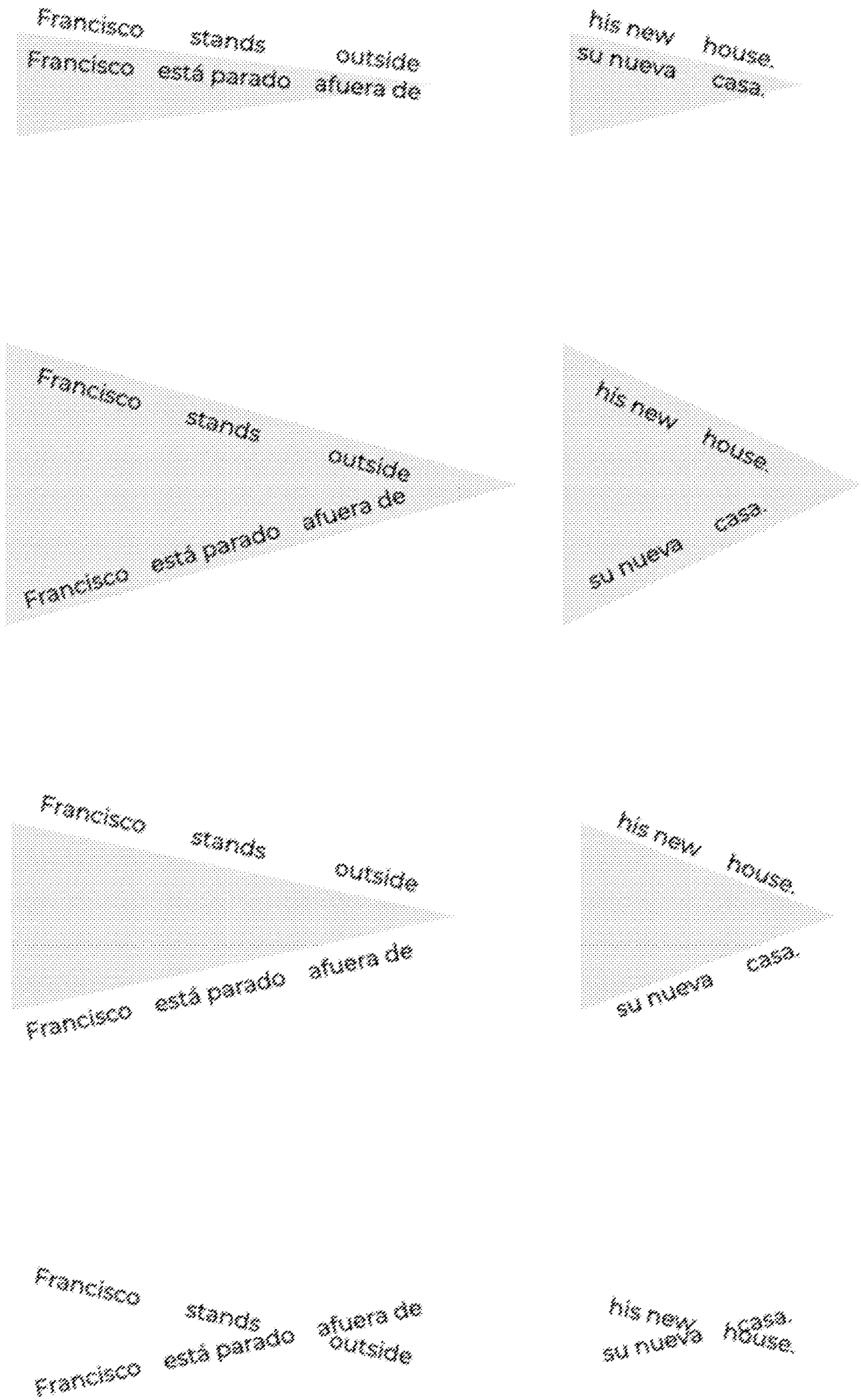
Figure 36E:
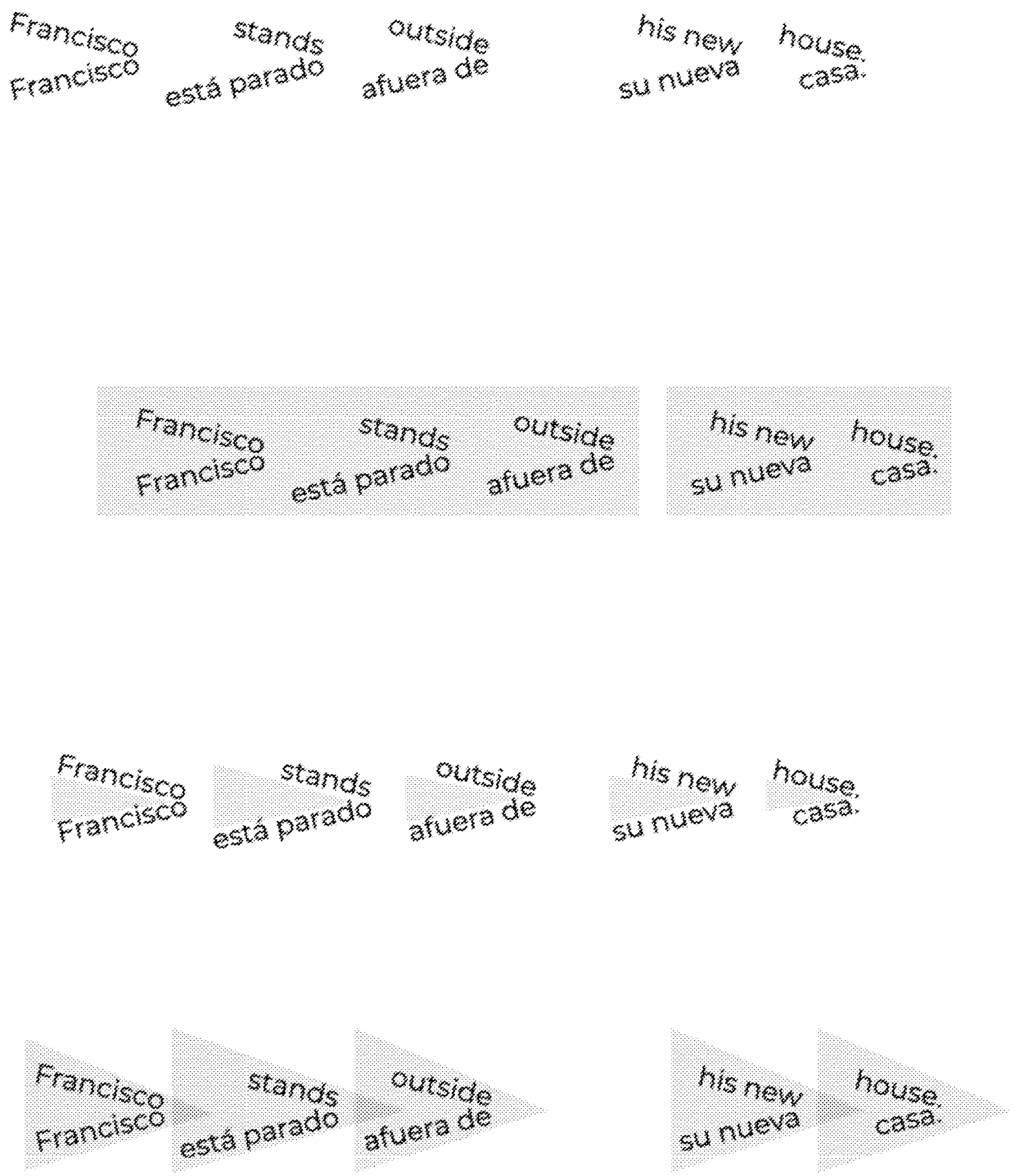
Figure 37C:
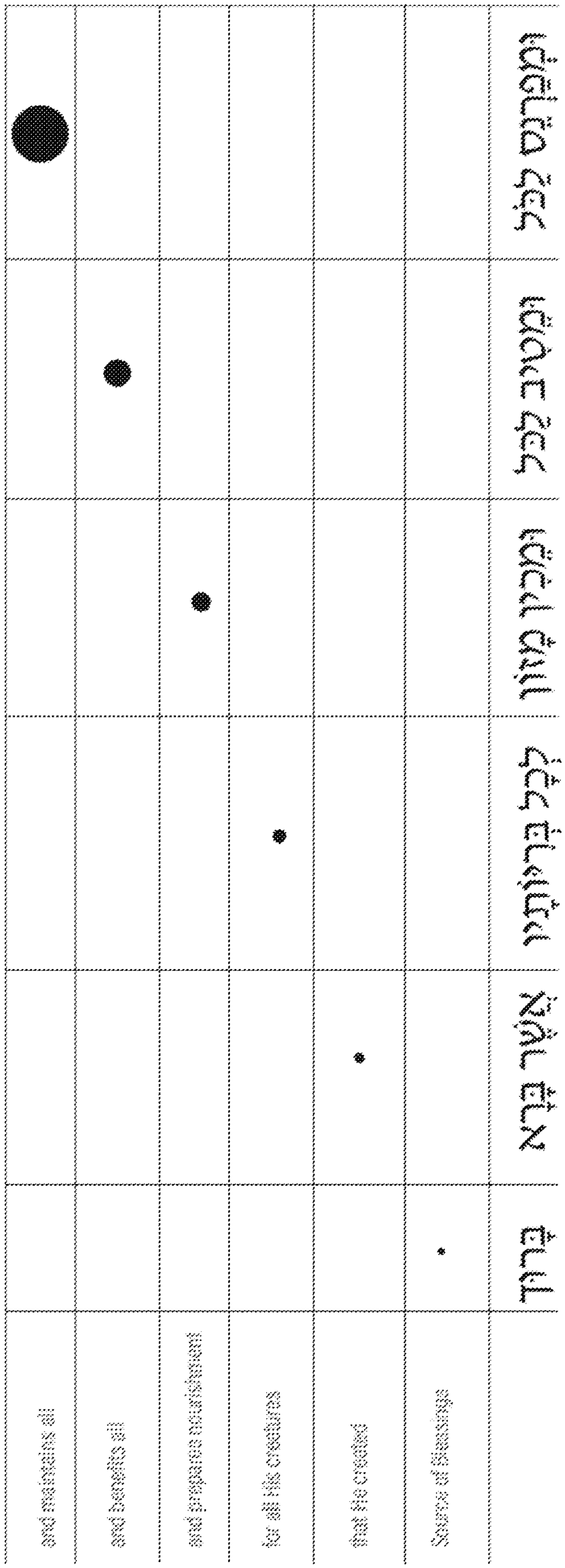
Figure 37E:
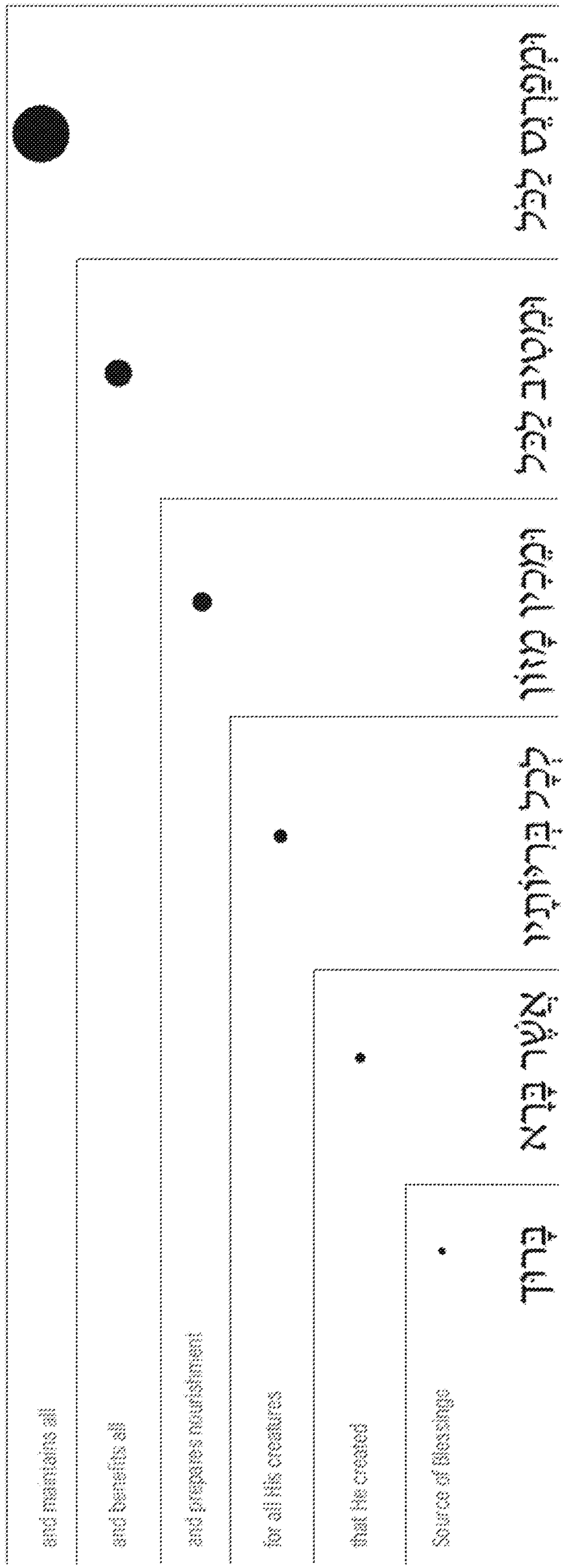
Figure 37F:
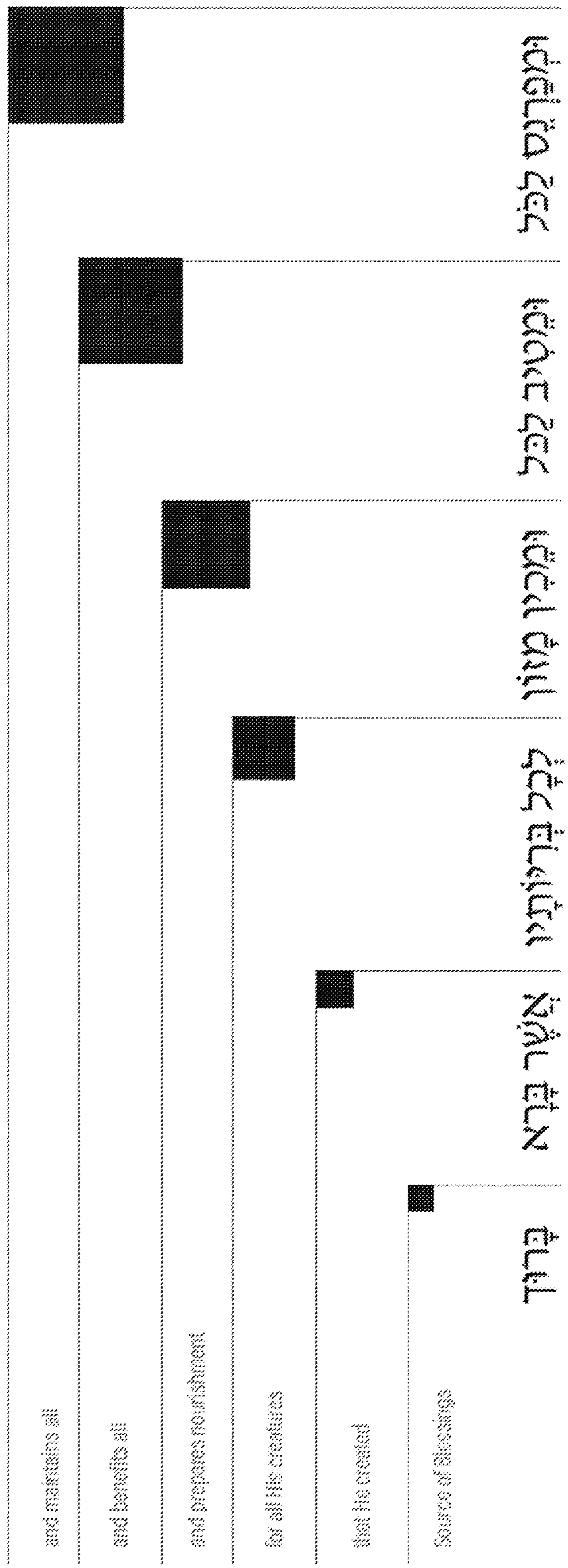
Figure 37G:
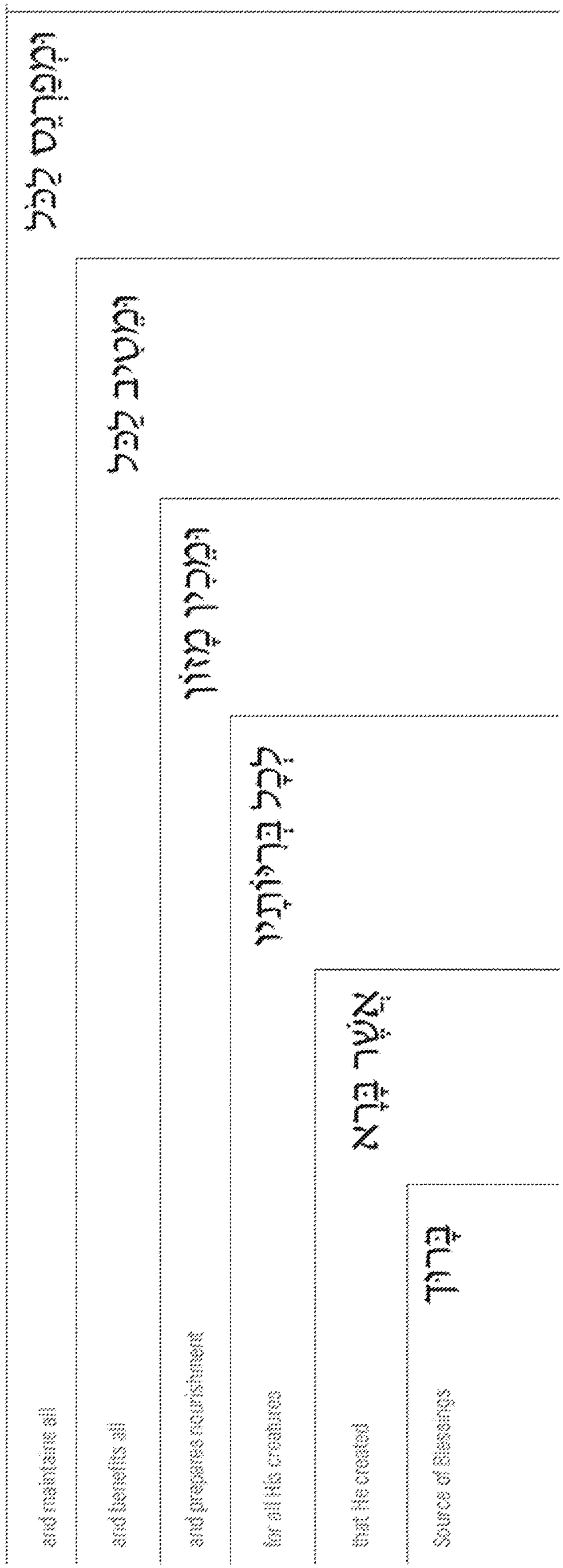
Figure 37H:
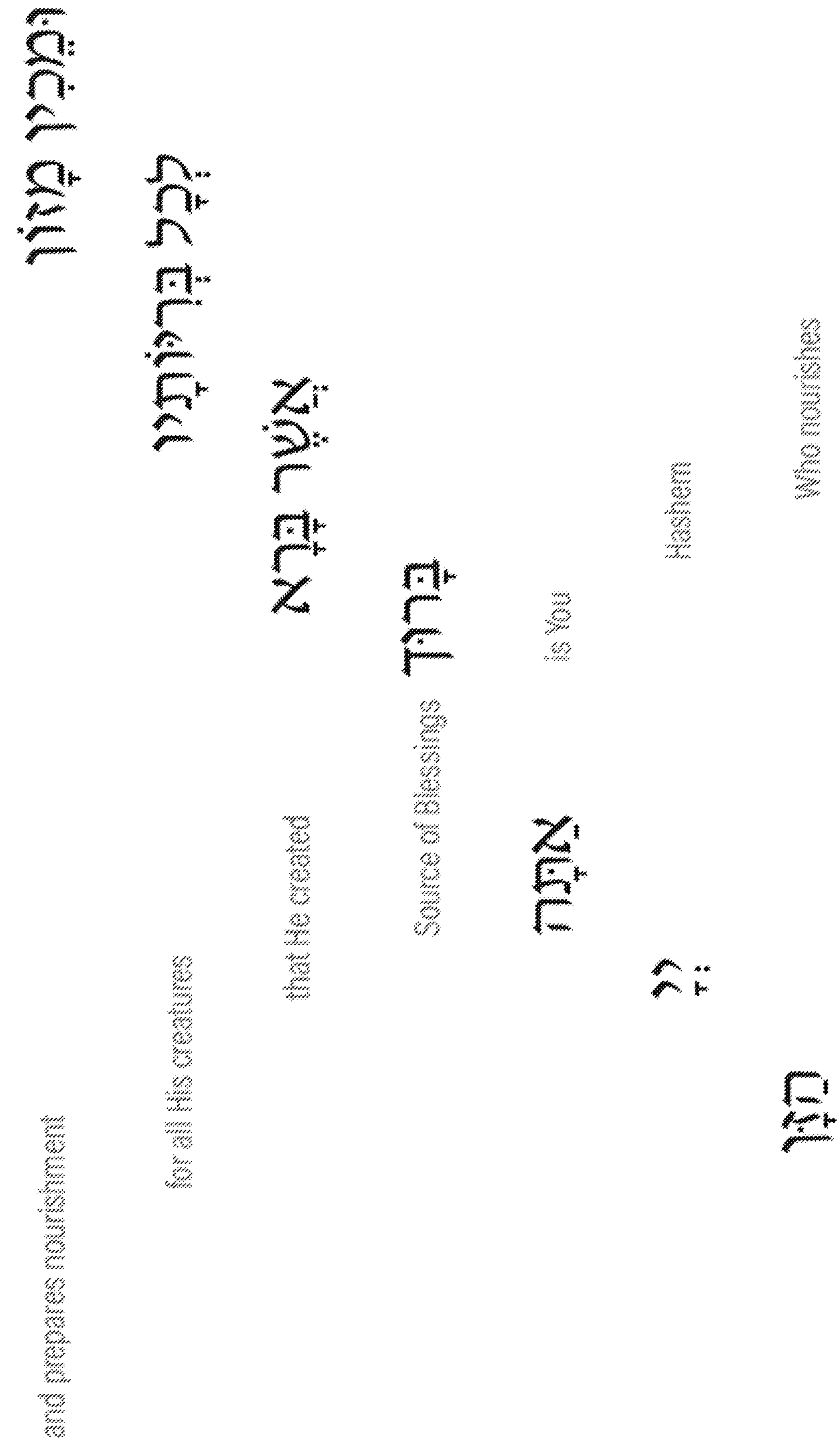
Figure 37I:
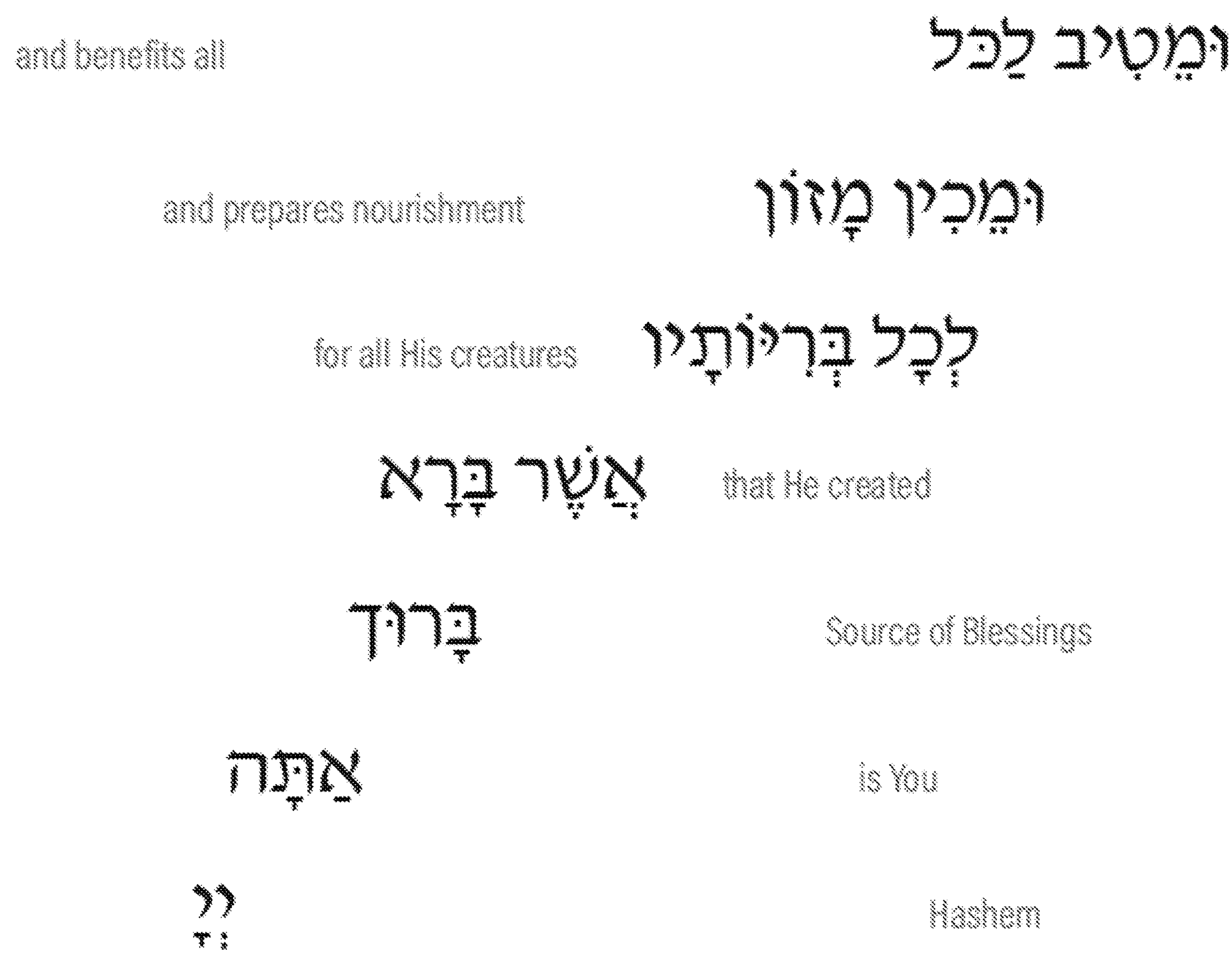
Figure 37J:
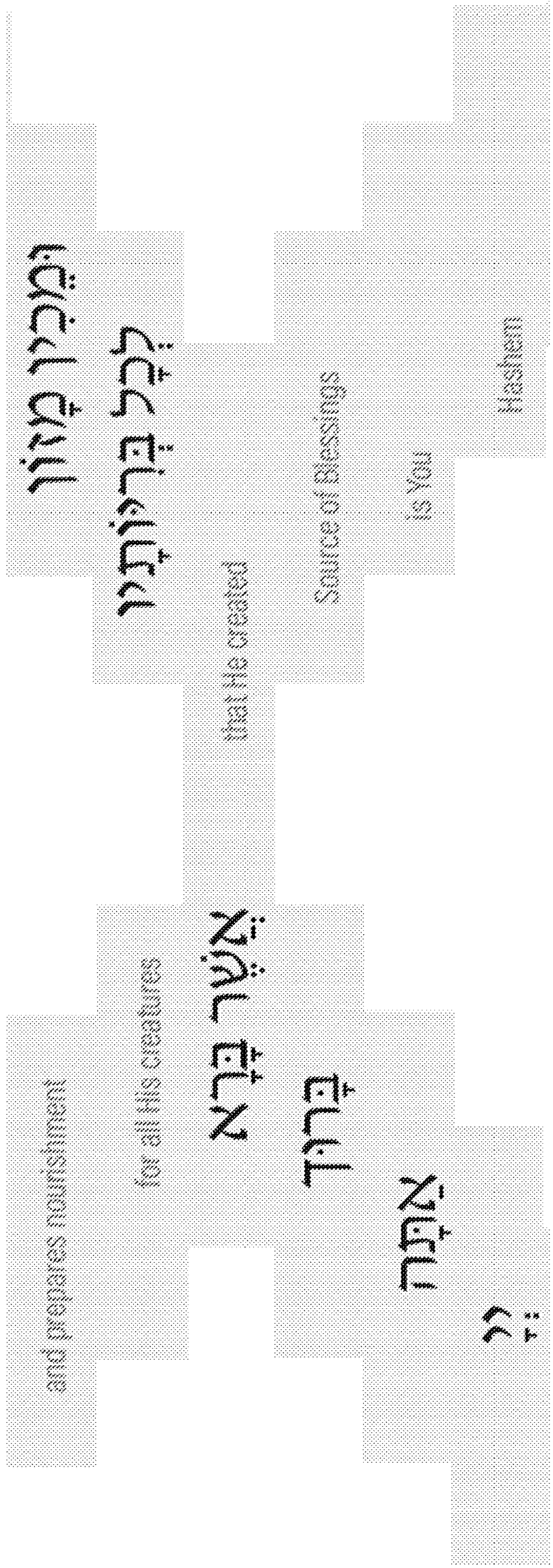
Figure 37K:
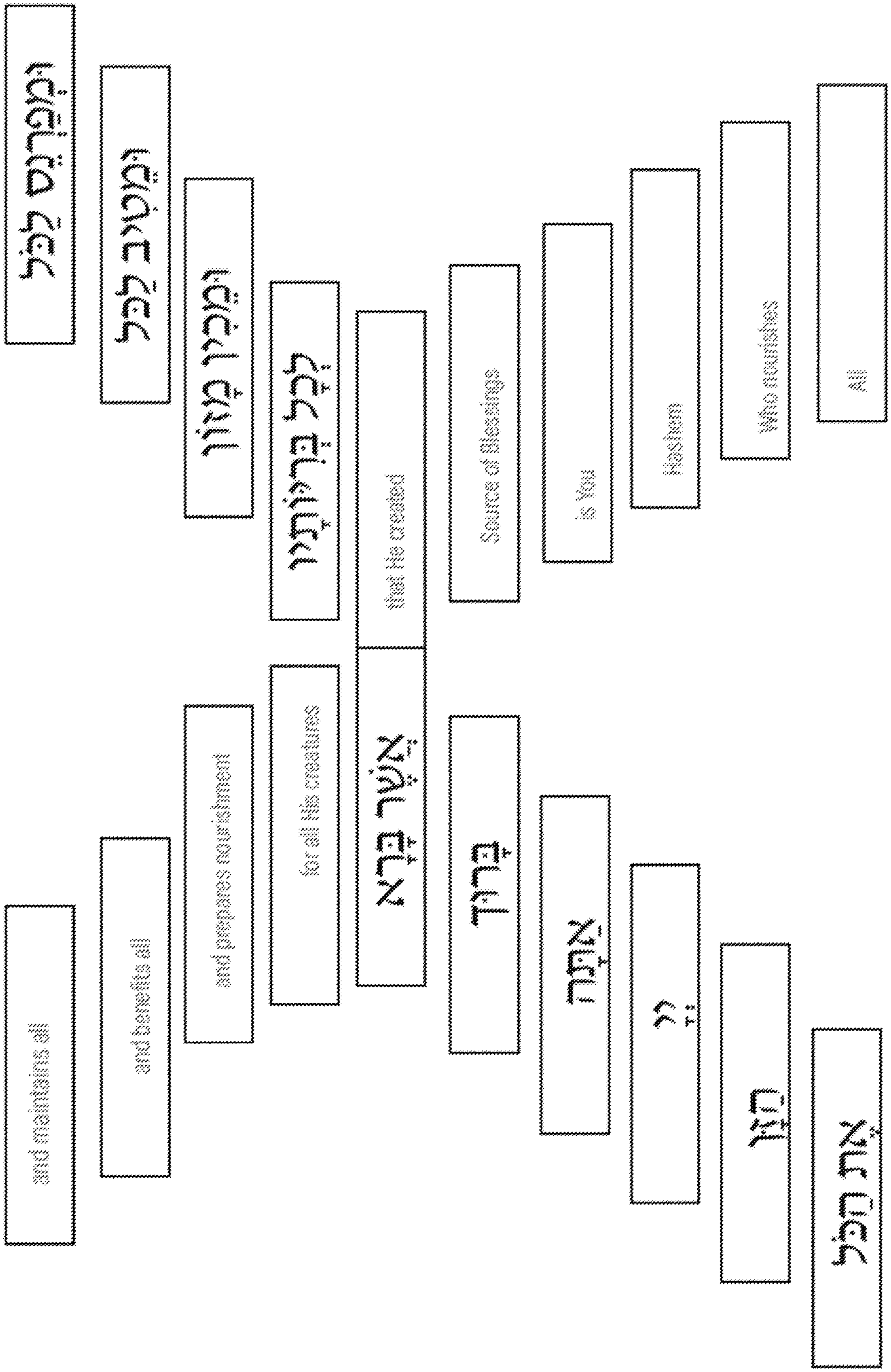
Figure 371:
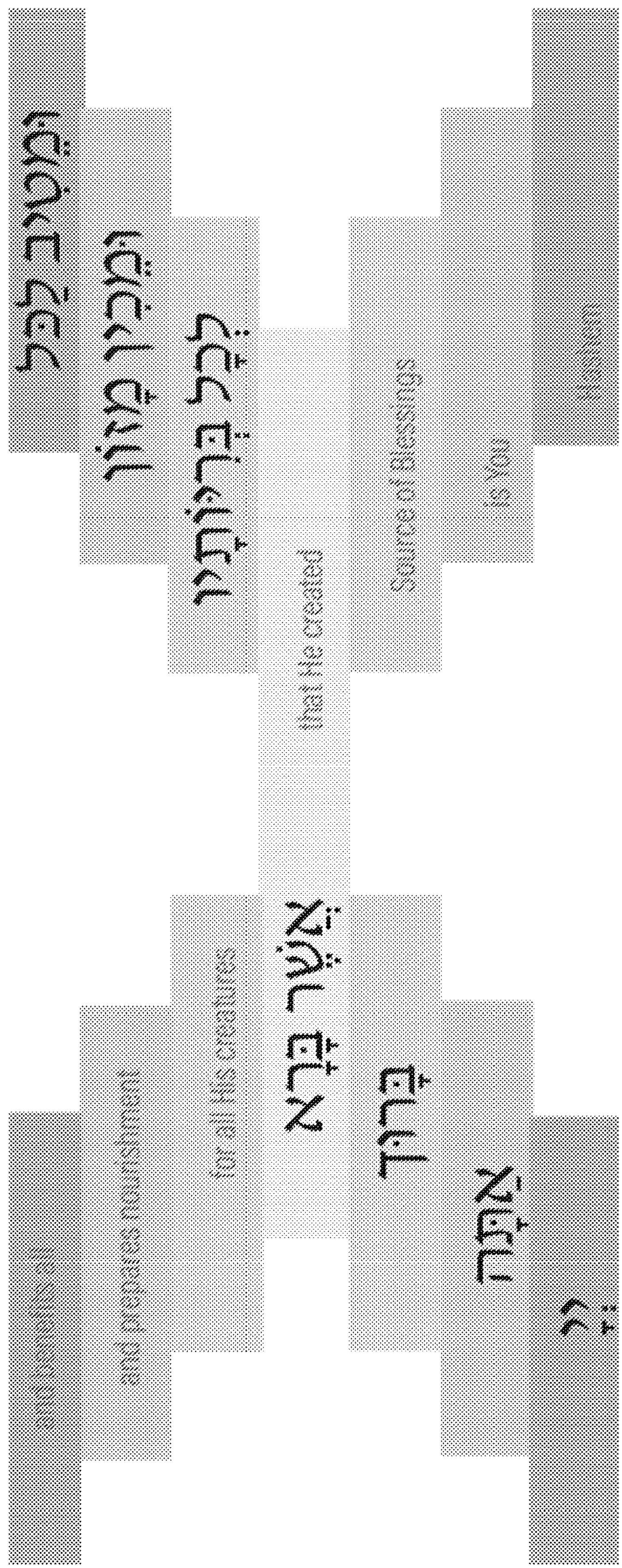
Figure 37M:
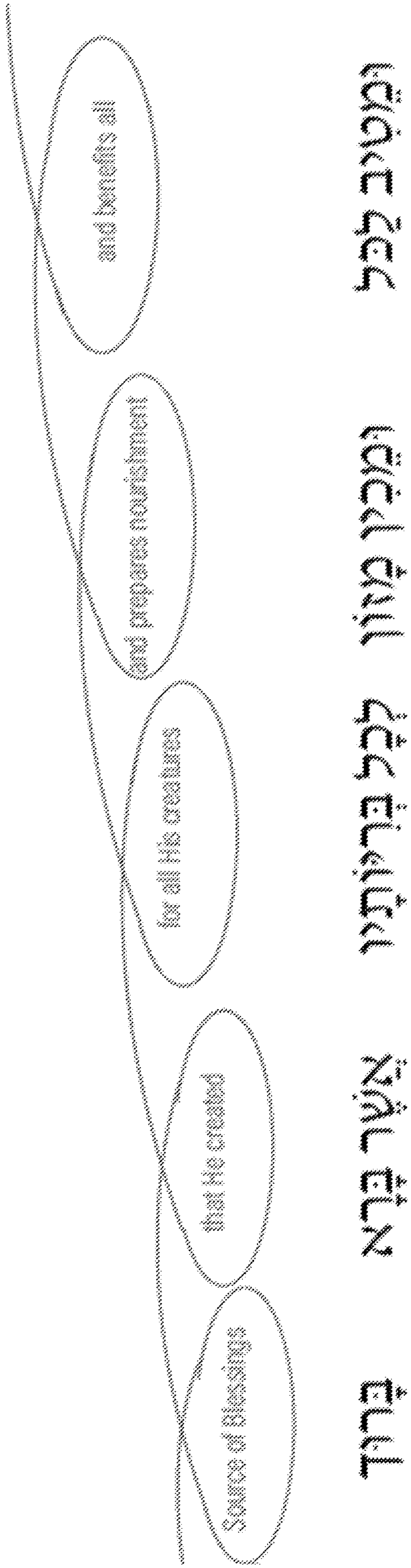
Figure 37O:
Figure 37P:
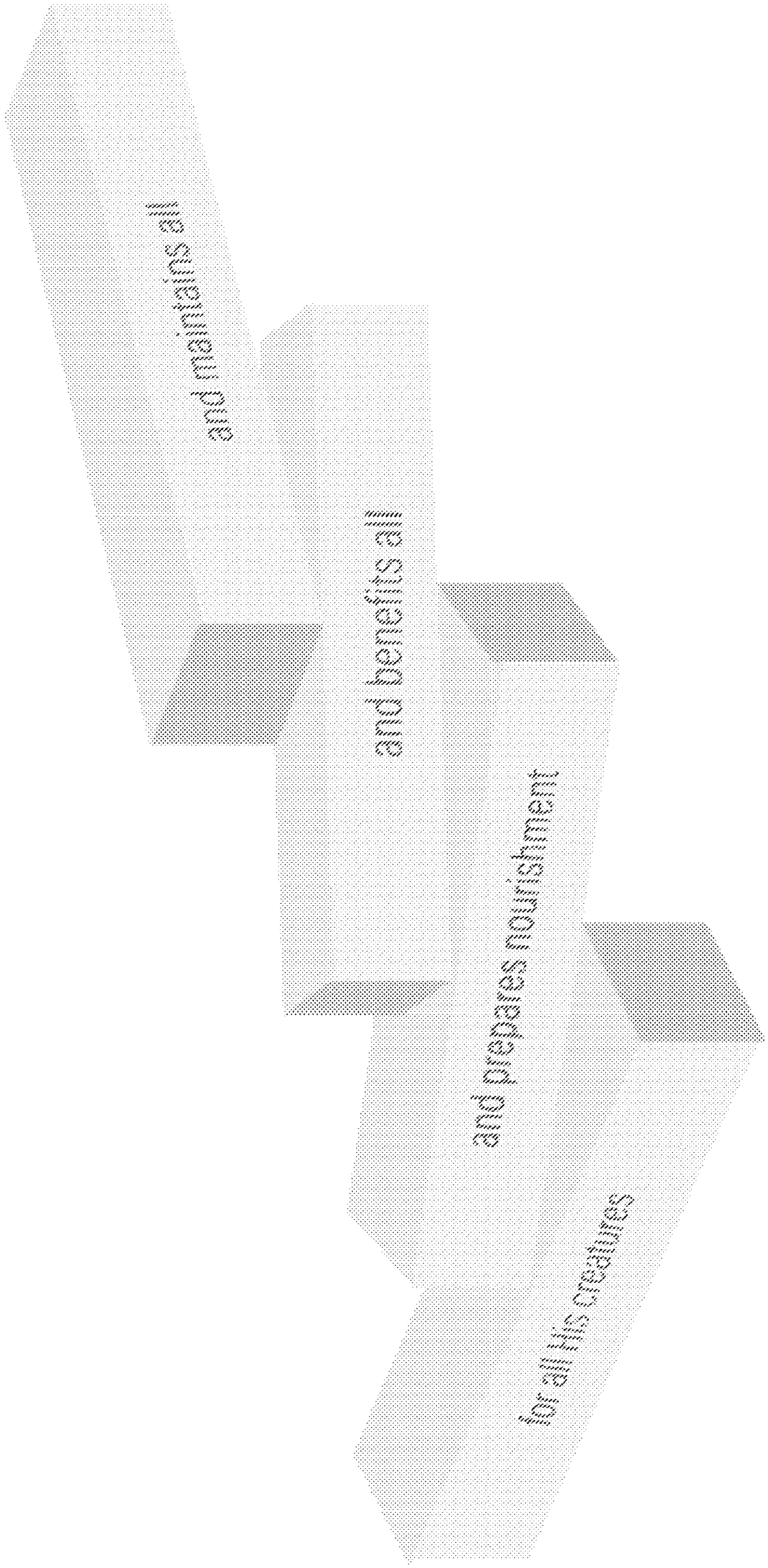
Figure 39A:
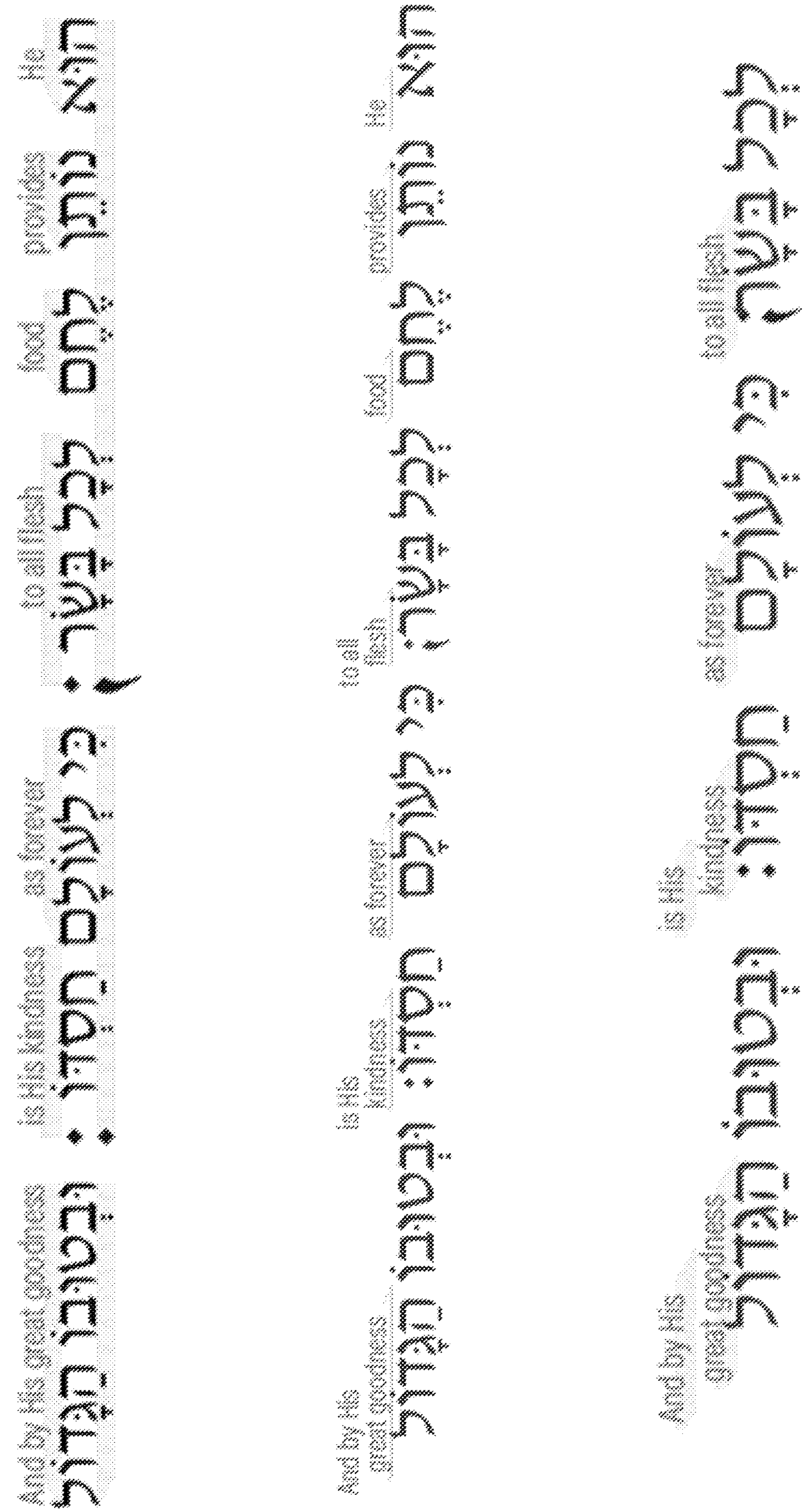
Figure 39B:
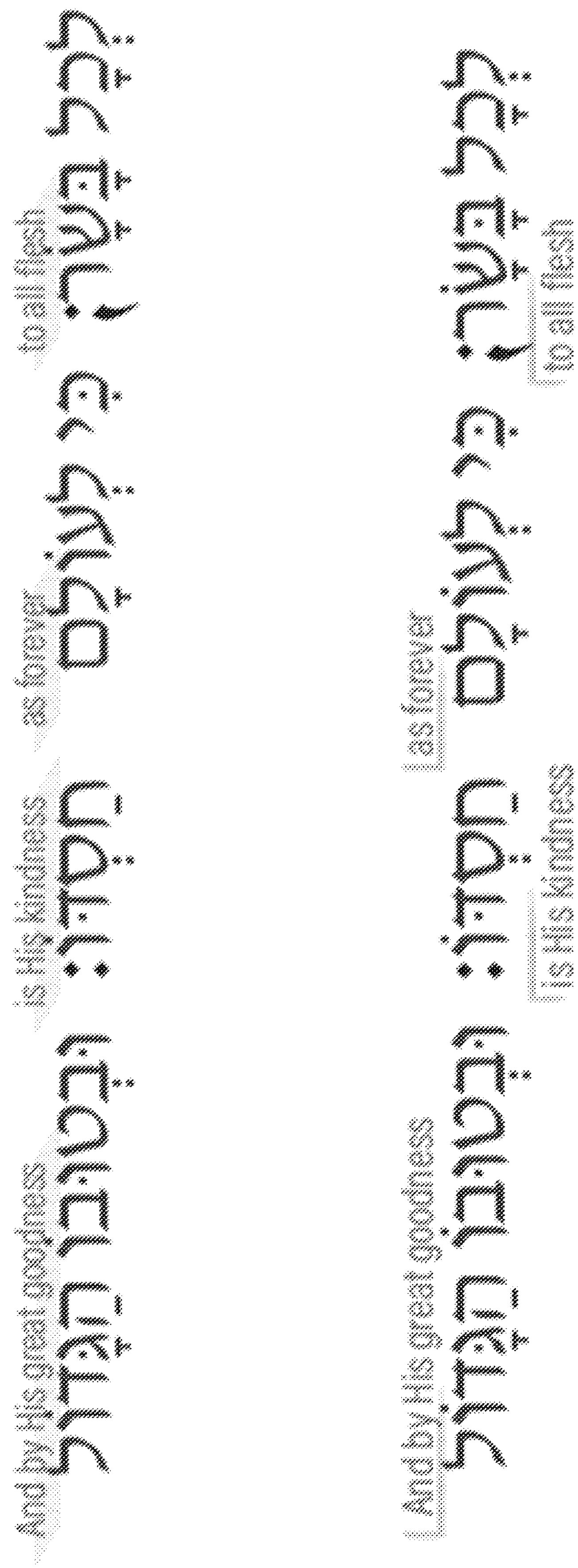
Figure 39C:
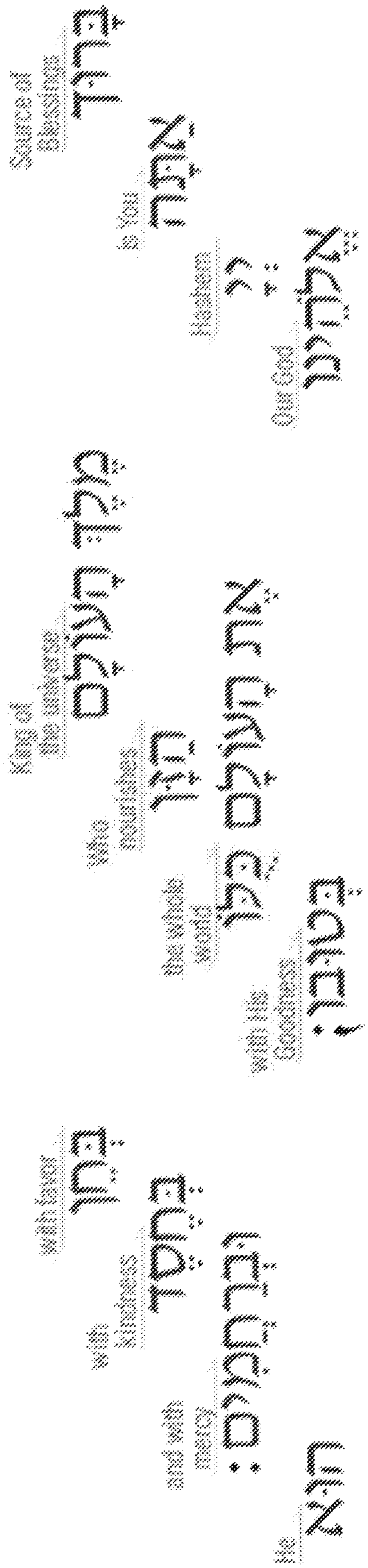
Figure 40:
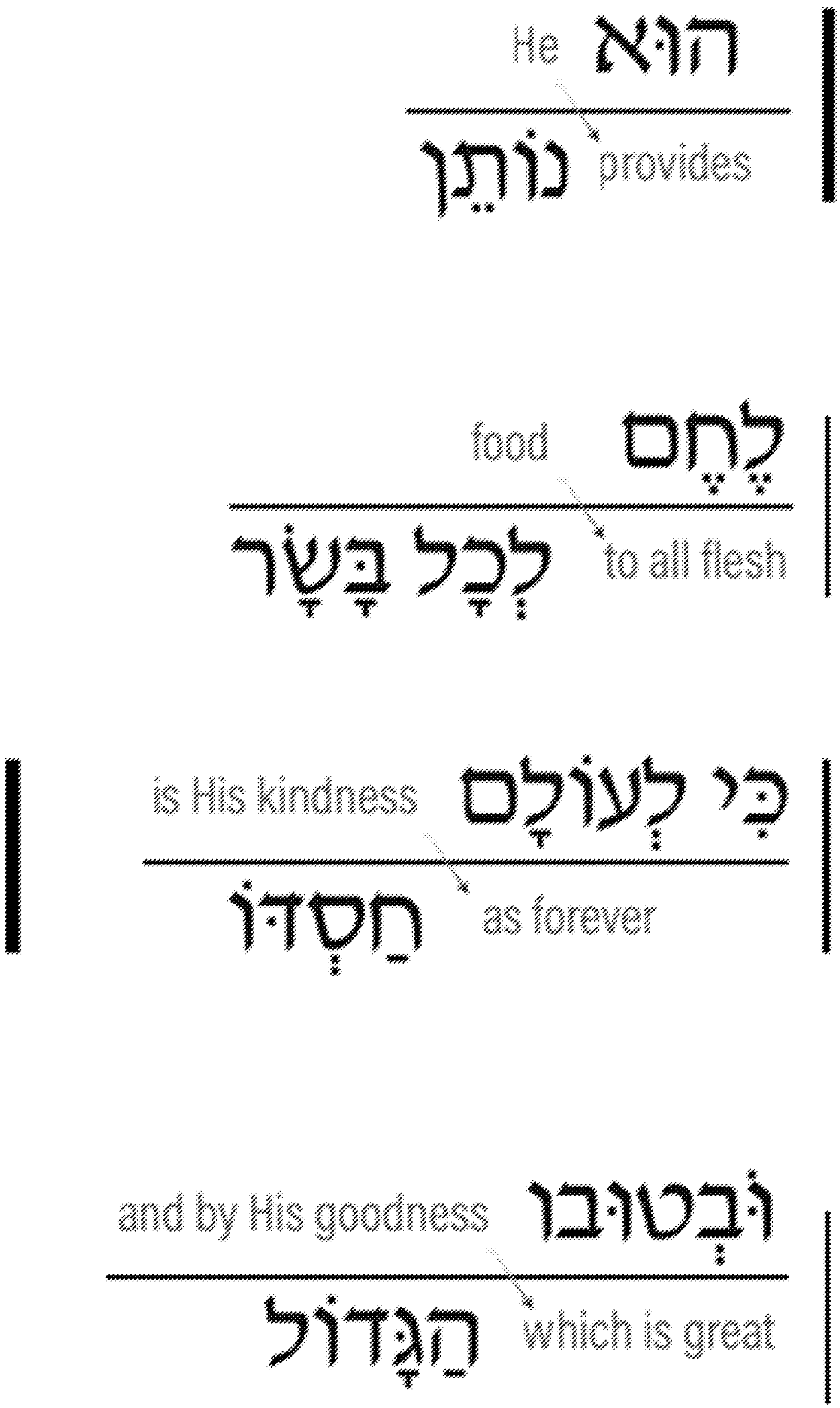

FIGS. 31*a*-31*b* show various CTDFs of a Hebrew text string comprised of Hebrew text segments and a corresponding English text string comprised of English text segments.

FIGS. 32-40 show further exemplary representations indicating how visual demarcations can be configured between and/or with respect to the pair of substrings in an exemplary and non-limiting aspect of the present invention.

Figure 41:
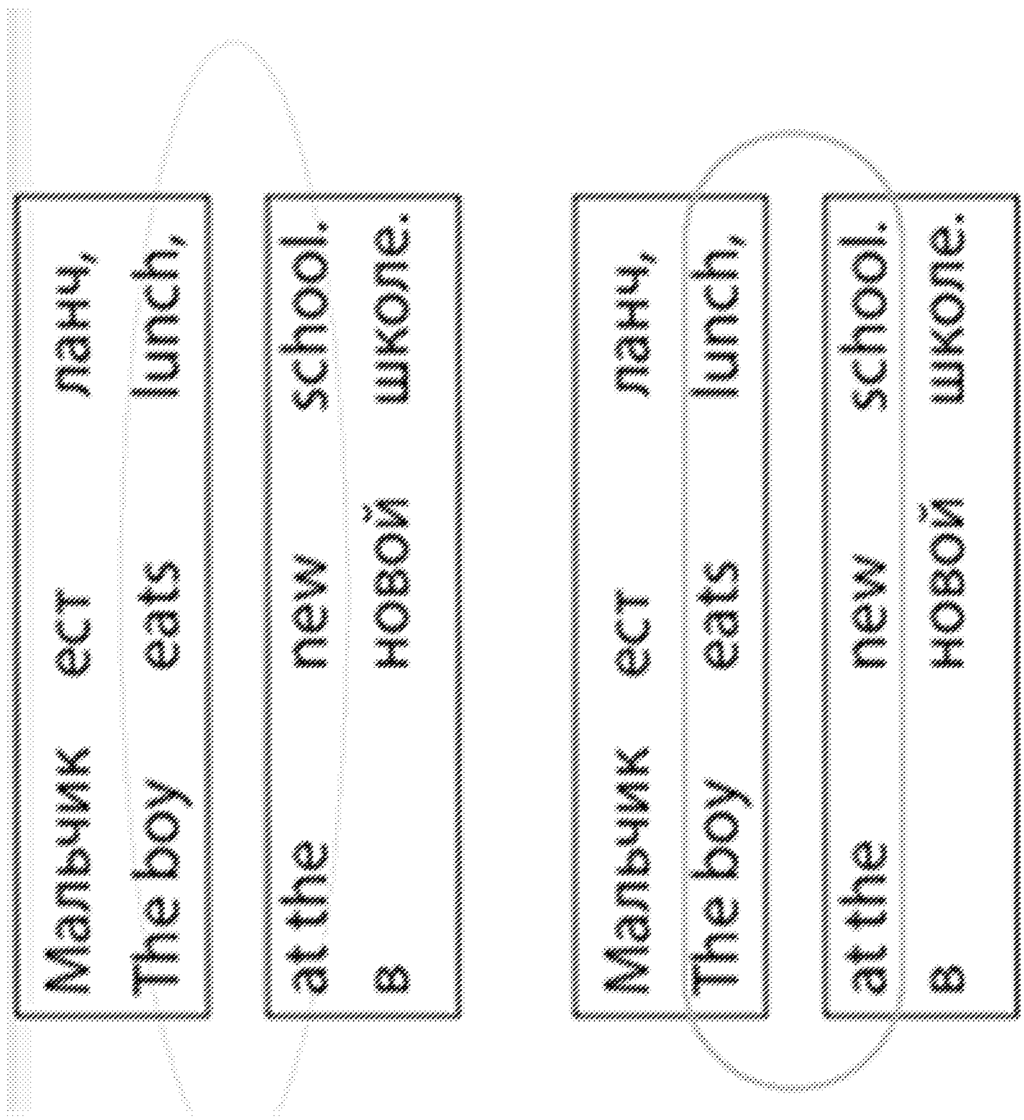

FIG. 41 shows a display scheme having the primary substrings displayed across two vertically adjacent lines. The corresponding secondary substrings are positioned external relative to their corresponding primary substrings. First visual demarcations (e.g., the light grey ovals) surround or interact with the primary substrings, indicating that the primary substrings belong to a single primary string. Second visual demarcations (e.g., the grey rectangles) surround or interact with substring pairs, indicating a correspondence between the secondary substrings and their corresponding primary substrings. This display scheme is advantageous for comparative text displays having a small width (e.g., such as smartphone displays). The primary and secondary text strings can be displayed in two parts where the first and second visual demarcations indicate the required associations and correspondences.

Figure 42:
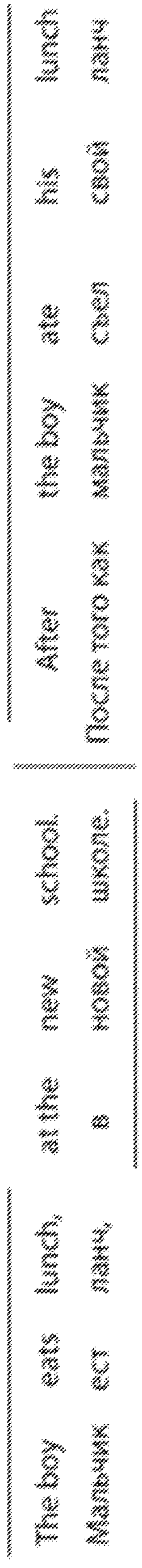

FIG. 42 shows yet another exemplary representation of visual demarcation, wherein the demarcation allows both languages to be read in their correct direction, even though opposite. Hebrew is read right to left and English is read here left to right (assisted by the arrow).

Figure 43:

FIG. 43 shows another exemplary representation of visual demarcations wherein the representation forms non-disturbed sentences in vertical format.

Figure 44:
Figure 46A:
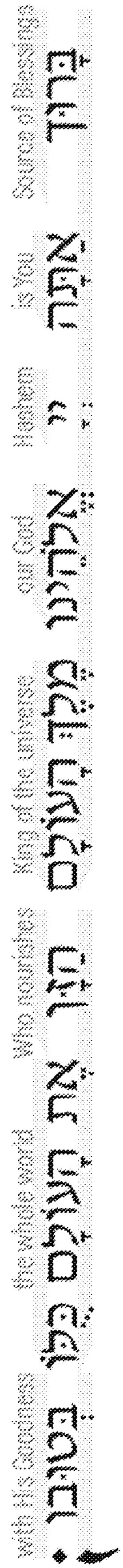
Figure 46B:
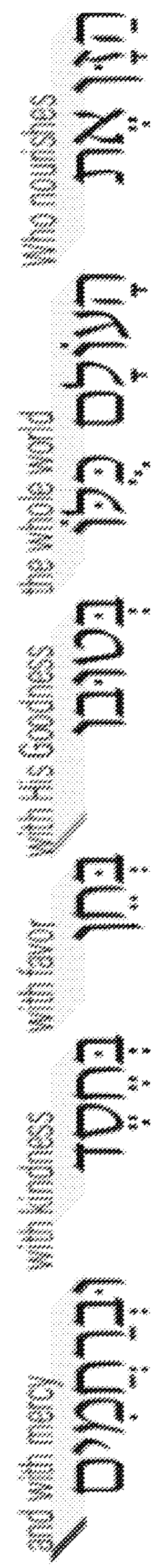
Figure 47A:
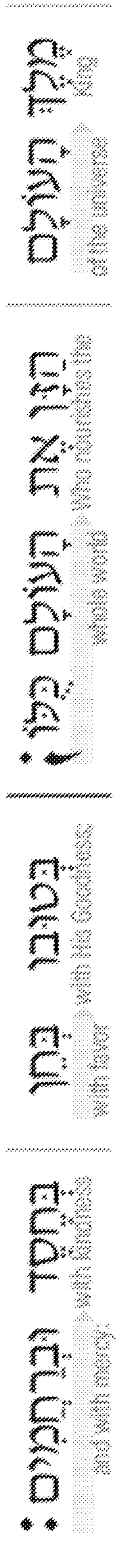
Figure 47B:
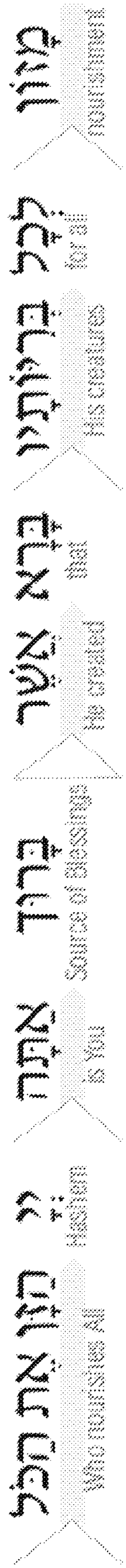
Figure 48A:
Figure 48B:
Figure 48C:

FIG. 44 shows another exemplary representation of visual demarcation wherein in each translated short phrase (separated by vertical lines), the English is written normally from left to right and the Hebrew is written normally (right to left). This is why only the first word in each language overlaps as the true translation and the second word of both are left empty, since they go in opposite directions.

FIGS. 45-48 show further visual demarcations between and/or with respect to the substring pairs in an exemplary and non-limiting aspect of the present invention.

Figure 49A:
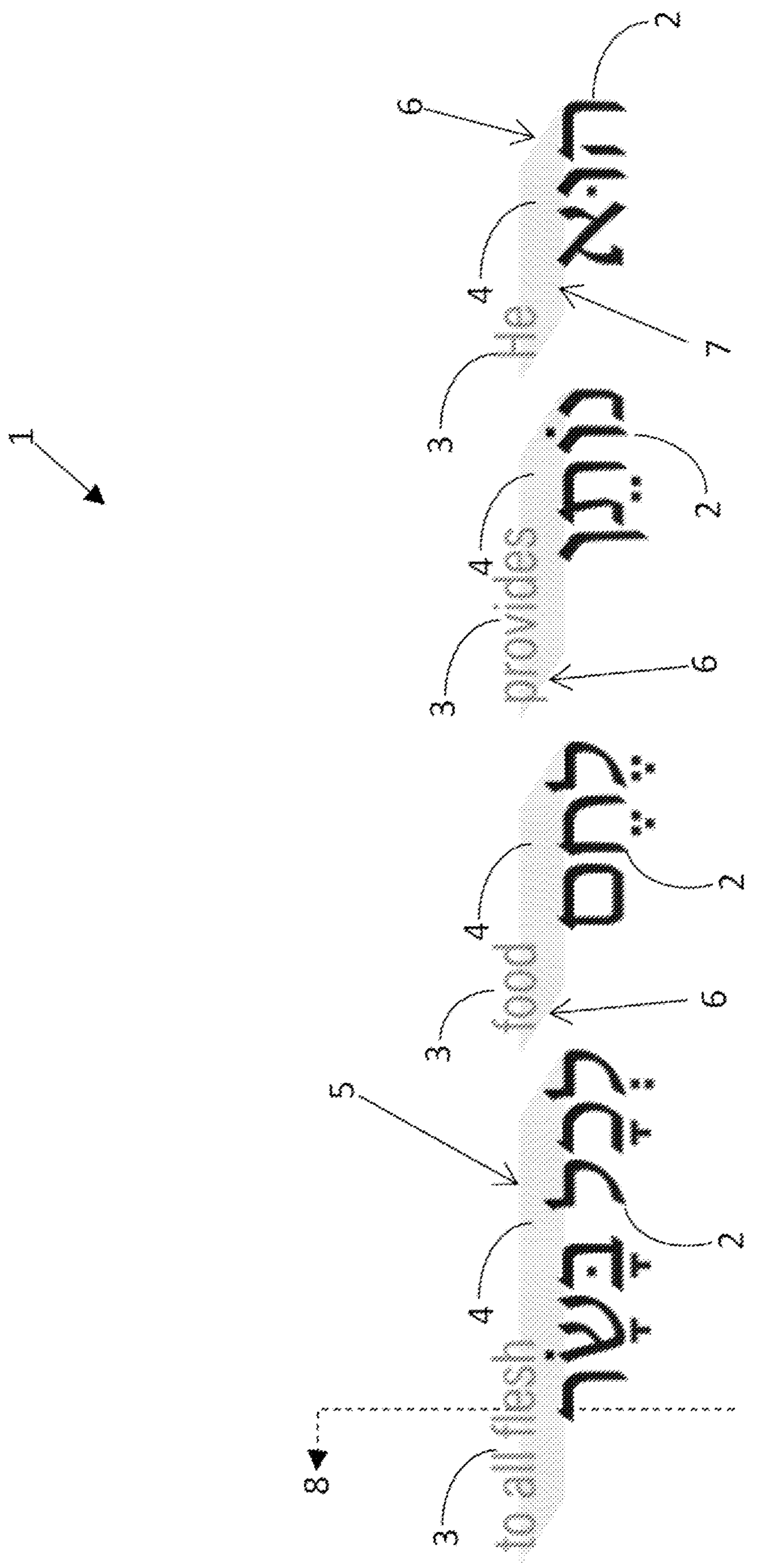

FIG. 49*a* is a display scheme 1 for a primary text 2 and secondary text 3, according to an embodiment. Diagonal edges 6 and 7 of shaded oblique-parallelogram 4, act as perspective lines that when viewed together with secondary text 3, causes oblique-parallelogram 4 to appear as a shelf in space supporting secondary text 3. The apparent shelf creates a mental demarcation between primary text 2 and secondary text 3 thereby removing visual congestion found in typical linear translations. Secondary text 3 is implemented in a color lighter than the font color of primary text 2 to further reduce reading interference enabling the reader to view the translation text 2 only if he desires. The color and shading of the secondary text 3 and parallelogram 4 are user configurable.

Edge 7 of parallelogram 4 is in abutment with the primary text 2, in a certain embodiment. The abutment advantageously reduces visual clutter by abutting parallelogram 4 with the glyphs of primary text 2.

As shown, secondary text 3 is horizontally offset in the reading direction of primary text 2. The offset advantageously helps delay reading of secondary text 3 until reading of primary text 2 is complete. The reading delay helps minimize mental overload also common in traditional linear translations whose text alignment urges reading of both a foreign text and its translation simultaneously. In a certain embodiment, the extent of secondary text offset is at least one as at least one syllable. The offset is measured from the end of the primary text relative to the reading direction. In a certain embodiment, the extent of horizontal offset is a configurable parameter set by a user. When the display scheme is deployed for languages in which both languages are read in the same direction, from left to right for example, the offset is implemented on the right edge of primary text 2.

Figure 49B:
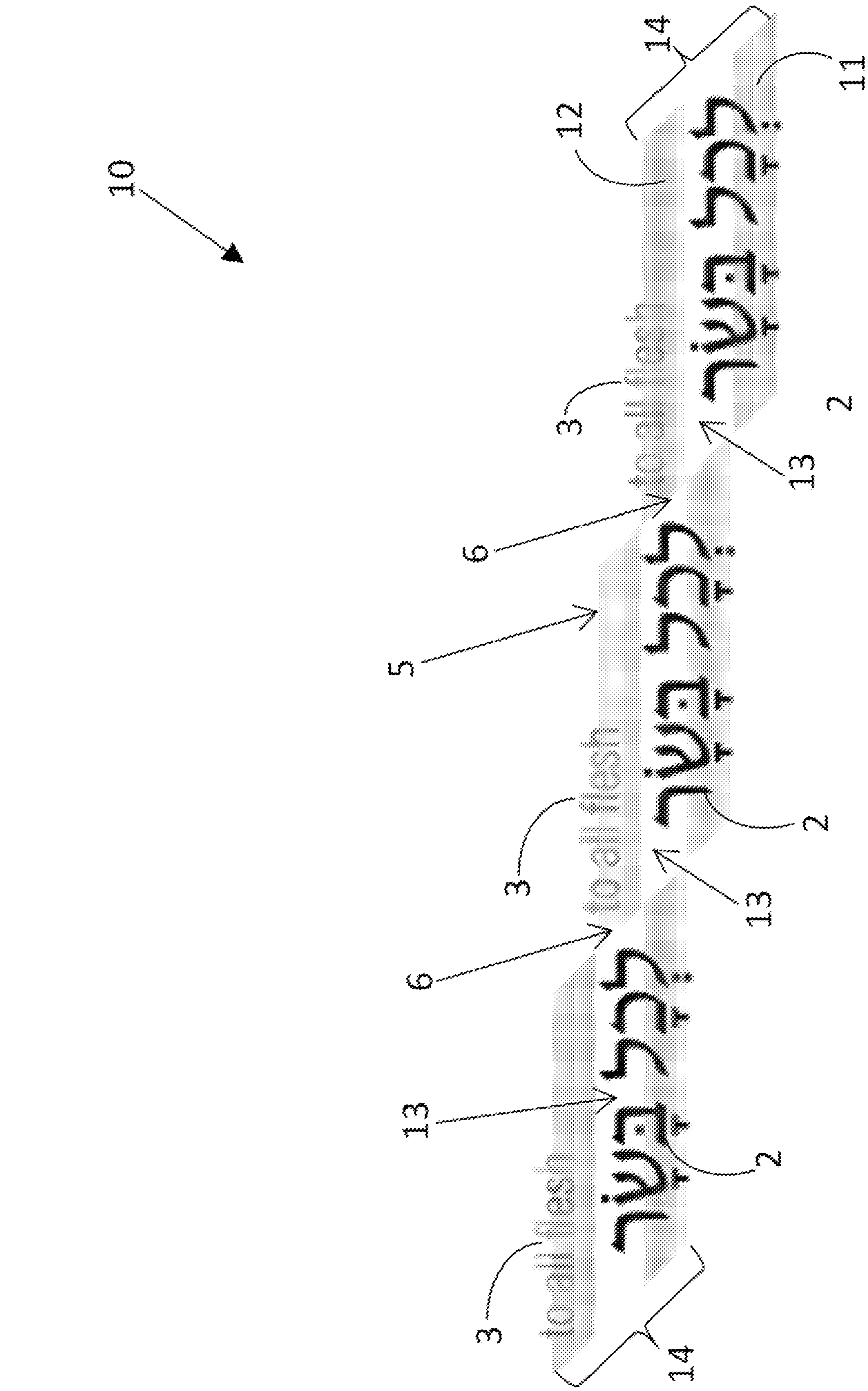

FIG. 49*b* is a display scheme employing a series of staggered, composite oblique-parallelograms 14. Each composite oblique-parallelograms 14 includes a shaded front-parallelogram 11 and a shaded back-parallelogram 12 separated by an intermediary, unshaded parallelogram 13. As shown, primary text 2 is disposed within shaded front-parallelogram 11 and secondary text 3 is disposed in shaded back-parallelogram 12. As noted above, the diagonal edges causes a 3D impression to emerge in which each of the texts appears to sitting on separate shelves in space.

Composite oblique-parallelograms 14 are progressively offset such that a first shaded back-parallelogram 12 is alignment with intermediary, unshaded parallelogram 13 of an adjacent composite oblique-parallelograms 14. The progressive parallelogram offset creates the impression that the that series is either fading into the depth of the page of coming out of the page.

Figures 49C, 49D, 49E:
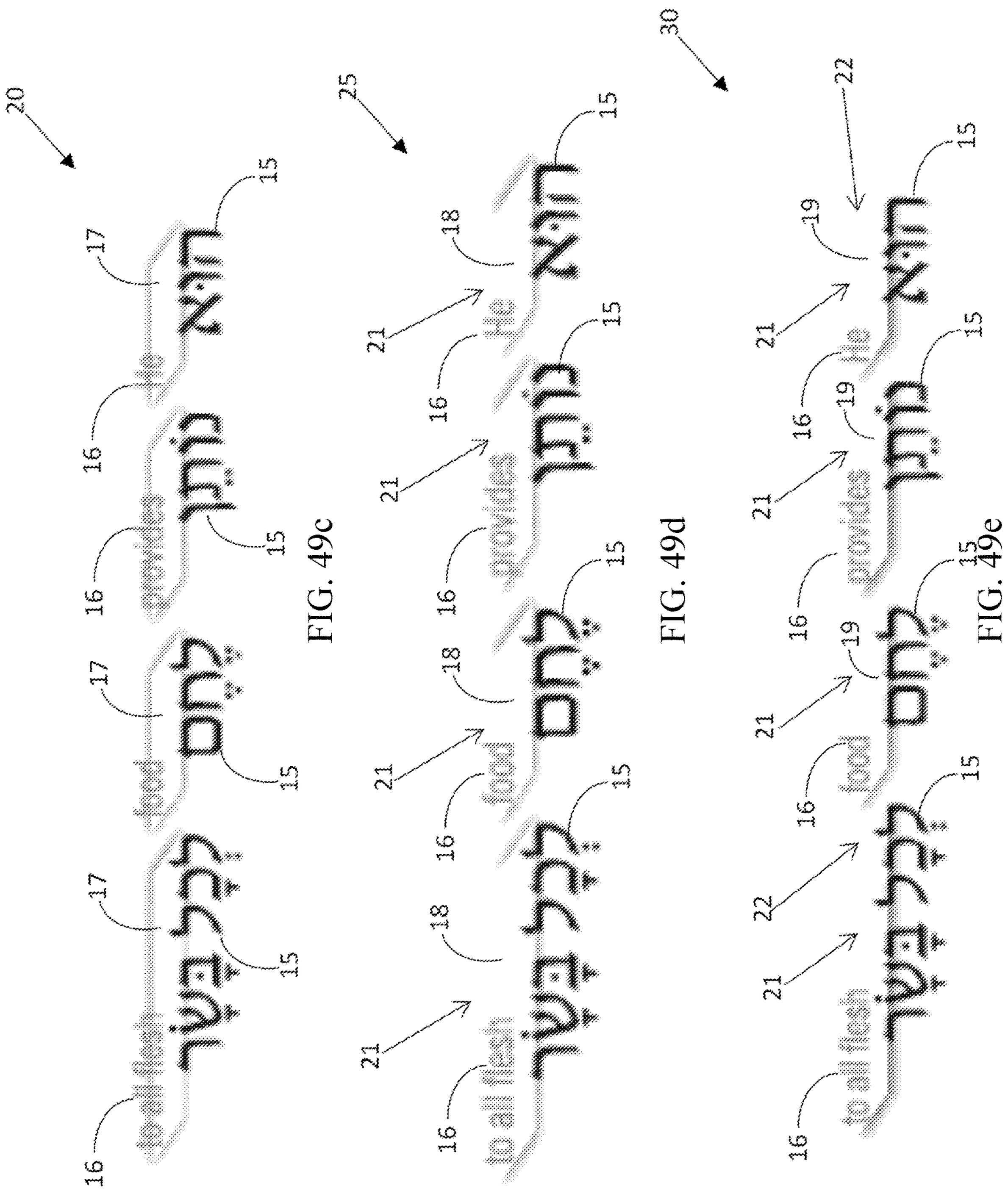

FIGS. 49*c*-49*e* are display schemes analogous to that of FIG. 49*a* except that the oblique-parallelogram is formed from two or more shadow-outlined edges whereas the body of the oblique-parallelogram is white, according to an embodiment. As shown, oblique-parallelogram 17 of FIG. 49*c* is formed from four shadow-outlined edges. Oblique-parallelogram 18 of FIG. 49*d* is formed from three shadow-outlined edges where edge 21 is unshaded. Oblique-parallelogram 19 of FIG. 49*e* is formed from two shadow-outlined edges where edges 21 and 22 are both unshaded. As shown, even two shaded edges are sufficient to create the perspective effect.

FIG. 49*c* is a display scheme of primary and secondary texts demarcated by an oblique-parallelogram formed by three-edge shadow-outline, according to an embodiment.

FIG. 49*e* is a display scheme of primary and secondary texts demarcated by an oblique-parallelogram formed by two-edge shadow-outline, according to an embodiment.

FIG. 49*f* is a display scheme 40 of primary and secondary texts, according to an embodiment. As shown a primary text 26 is partially enclosed by a shade-outlined corner 28. A secondary text 27 is disposed above corner 28 and horizontally offset in the reading direction of the primary text 26. Secondary text 27 is partially enclosed by a shade outlined corner 29. The vertex of each of shade-outlined corners 28 and 29 defines an implied perspective line that causes a 3D appearance to emerge demarcating primary and secondary texts 26 and 27. The 3D appearance is further enhanced by additional implied perspective lines 32 defined by identical angles at the ends of each of shade-outlined corners 28 and 29.

Figure 50:
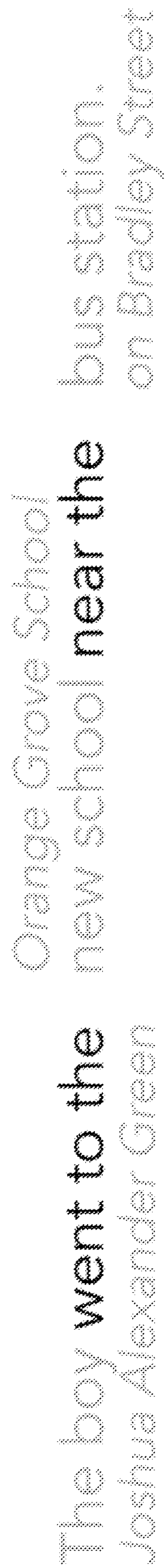

FIG. 50 shows a display scheme having secondary substrings of "Joshua Alexander Green," "Orange Grove School," and "on Bradley Street," alternating above and below their corresponding primary substrings of "The boy went to the," "new school near the," and "bus station." Corresponding words within a substring pair are displayed having similar attributes. For example, "Orange Grove School" and "new school" are both a lighter shade, indicating a correspondence.

Figure 51:
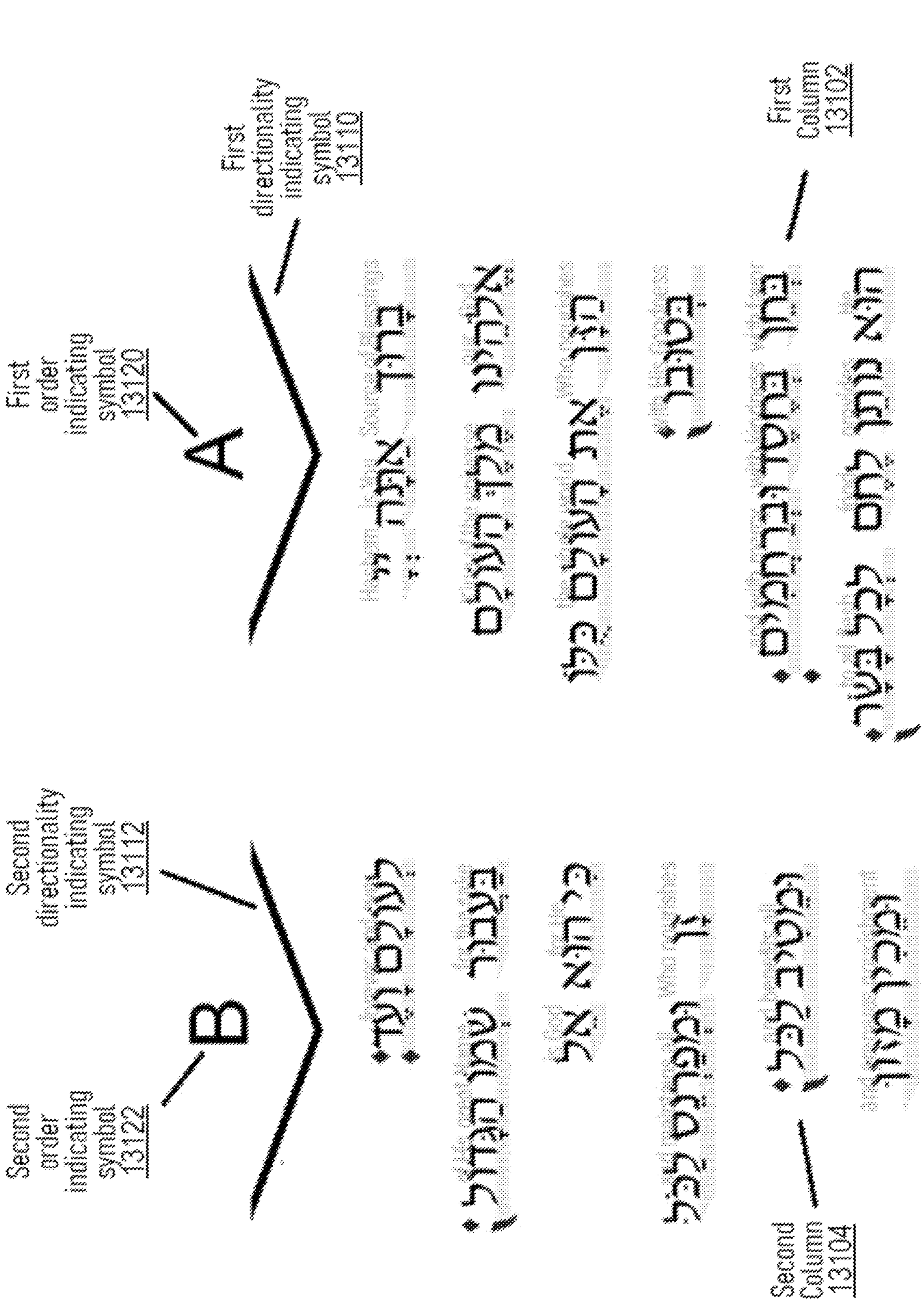

Reference is now made to FIG. 51 in which two columns of vertically adjacent substring pairs are displayed in accordance with a preferred embodiment of the present invention. Shown is a first column 13102 of vertically adjacent substring pairs placed to the right of a second column 13104 of vertically adjacent substring pairs. There is a first directionality indicating symbol 13110, the first arrow, above the first column 13102 and a second directionality indicating symbol 13112, the second arrow, above the second column 13112. There is a first order indicating symbol 13120, the letter "A," above the first directionality indicating symbol 13110 and a second order indicating symbol 13122, the letter "B," above the second directionality indicating symbol 13112.

In an alternative display of that depicted in FIG. 51, the directionality indicating symbols may be any shape that indicates to the reader which direction a column of substring pairs should be read in. Each directionality indicating symbol should preferably be placed near the starting point of its corresponding column of text.

In an alternative display of that depicted in FIG. 51, the order indicating symbols may be any set of symbols that progress in a logical order. For example, the number "1" may be used for the first column of text to be read and the number "2" may be used for the second column of text to be read. Each directionality indicating symbol should preferably be placed near a directionality indicating symbol and/or near the starting point of its corresponding column of text.

In an alternative display of that depicted in FIG. 51, the use of directionality indicating symbols and order indicating symbols is applied to rows of horizontally adjacent substring pairs.

Figure 52:
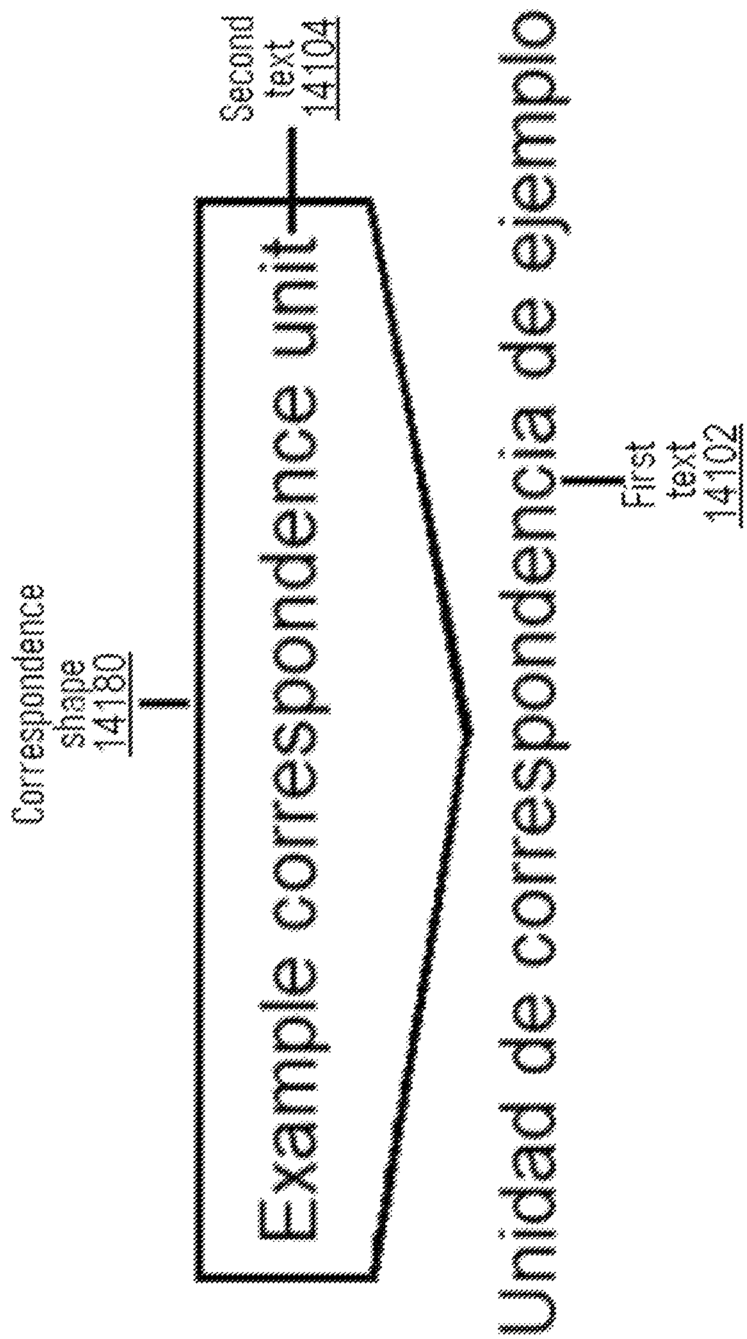

Reference is now made to FIG. 52 in which a first text and a second text are displayed in accordance with another preferred embodiment of the present invention. Shown is a second text 14104, the English native language chunk "Example correspondence unit" inside of a correspondence shape 14180, the shield, which is placed above a first text 14102, the Spanish foreign chunk "Unidad de correspondencia de ejemplo."

In an alternative embodiment of that depicted in FIG. 52, the correspondence shape may be positioned in between a first text and a second text, where the first text is not inside of the correspondence shape.

Figure 53:
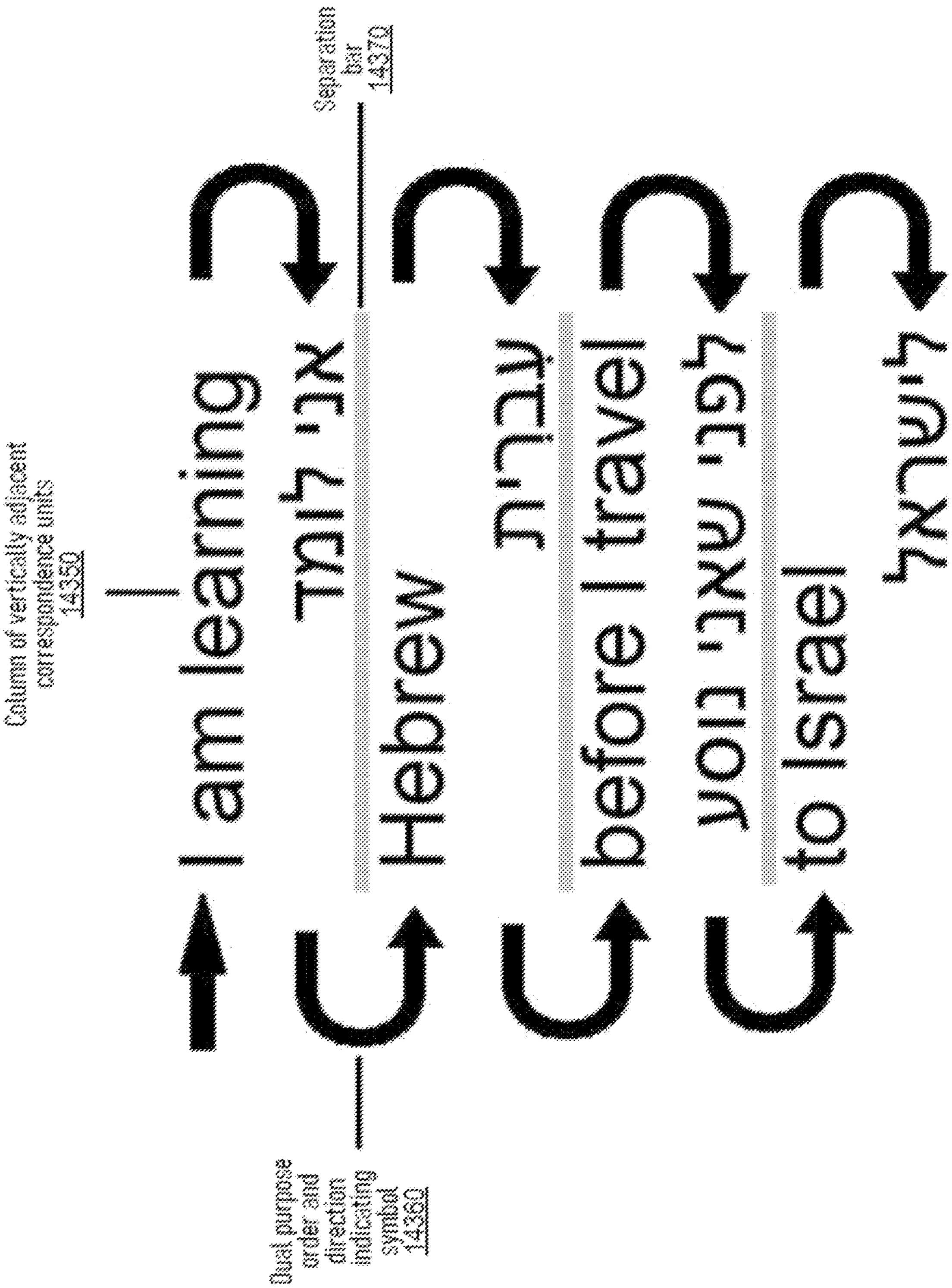

Reference is now made to FIG. 53 in which a column of vertically adjacent correspondence units 14350 is displayed in accordance with another preferred embodiment of the present invention. Each substring pair is comprised of an English native language substring and a Hebrew foreign substring. There are dual purpose order and direction indicating symbols 14360, the arrows, placed around the column. There may also be separation bars 14370 placed in between vertically adjacent correspondence units.

In an alternative embodiment of the arrangement depicted in FIG. 53, the order indicating symbols may be half arrows and any other order indicating shapes.

Figure 54A:
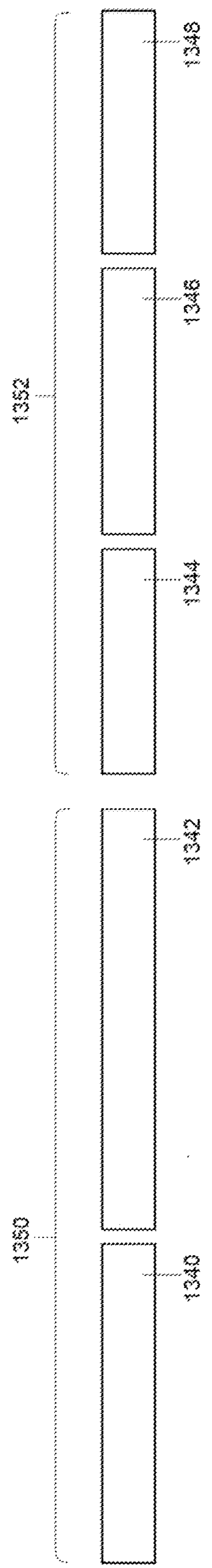

FIG. 54*a* shows two sets of demarcations in which first set of demarcations 1350 is comprised of the related first 1340 and second 1342 demarcations while the second set of demarcations 1352 is comprised of the related third 1344, fourth 1346, and fifth 1348 demarcations. Related demarcations are discrete such that, when placed proximate to a text string, a reader can differentiate one demarcation from adjacent demarcations of the same set. Here, the demarcations are hollow enclosing structures.

Figure 54B:
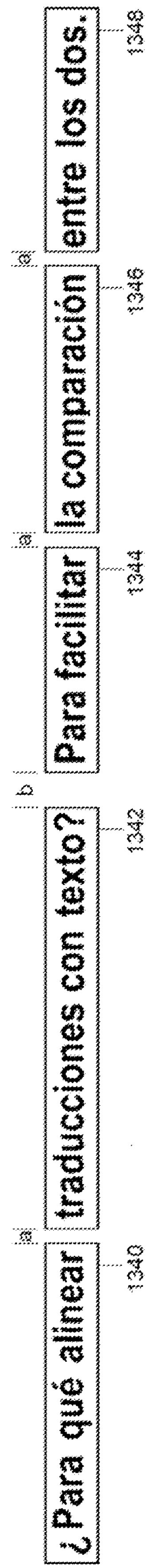

FIG. 54*b* shows a demarcated Spanish text string, according to an embodiment. The demarcations, due to their discrete nature, define substructures of the text string. Here, the substructures are phrases of "¿Para qué alinear" "traducciones con texto?" "Para facilitar" "la comparación" and "entre los dos." Related demarcations are spaced equidistant from each other by a first distance 'a' and unrelated demarcations (e.g., adjacent demarcations from different sets) are spaced equidistant from each other by a second distance 'b', where the first distance is not equal to the second distance. The demarcations, due to differences in spacing between adjacent related demarcations and adjacent unrelated demarcations, define substructures of the text string.

For example, here, there is a consistent spacing of distance 'a' in between adjacent related demarcations and a larger consistent spacing of distance 'b' in between adjacent unrelated demarcations. The spacing of distance 'b' clearly defines the sentences (a type of text string superstructure) of "¿Para qué alinear" "traducciones con texto?" and "Para facilitar" "la comparación" and "entre los dos." FIG. 13*c* shows an alternative embodiment of FIG. 13*b* in which distance 'a' is zero.

Figure 54C:
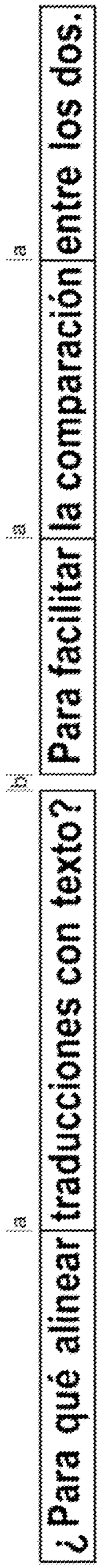
Figure 54D:
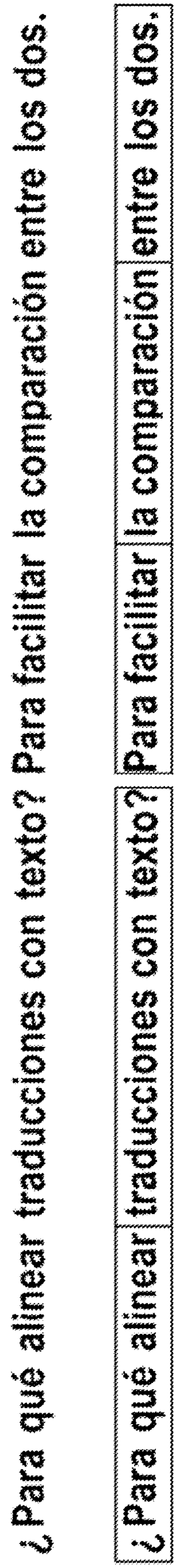

FIG. 54*d* shows a Spanish text string (top) and a demarcated Spanish text string (bottom). The Spanish text string has been demarcated according to the demarcation spacing of FIG. 54*c* but without any changes to the position of the words in the Spanish text string.

Thus, a preferred method of using sets of demarcations to define substructures and superstructures of a text string requires each demarcation to 1) be discrete and 2) have a first consistent spacing in between related demarcations and 3) have a second consistent spacing in between unrelated demarcations.

Figure 55:
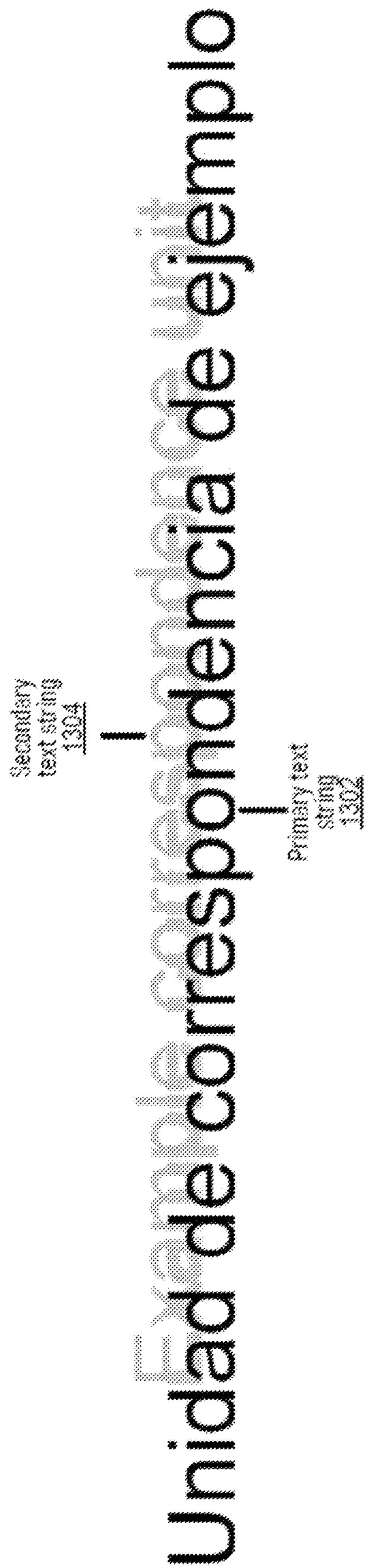

FIG. 55 shows a primary text string 1302 and a corresponding secondary text string 1304. The bottom portion of the secondary text string 1304 is thicker than the top portion of the secondary text string 1304. The increasing thickness in the direction of the primary text string 1302 indicates a correspondence between the primary text string 1302 and the secondary text string 1304.

For embodiments having two or more text strings or two or more substrings, alternating text attributes such as alternating colors, fonts, sizes, or styles may be used for every other text string or substring, serving to further distinguish adjacent text strings or substrings.

For embodiments where a text string interferes with another text string, one or more demarcations can be placed such that the demarcations cover up the interference, either partially or entirely, reducing the interference. The one or more demarcations may be sized to cover only the interference. When placed over the interference, the demarcations may cause the interference to appear deemphasized.

In some embodiments, the primary text string and/or the secondary text string may be italicized, or otherwise manipulated, in such a way that indicates the reading directionality of the text string.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A system to display a primary text string and a secondary text string, the system comprising:

memory storing executable instructions;

a processing device executing the instructions, wherein the instructions cause the processing device to:

receive a primary text string comprising a plurality of primary substrings;

receive a secondary text string comprising a plurality of secondary substrings;

receive a plurality of distinct visual demarcations;

display, on an electronic display, the primary substrings and the secondary substrings arranged into substring pairs, wherein each of the substring pairs comprising one of the secondary substrings placed next to its corresponding primary substring;

display, on the electronic display, the visual demarcations, wherein the visual demarcations delineate adjacent substring pairs from each other; and wherein a topmost point of a given visual demarcation overlaps a lower of the secondary substring and its corresponding primary substring.

2. The system of claim 1, wherein at least one of the primary substrings and the secondary substrings are extracted from the primary text string and the secondary text string via parsing operations of a native language processing engine, wherein the native language processing engine provides the at least one of the primary substrings and the secondary substrings as an output from at least one automated parser.

3. The system of claim 1, wherein the secondary text string is a translation of the primary text string, a transliteration of the primary text string, or user-input notes corresponding to the primary text string.

4. A computer-implemented method for displaying a primary text string and a secondary text string, the method comprising:

receiving a primary text string comprising a plurality of primary substrings;

receiving a secondary text string comprising a plurality of secondary substrings;

receiving a plurality of distinct visual demarcations;

displaying, on an electronic display, the primary substrings and the secondary substrings arranged into substring pairs, wherein each of the substring pairs comprising one of the secondary substrings placed next to its corresponding primary substring;

displaying, on the electronic display, the visual demarcations, wherein the visual demarcations delineate adjacent substring pairs from each other; and wherein a topmost point of a given visual demarcation overlaps a lower of the secondary substring and its corresponding primary substring.

5. Non-transitory computer storage media storing executable instructions which when executed by a computing device cause the computing device to:

receive a primary text string comprising a plurality of primary substrings;

receive a secondary text string comprising a plurality of secondary substrings;

receive a plurality of distinct visual demarcations;

display, on an electronic display, the primary substrings and the secondary substrings arranged into substring pairs, wherein each of the substring pairs comprising one of the secondary substrings placed next to its corresponding primary substring;

display, on the electronic display, the visual demarcations, wherein the visual demarcations delineate adjacent substring pairs from each other; and wherein a topmost point of a given visual demarcation overlaps a lower of the secondary substring and its corresponding primary substring.

6. A system to display a primary text string and a secondary text string, the system comprising:
memory storing executable instructions;
a processing device executing the instructions, wherein the instructions cause the processing device to:
receive a primary text string comprising a plurality of primary substrings;
receive a secondary text string comprising a plurality of secondary substrings;
receive a plurality of distinct visual demarcations;
display, on an electronic display, the primary substrings and the secondary substrings arranged into substring pairs, wherein each of the substring pairs comprising one of the secondary substrings placed next to its corresponding primary substring;
display, on the electronic display, the visual demarcations, wherein the visual demarcations delineate adjacent substring pairs from each other; and
wherein, for at least one of the primary text string and the secondary text string, an appearance of the substrings alternates in between a first appearance and a second appearance.

7. The system of claim 6, wherein
the instructions further cause the processing device to:
define a rectangular correspondence area for each of the substring pairs; and
wherein each of the rectangular correspondence areas contains at least one of the visual demarcations.

8. The system of claim 6, wherein
a leftmost point of a given visual demarcation is in between, or flush with, a leftmost point of the secondary substring and a leftmost point of its corresponding primary substring; and
a rightmost point of the given visual demarcation is in between, or flush with, a rightmost point of the secondary substring and a rightmost point of its corresponding primary substring.

9. The system of claim 6, wherein
the secondary substrings are related to their corresponding primary substrings.

10. The system of claim 6, wherein
a given visual demarcation comprises a shape that causes the secondary substring to appear on a separate perspective plane relative to the corresponding primary substring, conveying a visual appearance of depth for the secondary substring.

11. The system of claim 6, wherein
displaying the secondary substrings further comprises visually deemphasizing the secondary substrings by one of:
displaying the secondary substrings offset from their corresponding primary substrings;
displaying the secondary substrings in a smaller font than their corresponding primary substrings; and
displaying a portion of the secondary substrings in a lighter shade than their corresponding primary substrings.

12. The system of claim 6, wherein
the given visual demarcation comprises one of:
a quadrilateral; and
at least two shadow-outlined edges of an implied transparent oblique parallelogram.

13. The system of claim 6, wherein
interacting with a given demarcation causes additional information to be displayed on the electronic display.

14. The system of claim 6, wherein
at least one of the primary substrings and the secondary substrings are extracted from the primary text string and the secondary text string via parsing operations of a native language processing engine, wherein
the native language processing engine provides the at least one of the primary substrings and the secondary substrings as an output from at least one automated parser.

15. The system of claim 6, wherein
the secondary text string is a translation of the primary text string, a transliteration of the primary text string, or user-input notes corresponding to the primary text string.

16. A computer-implemented method for displaying a primary text string and a secondary text string, the method comprising:
receiving a primary text string comprising a plurality of primary substrings;
receiving a secondary text string comprising a plurality of secondary substrings;
receiving a plurality of distinct visual demarcations;
displaying, on an electronic display, the primary substrings and the secondary substrings arranged into substring pairs, wherein each of the substring pairs comprising one of the secondary substrings placed next to its corresponding primary substring;
displaying, on the electronic display, the visual demarcations, wherein the visual demarcations delineate adjacent substring pairs from each other; and
wherein, for at least one of the primary text string and the secondary text string, an appearance of the substrings alternates in between a first appearance and a second appearance.

17. Non-transitory computer storage media storing executable instructions which when executed by a computing device cause the computing device to:
receive a primary text string comprising a plurality of primary substrings;
receive a secondary text string comprising a plurality of secondary substrings;
receive a plurality of distinct visual demarcations;
display, on an electronic display, the primary substrings and the secondary substrings arranged into substring pairs, wherein each of the substring pairs comprising one of the secondary substrings placed next to its corresponding primary substring;
display, on the electronic display, the visual demarcations, wherein the visual demarcations delineate adjacent substring pairs from each other; and
wherein, for at least one of the primary text string and the secondary text string, an appearance of the substrings alternates in between a first appearance and a second appearance.

18. A system to display a primary text string and a secondary text string, the system comprising:
memory storing executable instructions;
a processing device executing the instructions, wherein the instructions cause the processing device to:
receive a primary text string comprising a plurality of primary substrings;
receive a secondary text string comprising a plurality of secondary substrings;
receive a plurality of distinct visual demarcations;
display, on an electronic display, the primary substrings and the secondary substrings arranged into substring pairs, wherein each of the substring pairs comprising one of the secondary substrings placed next to its corresponding primary substring;

display, on the electronic display, the visual demarcations, wherein the visual demarcations delineate adjacent substring pairs from each other; and wherein a placement of secondary substrings relative to their corresponding primary substrings alternates from a given substring pair to a next substring pair.

19. The system of claim 18, wherein the instructions further cause the processing device to:

define a rectangular correspondence area for each of the substring pairs; and wherein each of the rectangular correspondence areas contains at least one of the visual demarcations.

20. The system of claim 18, wherein a leftmost point of a given visual demarcation is in between, or flush with, a leftmost point of the secondary substring and a leftmost point of its corresponding primary substring; and a rightmost point of the given visual demarcation is in between, or flush with, a rightmost point of the secondary substring and a rightmost point of its corresponding primary substring.

21. The system of claim 18, wherein the secondary substrings are related to their corresponding primary substrings.

22. The system of claim 18, wherein a given visual demarcation comprises a shape that causes the secondary substring to appear on a separate perspective plane relative to the corresponding primary substring, conveying a visual appearance of depth for the secondary substring.

23. The system of claim 18, wherein displaying the secondary substrings further comprises visually deemphasizing the secondary substrings by one of:

displaying the secondary substrings offset from their corresponding primary substrings;

displaying the secondary substrings in a smaller font than their corresponding primary substrings; and displaying a portion of the secondary substrings in a lighter shade than their corresponding primary substrings.

24. The system of claim 18, wherein the given visual demarcation comprises one of:

a quadrilateral; and at least two shadow-outlined edges of an implied transparent oblique parallelogram.

25. The system of claim 18, wherein interacting with a given demarcation causes additional information to be displayed on the electronic display.

26. The system of claim 18, wherein at least one of the primary substrings and the secondary substrings are extracted from the primary text string and the secondary text string via parsing operations of a native language processing engine, wherein the native language processing engine provides the at least one of the primary substrings and the secondary substrings as an output from at least one automated parser.

27. The system of claim 18, wherein the secondary text string is a translation of the primary text string, a transliteration of the primary text string, or user-input notes corresponding to the primary text string.

28. A computer-implemented method for displaying a primary text string and a secondary text string, the method comprising:

receiving a primary text string comprising a plurality of primary substrings;

receiving a secondary text string comprising a plurality of secondary substrings;

receiving a plurality of distinct visual demarcations;

displaying, on an electronic display, the primary substrings and the secondary substrings arranged into substring pairs, wherein each of the substring pairs comprising one of the secondary substrings placed next to its corresponding primary substring;

displaying, on the electronic display, the visual demarcations, wherein the visual demarcations delineate adjacent substring pairs from each other; and wherein a placement of secondary substrings relative to their corresponding primary substrings alternates from a given substring pair to a next substring pair.

29. Non-transitory computer storage media storing executable instructions which when executed by a computing device cause the computing device to:

receive a primary text string comprising a plurality of primary substrings;

receive a secondary text string comprising a plurality of secondary substrings;

receive a plurality of distinct visual demarcations;

display, on an electronic display, the primary substrings and the secondary substrings arranged into substring pairs, wherein each of the substring pairs comprising one of the secondary substrings placed next to its corresponding primary substring;

display, on the electronic display, the visual demarcations, wherein the visual demarcations delineate adjacent substring pairs from each other; and wherein a placement of secondary substrings relative to their corresponding primary substrings alternates from a given substring pair to a next substring pair.

* * * * *